(12) United States Patent
el Kaliouby et al.

(10) Patent No.: US 11,887,352 B2
(45) Date of Patent: Jan. 30, 2024

(54) LIVE STREAMING ANALYTICS WITHIN A SHARED DIGITAL ENVIRONMENT

(71) Applicant: Affectiva, Inc., Boston, MA (US)

(72) Inventors: Rana el Kaliouby, Milton, MA (US); Graham John Page, Banbury (GB); Gabriele Zijderveld, Somerville, MA (US)

(73) Assignee: Affectiva, Inc., Boston, MA (US)

( * ) Notice: Subject to any disclaimer, the term of this patent is extended or adjusted under 35 U.S.C. 154(b) by 10 days.

(21) Appl. No.: 16/829,743

(22) Filed: Mar. 25, 2020

(65) Prior Publication Data

US 2020/0228359 A1 Jul. 16, 2020

Related U.S. Application Data

(63) Continuation-in-part of application No. 16/017,037, filed on Jun. 25, 2018, now Pat. No. 10,869,626,
(Continued)

(51) Int. Cl.
*G06V 10/764* (2022.01)
*H04L 12/18* (2006.01)
(Continued)

(52) U.S. Cl.
CPC .......... *G06V 10/764* (2022.01); *G06V 10/82* (2022.01); *G06V 40/174* (2022.01);
(Continued)

(58) Field of Classification Search
CPC .......... H04L 12/1831; H04L 12/1822; H04L 12/1827; H04L 67/38; H04L 67/22; G06K 9/00302; G06K 9/6271
See application file for complete search history.

(56) References Cited

U.S. PATENT DOCUMENTS

| 3,034,500 A | 5/1962 | Backster, Jr. |
| 3,548,806 A | 12/1970 | Fisher |

(Continued)

FOREIGN PATENT DOCUMENTS

| JP | 08115367 | 7/1996 |
| KR | 10-2005-0021759 A | 3/2005 |

(Continued)

OTHER PUBLICATIONS

Rana Ayman El Kaliouby, Mind-reading machines: automated inference of complex mental states, Jul. 2005, University of Cambridge, Cambridge, United Kingdom.
(Continued)

*Primary Examiner* — Wesley J Tucker
(74) *Attorney, Agent, or Firm* — Adams Intellex, PLC

(57) ABSTRACT

Analytics are used for live streaming based on analysis within a shared digital environment. An interactive digital environment is accessed, where the interactive digital environment is a shared digital environment for a plurality of participants. The participants include presenters and viewers. A plurality of images is obtained from a first set of participants within the plurality of participants involved in the interactive digital environment. Cognitive state content is analyzed within the plurality of images for the first set of participants within the plurality of participants. Results of the analyzing cognitive state content are provided to a second set of participants within the plurality of participants. The obtaining and the analyzing are accomplished on a device local to a participant such that images of the first set of participants are not transmitted to a non-local device. The analyzing cognitive state content is augmented with evaluation of audio information.

30 Claims, 22 Drawing Sheets

Related U.S. Application Data which is a continuation-in-part of application No. 14/328,554, filed on Jul. 10, 2014, now Pat. No. 10,111,611, which is a continuation-in-part of application No. 13/153,745, filed on Jun. 6, 2011, now abandoned, application No. 16/829,743, filed on Mar. 25, 2020 is a continuation-in-part of application No. 15/444,544, filed on Feb. 28, 2017, now Pat. No. 10,111,611, which is a continuation-in-part of application No. 15/262,197, filed on Sep. 12, 2016, now abandoned, which is a continuation-in-part of application No. 14/796,419, filed on Jul. 10, 2015, now abandoned, which is a continuation-in-part of application No. 14/460,915, filed on Aug. 15, 2014, now abandoned, which is a continuation-in-part of application No. 13/153,745, filed on Jun. 6, 2011, now abandoned.

(60) Provisional application No. 62/955,493, filed on Dec. 31, 2019, provisional application No. 62/954,819, filed on Dec. 30, 2019, provisional application No. 62/954,833, filed on Dec. 30, 2019, provisional application No. 62/925,990, filed on Oct. 25, 2019, provisional application No. 62/926,009, filed on Oct. 25, 2019, provisional application No. 62/893,298, filed on Aug. 29, 2019, provisional application No. 62/827,088, filed on Mar. 31, 2019, provisional application No. 62/679,825, filed on Jun. 3, 2018, provisional application No. 62/637,567, filed on Mar. 2, 2018, provisional application No. 62/625,274, filed on Feb. 1, 2018, provisional application No. 62/611,780, filed on Dec. 29, 2017, provisional application No. 62/593,440, filed on Dec. 1, 2017, provisional application No. 62/593,449, filed on Dec. 1, 2017, provisional application No. 62/557,460, filed on Sep. 12, 2017, provisional application No. 62/541,847, filed on Aug. 7, 2017, provisional application No. 62/524,606, filed on Jun. 25, 2017, provisional application No. 61/927,481, filed on Jan. 15, 2014, provisional application No. 61/924,252, filed on Jan. 7, 2014, provisional application No. 61/916,190, filed on Dec. 14, 2013, provisional application No. 61/844,478, filed on Jul. 10, 2013, provisional application No. 61/467,209, filed on Mar. 24, 2011, provisional application No. 61/447,464, filed on Feb. 28, 2011, provisional application No. 61/447,089, filed on Feb. 27, 2011, provisional application No. 61/439,913, filed on Feb. 6, 2011, provisional application No. 61/414,451, filed on Nov. 17, 2010, provisional application No. 61/388,002, filed on Sep. 30, 2010, provisional application No. 61/352,166, filed on Jun. 7, 2010, provisional application No. 62/448,448, filed on Jan. 20, 2017, provisional application No. 62/442,325, filed on Jan. 4, 2017, provisional application No. 62/442,291, filed on Jan. 4, 2017, provisional application No. 62/439,928, filed on Dec. 29, 2016, provisional application No. 62/370,421, filed on Aug. 3, 2016, provisional application No. 62/301,558, filed on Feb. 29, 2016, provisional application No. 62/273,896, filed on Dec. 31, 2015, provisional application No. 62/265,937, filed on Dec. 10, 2015, provisional application No. 62/222,518, filed on Sep. 23, 2015, provisional application No. 62/217,872, filed on Sep. 12, 2015, provisional application No. 62/128,974, filed on Mar. 5, 2015, provisional application No. 62/082,579, filed on Nov. 20, 2014, provisional application No. 62/047,508, filed on Sep. 8, 2014, provisional application No. 62/023,800, filed on Jul. 11, 2014, provisional application No. 61/972,314, filed on Mar. 30, 2014, provisional application No. 61/953,878, filed on Mar. 16, 2014, provisional application No. 61/867,007, filed on Aug. 16, 2013.

(51) Int. Cl.
*G06V 40/16* (2022.01)
*H04L 67/131* (2022.01)
*G06V 10/82* (2022.01)

(52) U.S. Cl.
CPC ...... *H04L 12/1822* (2013.01); *H04L 12/1827* (2013.01); *H04L 12/1831* (2013.01); *H04L 67/131* (2022.05)

(56) References Cited

U.S. PATENT DOCUMENTS

| | | |
|---|---|---|
| 3,870,034 A | 3/1975 | James |
| 4,353,375 A | 10/1982 | Colburn et al. |
| 4,448,203 A | 5/1984 | Williamson et al. |
| 4,794,533 A | 12/1988 | Cohen |
| 4,807,642 A | 2/1989 | Brown |
| 4,817,628 A | 4/1989 | Zealear et al. |
| 4,950,069 A | 8/1990 | Hutchinson |
| 4,964,411 A | 10/1990 | Johnson et al. |
| 5,016,282 A | 5/1991 | Tomono et al. |
| 5,031,228 A | 7/1991 | Lu |
| 5,219,322 A | 6/1993 | Weathers |
| 5,247,938 A | 9/1993 | Silverstein et al. |
| 5,259,390 A | 11/1993 | Maclean |
| 5,507,291 A | 4/1996 | Stirbl et al. |
| 5,572,596 A | 11/1996 | Wildes et al. |
| 5,619,571 A | 4/1997 | Sandstorm et al. |
| 5,647,834 A | 7/1997 | Ron |
| 5,649,061 A | 7/1997 | Smyth |
| 5,663,900 A | 9/1997 | Bhandari et al. |
| 5,666,215 A | 9/1997 | Fredlund et al. |
| 5,725,472 A | 3/1998 | Weathers |
| 5,741,217 A | 4/1998 | Gero |
| 5,760,917 A | 6/1998 | Sheridan |
| 5,762,611 A | 6/1998 | Lewis et al. |
| 5,772,508 A | 6/1998 | Sugita et al. |
| 5,772,591 A | 6/1998 | Cram |
| 5,774,591 A | 6/1998 | Black et al. |
| 5,802,220 A | 9/1998 | Black et al. |
| 5,825,355 A | 10/1998 | Palmer et al. |
| 5,886,683 A | 3/1999 | Tognazzini et al. |
| 5,898,423 A | 4/1999 | Tognazzini et al. |
| 5,920,477 A | 7/1999 | Hoffberg et al. |
| 5,945,988 A | 8/1999 | Williams et al. |
| 5,959,621 A | 9/1999 | Nawaz et al. |
| 5,969,755 A | 10/1999 | Courtney |
| 5,983,129 A | 11/1999 | Cowan et al. |
| 5,987,415 A | 11/1999 | Breese et al. |
| 6,004,061 A | 12/1999 | Manico et al. |
| 6,004,312 A | 12/1999 | Finneran et al. |
| 6,008,817 A | 12/1999 | Gilmore, Jr. |
| 6,026,321 A | 2/2000 | Miyata et al. |
| 6,026,322 A | 2/2000 | Korenman et al. |
| 6,056,781 A | 5/2000 | Wassick et al. |
| 6,067,565 A | 5/2000 | Horvitz |
| 6,088,040 A | 7/2000 | Oda et al. |
| 6,091,334 A | 7/2000 | Galiana et al. |
| 6,099,319 A | 8/2000 | Zaltman et al. |
| 6,134,644 A | 10/2000 | Mayuzumi et al. |
| 6,182,098 B1 | 1/2001 | Selker |
| 6,185,534 B1 | 2/2001 | Breese et al. |
| 6,195,651 B1 | 2/2001 | Handel et al. |
| 6,212,502 B1 | 4/2001 | Ball et al. |
| 6,222,607 B1 | 4/2001 | Szajewski et al. |

(56) References Cited

U.S. PATENT DOCUMENTS

| | | |
|---|---|---|
| 6,309,342 B1 | 10/2001 | Blazey et al. |
| 6,327,580 B1 | 12/2001 | Pierce et al. |
| 6,349,290 B1 | 2/2002 | Horowitz et al. |
| 6,351,273 B1 | 2/2002 | Lemelson et al. |
| 6,437,758 B1 | 8/2002 | Nielsen et al. |
| 6,443,840 B2 | 9/2002 | Von Kohorn |
| 6,530,082 B1 | 3/2003 | Del Sesto et al. |
| 6,577,329 B1 | 6/2003 | Flickner et al. |
| 6,606,102 B1 | 8/2003 | Odom |
| 6,629,104 B1 | 9/2003 | Parulski et al. |
| 6,792,458 B1 | 9/2004 | Muret et al. |
| 6,847,376 B2 | 1/2005 | Engeldrum et al. |
| 7,003,135 B2 | 2/2006 | Hsieh et al. |
| 7,013,478 B1 | 3/2006 | Hendricks et al. |
| 7,113,916 B1 | 9/2006 | Hill |
| 7,120,880 B1 | 10/2006 | Dryer et al. |
| 7,197,459 B1 | 3/2007 | Harinarayan et al. |
| 7,233,684 B2 | 6/2007 | Fedorovskaya et al. |
| 7,246,081 B2 | 7/2007 | Hill |
| 7,263,474 B2 | 8/2007 | Fables et al. |
| 7,266,582 B2 | 9/2007 | Stelting |
| 7,307,636 B2 | 12/2007 | Matraszek et al. |
| 7,319,779 B1 | 1/2008 | Mummareddy et al. |
| 7,327,505 B2 | 2/2008 | Fedorovskaya et al. |
| 7,350,138 B1 | 3/2008 | Swaminathan et al. |
| 7,353,399 B2 | 4/2008 | Doi et al. |
| 7,355,627 B2 | 4/2008 | Yamazaki et al. |
| 7,428,318 B1 | 9/2008 | Madsen et al. |
| 7,474,801 B2 | 1/2009 | Teo et al. |
| 7,496,622 B2 | 2/2009 | Brown et al. |
| 7,549,161 B2 | 6/2009 | Poo et al. |
| 7,551,755 B1 | 6/2009 | Steinberg et al. |
| 7,555,148 B1 | 6/2009 | Steinberg et al. |
| 7,558,408 B1 | 7/2009 | Steinberg et al. |
| 7,564,994 B1 | 7/2009 | Steinberg et al. |
| 7,573,439 B2 | 8/2009 | Lau et al. |
| 7,580,512 B2 | 8/2009 | Batni et al. |
| 7,584,435 B2 | 9/2009 | Bailey et al. |
| 7,587,068 B1 | 9/2009 | Steinberg et al. |
| 7,610,289 B2 | 10/2009 | Muret et al. |
| 7,620,934 B2 | 11/2009 | Falter et al. |
| 7,644,375 B1 | 1/2010 | Anderson et al. |
| 7,676,574 B2 | 3/2010 | Glommen et al. |
| 7,757,171 B1 | 7/2010 | Wong et al. |
| 7,826,657 B2 | 11/2010 | Zhang et al. |
| 7,830,570 B2 | 11/2010 | Morita et al. |
| 7,881,493 B1 | 2/2011 | Edwards et al. |
| 7,921,036 B1 | 4/2011 | Sharma |
| 8,010,458 B2 | 8/2011 | Galbreath et al. |
| 8,022,831 B1 | 9/2011 | Wood-Eyre |
| 8,219,438 B1 * | 7/2012 | Moon ............... G06K 9/00302 |
| | | 705/7.29 |
| 8,401,248 B1 | 3/2013 | Moon et al. |
| 8,442,638 B2 | 5/2013 | Libbus et al. |
| 8,522,779 B2 | 9/2013 | Lee et al. |
| 8,600,120 B2 | 12/2013 | Gonion et al. |
| 8,640,021 B2 | 1/2014 | Perez et al. |
| 9,231,989 B2 * | 1/2016 | Milliken ............... G06F 3/0482 |
| 9,454,646 B2 * | 9/2016 | Siefert ................... G09B 7/073 |
| 9,785,534 B1 * | 10/2017 | Paulus ............... G06F 11/3041 |
| 9,930,102 B1 * | 3/2018 | Paulus ................... G06Q 10/10 |
| 10,322,728 B1 | 6/2019 | Porikli et al. |
| 11,367,083 B1 * | 6/2022 | Saurabh ............... G06Q 30/02 |
| 2001/0033286 A1 | 10/2001 | Stokes et al. |
| 2001/0041021 A1 | 11/2001 | Boyle et al. |
| 2002/0007249 A1 | 1/2002 | Cranley |
| 2002/0030665 A1 | 3/2002 | Ano |
| 2002/0042557 A1 | 4/2002 | Bensen et al. |
| 2002/0054174 A1 | 5/2002 | Abbott et al. |
| 2002/0084902 A1 | 7/2002 | Zadrozny et al. |
| 2002/0171551 A1 | 11/2002 | Eshelman |
| 2002/0182574 A1 | 12/2002 | Freer |
| 2003/0035567 A1 | 2/2003 | Chang et al. |
| 2003/0037041 A1 | 2/2003 | Hertz |
| 2003/0060728 A1 | 3/2003 | Mandigo |
| 2003/0093784 A1 | 5/2003 | Dimitrova et al. |
| 2003/0182123 A1 | 9/2003 | Mitsuyoshi |
| 2003/0191682 A1 | 10/2003 | Shepard et al. |
| 2003/0191816 A1 | 10/2003 | Landress et al. |
| 2004/0181457 A1 | 9/2004 | Biebesheimer |
| 2005/0187437 A1 | 8/2005 | Matsugu |
| 2005/0283055 A1 | 12/2005 | Shirai et al. |
| 2005/0289582 A1 | 12/2005 | Tavares et al. |
| 2006/0019224 A1 | 1/2006 | Behar et al. |
| 2006/0143647 A1 | 6/2006 | Bill |
| 2006/0170945 A1 | 8/2006 | Bill |
| 2006/0235753 A1 | 10/2006 | Kameyama |
| 2007/0167689 A1 | 7/2007 | Ramadas et al. |
| 2007/0173733 A1 | 7/2007 | Le et al. |
| 2007/0239787 A1 | 10/2007 | Cunningham et al. |
| 2007/0243930 A1 | 10/2007 | Zalewski |
| 2007/0255831 A1 | 11/2007 | Hayashi et al. |
| 2007/0265507 A1 | 11/2007 | de Lemos |
| 2007/0299964 A1 | 12/2007 | Wong et al. |
| 2008/0059570 A1 | 3/2008 | Bill |
| 2008/0091512 A1 | 4/2008 | Marci et al. |
| 2008/0091515 A1 | 4/2008 | Thieberger et al. |
| 2008/0101660 A1 * | 5/2008 | Seo ..................... G06K 9/00308 |
| | | 382/118 |
| 2008/0103784 A1 | 5/2008 | Wong et al. |
| 2008/0167757 A1 | 7/2008 | Kanevsky et al. |
| 2008/0184170 A1 | 7/2008 | Periyalwar |
| 2008/0201144 A1 | 8/2008 | Song et al. |
| 2008/0208015 A1 | 8/2008 | Morris et al. |
| 2008/0221472 A1 | 9/2008 | Lee et al. |
| 2008/0287821 A1 | 11/2008 | Jung et al. |
| 2008/0292151 A1 | 11/2008 | Kurtz et al. |
| 2009/0002178 A1 | 1/2009 | Guday et al. |
| 2009/0006206 A1 | 1/2009 | Groe |
| 2009/0042646 A1 | 2/2009 | Sarkar |
| 2009/0083421 A1 | 3/2009 | Glommen et al. |
| 2009/0094286 A1 | 4/2009 | Lee et al. |
| 2009/0112694 A1 | 4/2009 | Jung et al. |
| 2009/0112810 A1 | 4/2009 | Jung et al. |
| 2009/0119730 A1 * | 5/2009 | Perlman ................ A63F 13/335 |
| | | 725/114 |
| 2009/0133048 A1 | 5/2009 | Gibbs et al. |
| 2009/0150919 A1 | 6/2009 | Lee et al. |
| 2009/0156907 A1 | 6/2009 | Jung et al. |
| 2009/0164132 A1 | 6/2009 | Jung et al. |
| 2009/0193344 A1 | 7/2009 | Smyers |
| 2009/0210290 A1 | 8/2009 | Elliott et al. |
| 2009/0217315 A1 | 8/2009 | Malik et al. |
| 2009/0259518 A1 | 10/2009 | Harvey |
| 2009/0270170 A1 | 10/2009 | Patton |
| 2009/0271417 A1 | 10/2009 | Toebes et al. |
| 2009/0285456 A1 | 11/2009 | Moon et al. |
| 2009/0299840 A1 | 12/2009 | Smith |
| 2010/0070523 A1 | 3/2010 | Delgo et al. |
| 2010/0086215 A1 | 4/2010 | Bartlett et al. |
| 2010/0099955 A1 | 4/2010 | Thomas et al. |
| 2010/0266213 A1 | 10/2010 | Hill |
| 2010/0274847 A1 | 10/2010 | Anderson et al. |
| 2010/0324437 A1 | 12/2010 | Freeman |
| 2011/0007174 A1 | 1/2011 | Bacivarov et al. |
| 2011/0126226 A1 | 5/2011 | Makhlouf |
| 2011/0134026 A1 | 6/2011 | Kang et al. |
| 2011/0143728 A1 | 6/2011 | Holopainen et al. |
| 2011/0144971 A1 | 6/2011 | Danielson |
| 2011/0196855 A1 | 8/2011 | Wable et al. |
| 2011/0223995 A1 * | 9/2011 | Geisner ................... G06F 3/017 |
| | | 463/36 |
| 2011/0231240 A1 | 9/2011 | Schoen et al. |
| 2011/0251493 A1 | 10/2011 | Poh et al. |
| 2011/0263946 A1 | 10/2011 | el Kaliouby et al. |
| 2012/0259240 A1 * | 10/2012 | Llewellynn ............ G06Q 30/02 |
| | | 600/558 |
| 2012/0271484 A1 | 10/2012 | Feit et al. |
| 2012/0324491 A1 | 12/2012 | Bathiche et al. |
| 2013/0023337 A1 | 1/2013 | Bowers et al. |
| 2013/0116587 A1 | 5/2013 | Sommo et al. |
| 2013/0197409 A1 | 8/2013 | Baxter et al. |
| 2013/0288212 A1 * | 10/2013 | Bist ....................... G06Q 50/01 |
| | | 434/236 |

(56) References Cited

U.S. PATENT DOCUMENTS

| | | | |
|---|---|---|---|
| 2014/0172910 | A1 | 6/2014 | Jung et al. |
| 2014/0276090 | A1 | 9/2014 | Breed |
| 2014/0282651 | A1* | 9/2014 | Baratz ............... H04N 21/4788 725/13 |
| 2016/0104486 | A1 | 4/2016 | Penilla et al. |
| 2017/0003784 | A1 | 1/2017 | Garg et al. |
| 2017/0251262 | A1* | 8/2017 | Bist ................... H04N 21/6582 |
| 2017/0297587 | A1 | 10/2017 | Mimura et al. |
| 2018/0050696 | A1 | 2/2018 | Misu et al. |
| 2018/0251122 | A1 | 9/2018 | Golston et al. |
| 2019/0049965 | A1 | 2/2019 | Tanriover |
| 2019/0135325 | A1 | 5/2019 | Lisseman et al. |
| 2019/0225232 | A1 | 7/2019 | Blau |
| 2020/0103980 | A1 | 4/2020 | Katz et al. |
| 2020/0171977 | A1 | 6/2020 | Jales Costa et al. |
| 2020/0223362 | A1 | 7/2020 | Witte |
| 2020/0285871 | A1 | 9/2020 | Tokizaki et al. |
| 2020/0130528 | A1 | 10/2020 | Upmanue et al. |
| 2021/0326586 | A1* | 10/2021 | Sorci .................... A61B 5/7278 |
| 2022/0174357 | A1* | 6/2022 | Zavesky .......... H04N 21/44213 |

FOREIGN PATENT DOCUMENTS

| | | |
|---|---|---|
| KR | 10-2008-0016303 A | 2/2008 |
| KR | 1020100048688 A | 5/2010 |
| WO | WO 2011/045422 A1 | 4/2011 |

OTHER PUBLICATIONS

International Search Report dated Nov. 14, 2011 for PCT/US2011/39282.

International Search Report dated Apr. 16, 2012 for PCT/US2011/054125.

International Search Report dated May 24, 2012 for PCT/US2011/060900.

Xiaoyu Wang, An HOG-LBP human detector with partial occlusion handling, Sep. 29, 2009, IEEE 12th International Conference on Computer Vision, Kyoto, Japan.

Zhihong Zeng, A Survey of Affect Recognition Methods: Audio, Visual, and Spontaneous Expressions, Jan. 2009, IEEE Transactions on Pattern Analysis and Machine Intelligence, vol. 31, No. 1.

Nicholas R. Howe and Amanda Ricketson, Improving the Boosted Correlogram, 2004, Lecture Notes in Computer Science, ISSN 0302-9743, Springer-Verlag, Germany.

Xuming He, et al, Learning and Incorporating Top-Down Cues in Image Segmentation, 2006, Lecture Notes in Computer Science, ISBN 978-3-540-33832-1, Springer-Verlag, Germany.

Ross Eaton, et al, Rapid Training of Image Classifiers through Adaptive, Multi-frame Sampling Methods, Oct. 2008, IEEE 37th Applied Imagery Pattern Recognition Workshop, Washington DC.

Verkruysse, Wim, Lars O. Svaasand, and J. Stuart Nelson. "Remote plethysmographic imaging using ambient light." Optics express 16.26 (2008): 21434-21445.

Albiol, Alberto, et al. "Face recognition using HOG-EBGM." Pattern Recognition Letters 29.10 (2008): 1537-1543.

Fasel, B. (Aug. 2002). Robust face analysis using convolutional neural networks. In Object recognition supported by user interaction for service robots (vol. 2, pp. 40-43). IEEE.

Matsugu, M., Mori, K., Mitari, Y., & Kaneda, Y. (2003). Subject independent facial expression recognition with robust face detection using a convolutional neural network. Neural Networks, 16(5-6), 555-559.

* cited by examiner

LIVE STREAMING ANALYTICS WITHIN A SHARED DIGITAL ENVIRONMENT

RELATED APPLICATIONS

This application claims the benefit of U.S. provisional patent applications "Synthetic Data Augmentation for Neural Network Training" Ser. No. 62/954,819, filed Dec. 30, 2019, "Synthetic Data for Neural Network Training Using Vectors" Ser. No. 62/954,833, filed Dec. 30, 2019, "Autonomous Vehicle Control Using Longitudinal Profile Generation" Ser. No. 62/955,493, filed Dec. 31, 2019, "Image Analysis for Human Perception Artificial Intelligence" Ser. No. 62/827,088, filed Mar. 31, 2019, "Vehicle Interior Object Management" Ser. No. 62/893,298, filed Aug. 29, 2019, "Deep Learning In Situ Retraining" Ser. No. 62/925,990, filed Oct. 25, 2019, and "Data Versioning for Neural Network Training" Ser. No. 62/926,009, filed Oct. 25, 2019.

This application is also a continuation-in-part of U.S. patent application "Image Analysis for Emotional Metric Evaluation" Ser. No. 16/017,037, filed Jun. 25, 2018, which claims the benefit of U.S. provisional patent applications "Image Analysis for Emotional Metric Generation" Ser. No. 62/524,606, filed Jun. 25, 2017, "Image Analysis and Representation for Emotional Metric Threshold Evaluation" Ser. No. 62/541,847, filed Aug. 7, 2017, "Multimodal Machine Learning for Emotion Metrics" Ser. No. 62/557,460, filed Sep. 12, 2017, "Speech Analysis for Cross-Language Mental State Identification" Ser. No. 62/593,449, filed Dec. 1, 2017, "Avatar Image Animation using Translation Vectors" Ser. No. 62/593,440, filed Dec. 1, 2017, "Directed Control Transfer for Autonomous Vehicles" Ser. No. 62/611,780, filed Dec. 29, 2017. "Cognitive State Vehicle Navigation Based on Image Processing" Ser. No. 62/625,274, filed Feb. 1, 2018, "Cognitive State Based Vehicle Manipulation Using Near Infrared Image Processing" Ser. No. 62/637,567, filed Mar. 2, 2018, and "Vehicle Manipulation Using Cognitive State" Ser. No. 62/679,825, filed Jun. 3, 2018.

The U.S. patent application "Image Analysis for Emotional Metric Evaluation" Ser. No. 16/017,037, filed Jun. 25, 2018 is also a continuation-in-part of U.S. patent application "Personal Emotional Profile Generation" Ser. No. 14/328,554, filed Jul. 11, 2014, which claims the benefit of U.S. provisional patent applications "Personal Emotional Profile Generation" Ser. No. 61/844,478, filed Jul. 10, 2013, "Heart Rate Variability Evaluation for Mental State Analysis" Ser. No. 61/916,190, filed Dec. 14, 2013, "Mental State Analysis Using an Application Programming Interface" Ser. No. 61/924,252, filed Jan. 7, 2014, and "Mental State Analysis for Norm Generation" Ser. No. 61/927,481, filed Jan. 15, 2014.

The application "Personal Emotional Profile Generation" Ser. No. 14/328,554, filed Jul. 11, 2014 is also a continuation-in-part of U.S. patent application "Mental State Analysis Using Web Services" Ser. No. 13/153,745, filed Jun. 6, 2011, which claims the benefit of U.S. provisional patent applications "Mental State Analysis Through Web Based Indexing" Ser. No. 61/352,166, filed Jun. 7, 2010, "Measuring Affective Data for Web-Enabled Applications" Ser. No. 61/388,002, filed Sep. 30, 2010, "Sharing Affect Data Across a Social Network" Ser. No. 61/414,451, filed Nov. 17, 2010, "Using Affect Within a Gaming Context" Ser. No. 61/439,913, filed Feb. 6, 2011, "Recommendation and Visualization of Affect Responses to Videos" Ser. No. 61/447,089, filed Feb. 27, 2011, "Video Ranking Based on Affect" Ser. No. 61/447,464, filed Feb. 28, 2011, and "Baseline Face Analysis" Ser. No. 61/467,209, filed Mar. 24, 2011.

This application is also a continuation-in-part of U.S. patent application "Analytics for Live Streaming Based on Image Analysis within a Shared Digital Environment" Ser. No. 15/444,544, filed Feb. 28, 2017, which claims the benefit of U.S. provisional patent applications "Analytics for Live Streaming Based on Image Analysis within a Shared Digital Environment" Ser. No. 62/301,558, filed Feb. 29, 2016, "Deep Convolutional Neural Network Analysis of Images for Mental States" Ser. No. 62/370,421, filed Aug. 3, 2016, "Image Analysis Framework Using Remote Learning with Deployable Artifact" Ser. No. 62/439,928, filed Dec. 29, 2016, "Smart Toy Interaction Using Image Analysis" Ser. No. 62/442,291, filed Jan. 4, 2017, "Audio Analysis Learning Using Video Data" Ser. No. 62/442,325, filed Jan. 4, 2017, and "Vehicle Manipulation Using Occupant Image Analysis" Ser. No. 62/448,448, filed Jan. 20, 2017.

The U.S. patent application "Analytics for Live Streaming Based on Image Analysis within a Shared Digital Environment" Ser. No. 15/444,544, filed Feb. 28, 2017 is also a continuation-in-part of U.S. patent application "Mental State Event Signature Usage" Ser. No. 15/262,197, filed Sep. 12, 2016, which claims the benefit of U.S. provisional patent applications "Mental State Event Signature Usage" Ser. No. 62/217,872, filed Sep. 12, 2015, "Image Analysis In Support of Robotic Manipulation" Ser. No. 62/222,518, filed Sep. 23, 2015, "Analysis of Image Content with Associated Manipulation of Expression Presentation" Ser. No. 62/265,937, filed Dec. 10, 2015, "Image Analysis Using Sub-Sectional Component Evaluation To Augment Classifier Usage" Ser. No. 62/273,896, filed Dec. 31, 2015, "Analytics for Live Streaming Based on Image Analysis within a Shared Digital Environment" Ser. No. 62/301,558, filed Feb. 29, 2016, and "Deep Convolutional Neural Network Analysis of Images for Mental States" Ser. No. 62/370,421, filed Aug. 3, 2016.

The U.S. patent application "Mental State Event Signature Usage" Ser. No. 15/262,197, filed Sep. 12, 2016, is also a continuation-in-part of U.S. patent application "Mental State Event Definition Generation" Ser. No. 14/796,419, filed Jul. 10, 2015, which claims the benefit of U.S. provisional patent applications "Mental State Event Definition Generation" Ser. No. 62/023,800, filed Jul. 11, 2014, "Facial Tracking with Classifiers" Ser. No. 62/047,508, filed Sep. 8, 2014, "Semiconductor Based Mental State Analysis" Ser. No. 62/082,579, filed Nov. 20, 2014, and "Viewership Analysis Based On Facial Evaluation" Ser. No. 62/128,974, filed Mar. 5, 2015.

The U.S. patent application "Mental State Event Definition Generation" Ser. No. 14/796,419, filed Jul. 10, 2015 is also a continuation-in-part of U.S. patent application "Mental State Analysis Using Web Services" Ser. No. 13/153,745, filed Jun. 6, 2011, which claims the benefit of U.S. provisional patent applications "Mental State Analysis Through Web Based Indexing" Ser. No. 61/352,166, filed Jun. 7, 2010, "Measuring Affective Data for Web-Enabled Applications" Ser. No. 61/388,002, filed Sep. 30, 2010, "Sharing Affect Across a Social Network" Ser. No. 61/414,451, filed Nov. 17, 2010, "Using Affect Within a Gaming Context" Ser. No. 61/439,913, filed Feb. 6, 2011, "Recommendation and Visualization of Affect Responses to Videos" Ser. No. 61/447,089, filed Feb. 27, 2011, "Video Ranking Based on Affect" Ser. No. 61/447,464, filed Feb. 28, 2011, and "Baseline Face Analysis" Ser. No. 61/467,209, filed Mar. 24, 2011.

The U.S. patent application "Mental State Event Definition Generation" Ser. No. 14/796,419, filed Jul. 10, 2015 is also a continuation-in-part of U.S. patent application "Mental State Analysis Using an Application Programming Interface" Ser. No. 14/460,915, Aug. 15, 2014, which claims the benefit of U.S. provisional patent applications "Application Programming Interface for Mental State Analysis" Ser. No. 61/867,007, filed Aug. 16, 2013, "Mental State Analysis Using an Application Programming Interface" Ser. No. 61/924,252, filed Jan. 7, 2014, "Heart Rate Variability Evaluation for Mental State Analysis" Ser. No. 61/916,190, filed Dec. 14, 2013, "Mental State Analysis for Norm Generation" Ser. No. 61/927,481, filed Jan. 15, 2014, "Expression Analysis in Response to Mental State Express Request" Ser. No. 61/953,878, filed Mar. 16, 2014, "Background Analysis of Mental State Expressions" Ser. No. 61/972,314, filed Mar. 30, 2014, and "Mental State Event Definition Generation" Ser. No. 62/023,800, filed Jul. 11, 2014.

The U.S. patent application "Mental State Analysis Using an Application Programming Interface" Ser. No. 14/460,915, Aug. 15, 2014 is also a continuation-in-part of U.S. patent application "Mental State Analysis Using Web Services" Ser. No. 13/153,745, filed Jun. 6, 2011, which claims the benefit of U.S. provisional patent applications "Mental State Analysis Through Web Based Indexing" Ser. No. 61/352,166, filed Jun. 7, 2010, "Measuring Affective Data for Web-Enabled Applications" Ser. No. 61/388,002, filed Sep. 30, 2010, "Sharing Affect Across a Social Network" Ser. No. 61/414,451, filed Nov. 17, 2010, "Using Affect Within a Gaming Context" Ser. No. 61/439,913, filed Feb. 6, 2011, "Recommendation and Visualization of Affect Responses to Videos" Ser. No. 61/447,089, filed Feb. 27, 2011, "Video Ranking Based on Affect" Ser. No. 61/447,464, filed Feb. 28, 2011, and "Baseline Face Analysis" Ser. No. 61/467,209, filed Mar. 24, 2011.

Each of the foregoing applications is hereby incorporated by reference in its entirety.

FIELD OF ART

This application relates generally to digital analysis and more particularly to live streaming analytics within a shared digital environment.

BACKGROUND

The in-person meetings that were the mainstay of business conducted in the past have given way to videoconferences, teleconferences, and other online forums and formats. While the advantages of in-person meetings are well-known, such as the ability to give a firm handshake at the beginning and ending of a meeting, and the opportunity to look straight into the eyes of the people with whom one is meeting, the disadvantages are many and compelling. Travel can be costly and consumes valuable time that leaders, employees, students, officials, and others, can better use for far more productive purposes. The key people that are needed for a particular meeting can be far-flung across a region, a country, or around the world, so scheduling can be difficult, and travel to and from the meeting can add at least hours or even days to the time requirements. Further, travel restrictions in effect due to severe weather, political unrest, or pandemics can prevent travel of any kind.

In-person meetings quickly lose their effectiveness as the numbers of people invited to or participating in the meeting exceeds a remarkably small number such as eight participants. Getting critical information out to more people than can practically fit into a conference room is often highly desirable, and online meetings can easily accommodate tens, hundreds, thousands, or more people. Participation in online conferences and meetings has become remarkably simple. Participants are required to have access to computers such as laptops or personal electronic devices such as smartphones, tablets, or PDAs. These computers and devices typically come with a camera and a microphone, so that both meeting video and audio can be supported. To participate in a conference or meeting, the participant is usually required to download a program, app, or browser plugin before joining a conference or meeting for the first time. The required software is easily located, downloaded, and configured. The participant configures the software by providing their name and organization, and granting permission to the software to use the camera and microphone. The software is easy to use, and quickly becomes familiar and convenient. Participation in the online conferences or meetings has become commonplace and highly effective.

SUMMARY

A plurality of images is obtained from a plurality of participants involved in an interactive digital environment. The participants can include viewers or presenters of a digital event. The digital event can include a distributed digital event, where a distributed event can include a live streaming event, a concert, a live performance, an instructional presentation, an educational presentation, a comedic presentation, or a digital wedding. The plurality of images can be obtained using a variety of image capture devices including cameras. In embodiments, the plurality of images comprises a video. In other embodiments, the plurality of images comprises a plurality of videos. In further embodiments, the interactive digital environment can include a shared digital environment. Cognitive state content within the plurality of images is analyzed for the first set of participants within the plurality of participants. The first set of participants can include viewing participants. The results of the analyzing the cognitive state content within the plurality of images is provided to a second set of participants within the plurality of participants. The second set of participants can include one or more presenting participants. The analyzing can include analyzing for metrics such as cognitive state metrics, audio vocalization metrics, laughter metrics, and the like. The results of the analyzing cognitive state content are presented to a second set of participants within the plurality of participants. The second set of participants can include one or more presenting participants. The presenting can include presenting a real-time graph representation of the analyzing cognitive state content, an emoji representation of the analyzing cognitive state content, and an animation representation of the analyzing cognitive state content. The presenting can include delivering a laugh track to the plurality of participants based on a positive response from the analyzing cognitive state content.

A computer-implemented method for analysis is disclosed comprising: accessing an interactive digital environment, wherein the interactive digital environment is a shared digital environment for a plurality of participants; obtaining a plurality of images from a first set of participants within the plurality of participants involved in the interactive digital environment; analyzing cognitive state content within the plurality of images for the first set of participants within the plurality of participants; and providing results of the analyzing cognitive state content to a second set of participants within the plurality of participants. In other embodiments there is provided a computer program product embodied in a non-transitory computer readable medium for analysis, the computer program product comprising code which causes one or more processors to perform operations of: accessing an interactive digital environment, wherein the interactive digital environment is a shared digital environment for a plurality of participants; obtaining a plurality of images from a first set of participants within the plurality of participants involved in the interactive digital environment; analyzing cognitive state content within the plurality of images for the first set of participants within the plurality of participants; and providing results of the analyzing cognitive state content to a second set of participants within the plurality of participants. In some embodiments, a computer system for analysis is provided comprising: a memory which stores instructions; one or more processors coupled to the memory wherein the one or more processors, when executing the instructions which are stored, are configured to: access an interactive digital environment, wherein the interactive digital environment is a shared digital environment for a plurality of participants; obtain a plurality of images from a first set of participants within the plurality of participants involved in the interactive digital environment; analyze cognitive state content within the plurality of images for the first set of participants within the plurality of participants; and provide results of the analyzing cognitive state content to a second set of participants within the plurality of participants.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
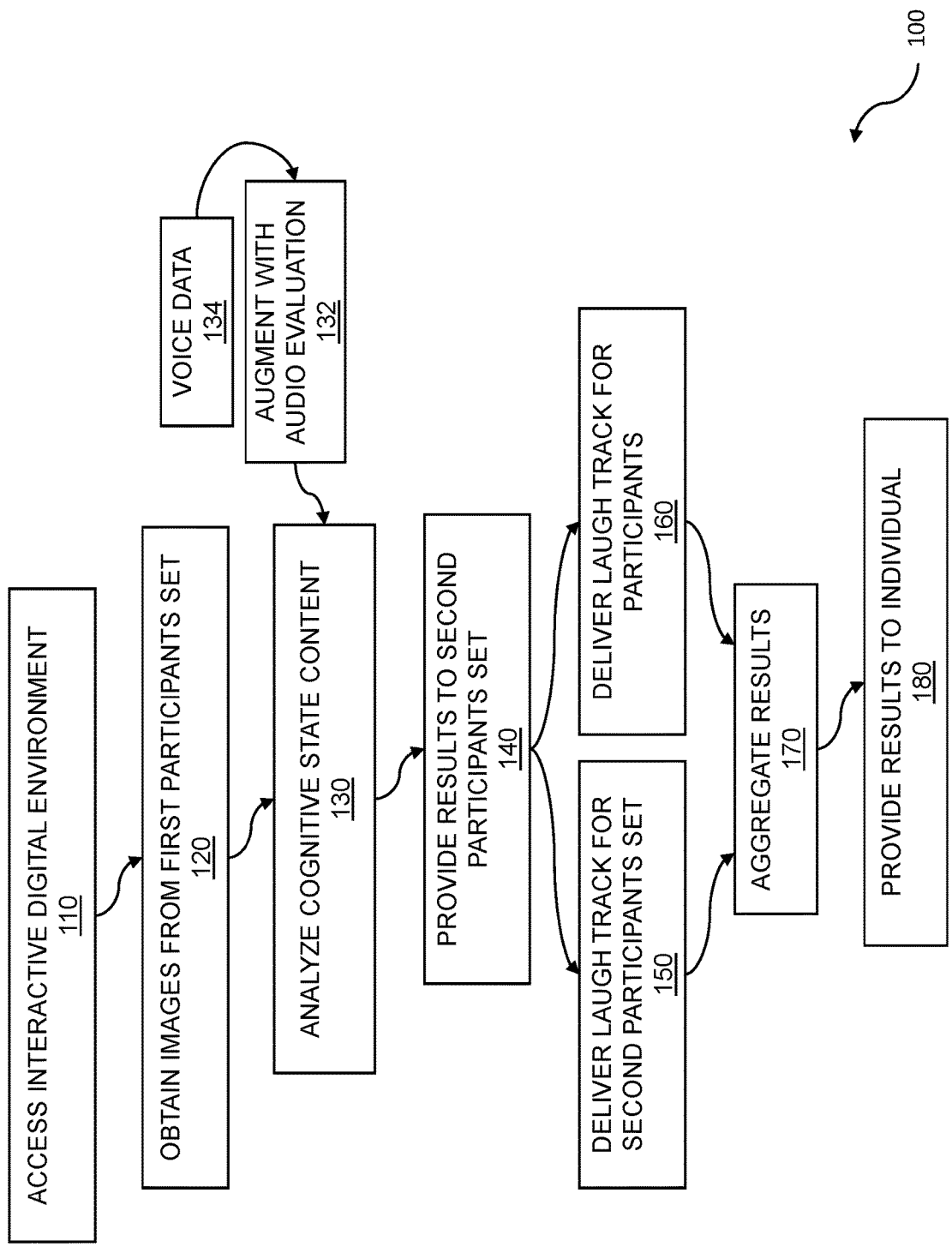
FIG. 1 is a flow diagram for live streaming analytics within a shared digital environment.

Humans are continuously experiencing their surroundings by using their senses. They observe and process environmental stimuli using sight, hearing, smell, touch, and so on. A large part of human interaction is based on observing one another's faces. As such, sight plays a fundamental role in social interaction. The ability to observe the face of another person during social interaction is critical because the human face is highly expressive. The numerous facial expressions that are exhibited range widely and can convey a person's mental or emotional state, and so on. For example, while a sultry smile communicates one message to the recipient of the smile, an angry frown communicates quite a different one. In another example, a neutral expression can indicate ennui, inattention, indifference, lassitude, and so on. The effective communication of information that is the basis of this social exchange among the participants in the interaction greatly influences how the interaction progresses. A smile may attract people to the interaction and hold their attention, while the angry frown can cause people to leave the interaction, perhaps expediently. The effective exchange or communication of information can be extended to online or virtual exchanges, such as exchanges within a shared digital environment. Effective communication within digital environments is more complicated than face to face communication since subtleties of facial expressions, body language, a "feel" of a room, and so on, do not transmit well electronically.

Cognitive state content can communicate significant information among various people participating in an interactive or shared digital environment. In embodiments, the interactive digital environment is a shared digital environment for a plurality of participants. The smile, frown, or neutral expressions mentioned above can be determined in images, videos, etc., obtained from the participants The cognitive content, which can be based on facial expressions, can communicate engagement in the interactive digital environment, displeasure or disapproval, ennui, concentration, etc. The cognitive state content can be analyzed using a variety of techniques including applying image classifiers, applying image processing algorithms and heuristics, and so on. The cognitive state content, based on the content of the face, can include analyzing emotional content of the images. The analyzing of the cognitive state content can include detection of one or more of sadness, stress, happiness, anger, frustration, confusion, disappointment, hesitation, cognitive overload, focusing, engagement, attention, boredom, exploration, confidence, trust, delight, disgust, skepticism, doubt, satisfaction, excitement, laughter, calmness, curiosity, humor, sadness, poignancy, mirth, and so on. The results of the analysis can be used for a variety of purposes including providing the results to some or all participants in an interactive digital environment. The results of the analysis can be used for providing real-time feedback to presenters, to enable participants to feel that they are part of a broader digital community, to gauge a group response to an event such as a presentation, and so on. The provided result can enrich the shared experience by enabling a presenter to know that the viewers are laughing at her jokes, that the friends of a viewer are also enjoying the shared digital experience, etc. The cognitive state content identified by the analysis can be used to focus marketing on content that can provide the biggest cognitive state, mental state, or emotional impact, for pre-populating a post to social media, etc. Emotional state, mental state, cognitive state, and so on, are terms of art which may connote slight differences of emphasis, for example an emotional state of "happiness" vs. a cognitive state of "distractedness," but at a high level, the terms can be used interchangeably. In fact, because the human mind of an individual is often difficult to understand, even for the individual, emotional, mental, and cognitive states may easily be overlapping and appropriately used in a general sense.

In disclosed techniques, an interactive digital environment is accessed, where the interactive digital environment is a shared digital environment for a plurality of participants. The participants can include presenters, viewers, gamers, and so on. A plurality of images is obtained from a first set of participants within the plurality of participants involved in the interactive digital environment. The images can be captured using a camera or other image capture device, a sensor, etc. The images can include videos, frames of a video, still images, or other image capture media. Cognitive state content is analyzed within the plurality of images for the first set of participants within the plurality of participants. The analyzing cognitive state content can include identifying facial expressions within the images, determining audio data such as voice data and vocalizations data, and the like. Facial expressions can be determined by analyzing regions or landmarks within the face. Analysis of the facial expressions or the audio data can be based on applying video classifiers, audio classifiers, etc.

The interactive digital environment can be a shared digital environment for the plurality of participants, and the interactive digital environment can include a webinar, a distributed digital event such as an online event, and so on. In embodiments, the distributed digital event can include a live streaming event, a concert, a live performance, an instructional presentation, an educational presentation, a comedic presentation, or a digital wedding. The results of the analyzing cognitive state content can be provided to a second set of participants within the plurality of participants. The providing can include providing a graphical display, an emoji, an animation, a laugh track, etc. In embodiments, the results can include a real-time graph representation of the analyzing cognitive state content.

FIG. 1 is a flow diagram for live streaming analytics within a shared digital environment. In embodiments, the shared digital environment includes an interactive digital environment, where the interactive digital environment comprises a distributed digital event. The participants can include presenters and viewers. The distributed digital event can include a live streaming event, a concert, a live performance, an instructional presentation, an educational presentation, a comedic presentation, or a digital wedding. The flow 100 includes accessing an interactive digital environment 110, where the interactive digital environment is a shared digital environment for a plurality of participants. The shared digital environment can include a forum for discussion, a presentation space, a competition space, and so on. In embodiments, the interactive digital environment includes a video conference. The participants within the shared digital environment can include two participants, tens of participants, hundreds or thousands of participants, etc. The participants can include presenters of digital content and consumers of digital content. The interactive digital environment can be a social media website. Participants in the shared digital environment can share digital content, can view digital content, can exchange digital content, and so on. The shared digital environment can be accessible through a computer such as a laptop computer, a personal electronic device such as a smartphone, tablet, or PDA, and the like. The interactive digital environment can include a digital game. The digital game can be accessible through a website, a game console, a computer, a personal digital device, and so on. The interactive digital environment can include a competitive digital game. The interactive digital environment can include a digital game in which two or more players can participate. In addition to the participants, others can view the players as they engage in the digital game.

The flow 100 includes obtaining a plurality of images from a first set of participants 120 within the plurality of participants involved in the interactive digital environment. The images can be obtained from a single participant. The plurality of participants within the first set of participants can include presenters, viewers, facilitators, students, players, and so on. Regarding the obtained images, the image of an individual (participant) can be captured with a camera, where the camera can be any of a variety of cameras. A camera can include a webcam, a video camera, a still camera, a thermal imager, a CCD device, a smartphone camera, a three-dimensional camera, a depth camera, a light field camera, a plenoptic camera, multiple webcams used to show views of a person from different angles, or any other type of image capture apparatus that can allow captured data to be used in an electronic system. The image can be a still image, a frame from a video, a video, and so on. The image can be one image from a series of images of the individual. The series of images can include a video of the individual. The plurality of images can include a video, a series of images, a video clip, live-streamed video, and so on. The plurality of images can include a plurality of videos. The videos can be obtained from an individual participant in the interactive digital environment, from a plurality of participants in the interactive digital environment, etc.

The flow 100 continues with analyzing cognitive state content 130 within the plurality of images for the first set of participants within the plurality of participants. In embodiments, the first set of participants includes viewing participants. The flow 100 may include augmenting the analyzing cognitive state content with evaluation of audio information 132. Thus, embodiments can include augmenting the analyzing of cognitive state content, within the plurality of images, with evaluation of audio information. The augmenting with audio evaluation 132 can further refine the analysis of cognitive state content for the first set of participants 120. In embodiments, the audio evaluation can provide additional context information. For example, detecting shifting in chairs or shuffling of feet can indicate a lack of engagement. Additionally, tones, or voice can indicate a sentiment such as excitement, anger, or surprise. Thus in the flow 100, the audio information include voice data 134. Cognitive states such as engagement or distractedness can be detected by audio information such as tone and volume. Additionally, the audio evaluation can include language content. For example, a speech-to-text process may be performed to determine if certain keywords are uttered by the participant. The keywords can be used to further analyze the cognitive state content. For example, if a participant says the word "amazing" then it may be indicative of a cognitive state of engagement or an emotion of amazement. Thus, in embodiments, the audio information includes voice data. The audio information can further include vocalizations. The vocalizations can include grunts, groans, sighs, yawns, etc. The vocalization can be used to further refine analysis of cognitive state content. In other embodiments, the obtaining and the analyzing are based on an opt-in or an opt-out selection provided by a participant. That is, a participant can elect or "opt-in" to participating in the collection of cognitive state data or can opt-out. The opting-out can prevent collection of image data, audio data, vocalization data, etc. In further embodiments, the obtaining and the analyzing are accomplished on a device local to a participant such that images of the first set of participants are not transmitted to a non-local device. Thus, any collection of images or audio data is processed on a computer or personal electronic device associated with the participant. The participant need not worry that her or his image data or audio data is being collected, stored, or analyzed at a remote location. Rather, all image data and audio data remains local to the participant.

Discussed below and throughout, the analysis can include determining one or more metrics. Embodiments can include calculating a facial expression metric as part of the analyzing. The facial expression metric can include an intensity of a facial expression, a duration of a facial expression, an onset or decay of a facial expression, and so on. Embodiments include generating a cognitive state metric as part of the analyzing, based on the facial expression metric. Other metrics can be based on the audio data. The other metrics can be based on voice data within the audio data. In embodiments, the voice data enables audio vocalization metrics. The flow 100 continues with providing results of the analyzing cognitive state content to a second set of participants 140 within the plurality of participants. In embodiments, the second set of participants comprises one or more presenting participants. The second set of participants thus is provided with an indication of cognitive state content corresponding to the first set of participants. In other embodiments, the second set of participants includes viewing participants and one or more presenting participants. The numbers of participants with the subsets of participants need not be equal. In embodiments, the second set of participants includes a greater number of viewing participants than are contained in the first set. In a usage example, the first set of participants may be viewers and the second set of participants may be presenters or presenters and viewers. In another example, the first set of participants may be viewers who have opted-in, which is less than the total number of participants. However, all participants, or another subset thereof, may be provided results, even though the results are derived from only the first subset. Other embodiments include including the cognitive state metric in the providing.

Returning briefly to metrics, the voice data, audio data, vocalization data, and so on, can be used to calculate further metrics. In embodiments, the audio vocalization metrics discussed above include a laughter metric. The laughter metric can be based on the presence or absence of laughter, an intensity of a laugh from a giggle or chuckle to a "belly" laugh, and so on. The laughter metric can be including in the presenting. The flow 100 includes delivering a laugh track to the second set of participants 150 based on a positive response from the analyzing cognitive state content. Thus, a presenter can learn whether her or his witty comments or jokes elicit laughs from the viewers or not. Since presenters draw energy from the reactions of the audience to a presentation, the providing a laughter metric can provide desired feedback. This providing is particularly useful with the presenter is located remotely from the viewers, is perhaps alone in a room while presenting, and so on. The flow 100 further includes delivering a laugh track to the plurality of participants 160 based on a positive response from the analyzing cognitive state content. The participants can include the first subset, the second subset, all participants, and so on. The providing the laugh track to the participants can provide a sense among the participants of belonging to the shared digital environment. That is, a participant's friends can be laughing along with the participant to the same jokes, pratfalls, and so on. The experience of viewing a presentation without a laugh track is far different from viewing the same presentation that includes a laugh track. The analyzing can include reactions of participants to the laugh tracks.

The flow 100 includes aggregating 170 to enable the providing results. In embodiments, the analyzing the cognitive state content is based on the augmenting. The augmenting can include adding the laugh track, providing a graphical display, choosing an emoji, GIF, animated GIF, etc. The aggregating can include analyzing further cognitive state content and determining further metrics such as cognitive state metrics, vocalization metrics, and the like. The flow 100 includes presenting results of the aggregating to an individual 180 within the plurality of participants. The individual can be a presenter, a viewer, a judge or referee, a player, a manager, and so on. The presenting can be accomplished using a variety of techniques. The presenting results can include a real-time graph representation of the analyzing cognitive state content. The graph can include showing an intensity of a cognitive state over time. In other embodiments, the results can include an emoji representation of the analyzing cognitive state content. The emoji can represent aggregated cognitive state content across a plurality of participants, emoji representing cognitive state content for individuals, etc. In other embodiments, the results can include an animation representation of the analyzing cognitive state content. The animation can include an animated GIF. The animation can include clapping, laughing, frowning, booing, etc.

Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors. Various embodiments of the flow, or portions thereof, 100 can be included on a semiconductor chip and implemented in special purpose logic, programmable logic, and so on.

Figure 2:
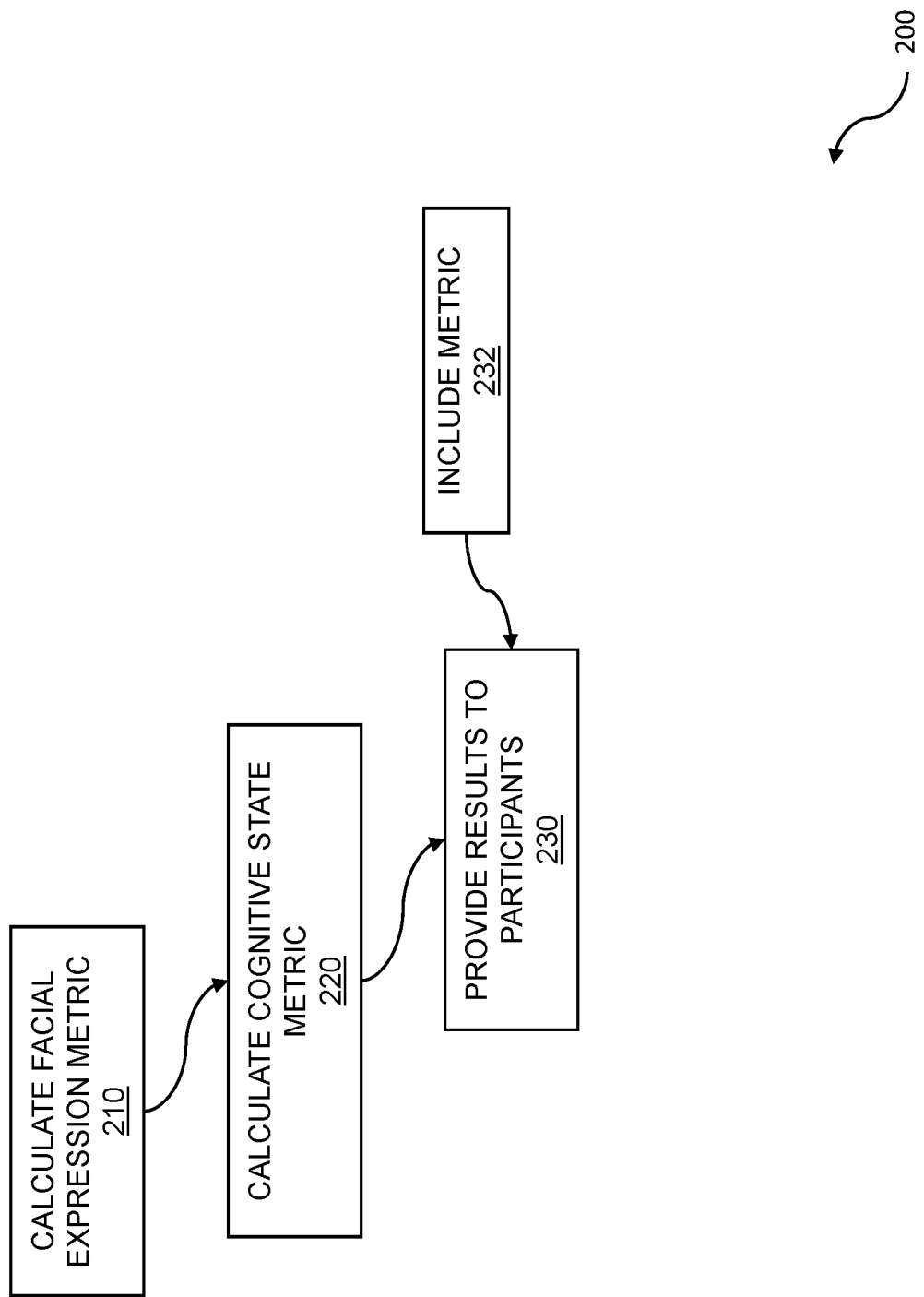
FIG. 2 is a flow diagram for providing cognitive state content.

FIG. 2 is a flow diagram for providing cognitive state content. Discussed throughout, live streaming analytics can be based on the presence or absence of a cognitive state, an intensity or duration of the cognitive state, a cognitive state exceeding a threshold, and so on. Images can be obtained from a first set of participants within a plurality of participants involved in an interactive digital environment, and cognitive state content can be analyzed within the images. The results of the analyzing cognitive state content can be provided to a second set of participants within the plurality of participants. The participants within the shared digital environment can include presenters, viewers, gamers, and so on. The flow 200 includes calculating a facial expression metric 210 as part of the analyzing. Recall that the analyzing includes analyzing cognitive state content (discussed below) within the plurality of images for the first set of participants within the plurality of participants. The facial expression can include a smile, a frown, a smirk, a neutral expression, and so on. The facial expression can be determined using a system such as the facial action coding system (FACS) described below. A facial expression such as a smile can be coded based on an intensity, a speed of onset or decay, a duration, etc. A metric associated with the facial expression can be calculated, where the metric can include a value, a percentage, and the like. The metric can be calculated based on exceeding a threshold. Other metrics, such as audio vocalization metrics can also be calculated. The vocalization metric can include a laughter metric laughter metrics, a groan metric, a sigh metric, a yawn metric, and so on.

The flow 200 includes calculating a cognitive state metric 220 as part of the analyzing, based on the facial expression metric. Discussed throughout, a cognitive state metric, like a facial expression metric or vocalization metric, can be based on an intensity, a presence or absence, a duration, onset, or decay, and so on. The cognitive state metric can be based on a variety of cognitive states such as engagement, distractedness, focus, concentration, ennui or boredom, drowsiness, and the like. The flow 200 includes providing results of analyzing cognitive state content of images to participants 230 within a shared digital environment. The participants can include a first set of participants within the plurality of participants, a second set of participants within the plurality of participants, and so on. The participants can include presenters, viewers, gamers, and further participants assuming roles within the shared digital environment. The providing can include providing an emoji, an animation such as an animated GIF, a laugh track, etc. The flow 200 includes including the cognitive state metric 232 in the providing. The cognitive state metric can be provided to a number of participants, to presenters only, to viewers only, and so on. The cognitive state metric can include an ideogram or a pictogram (e.g. emoji), a value, an animation, a graph of the cognitive state metric plotted versus time, etc.

Figure 3:
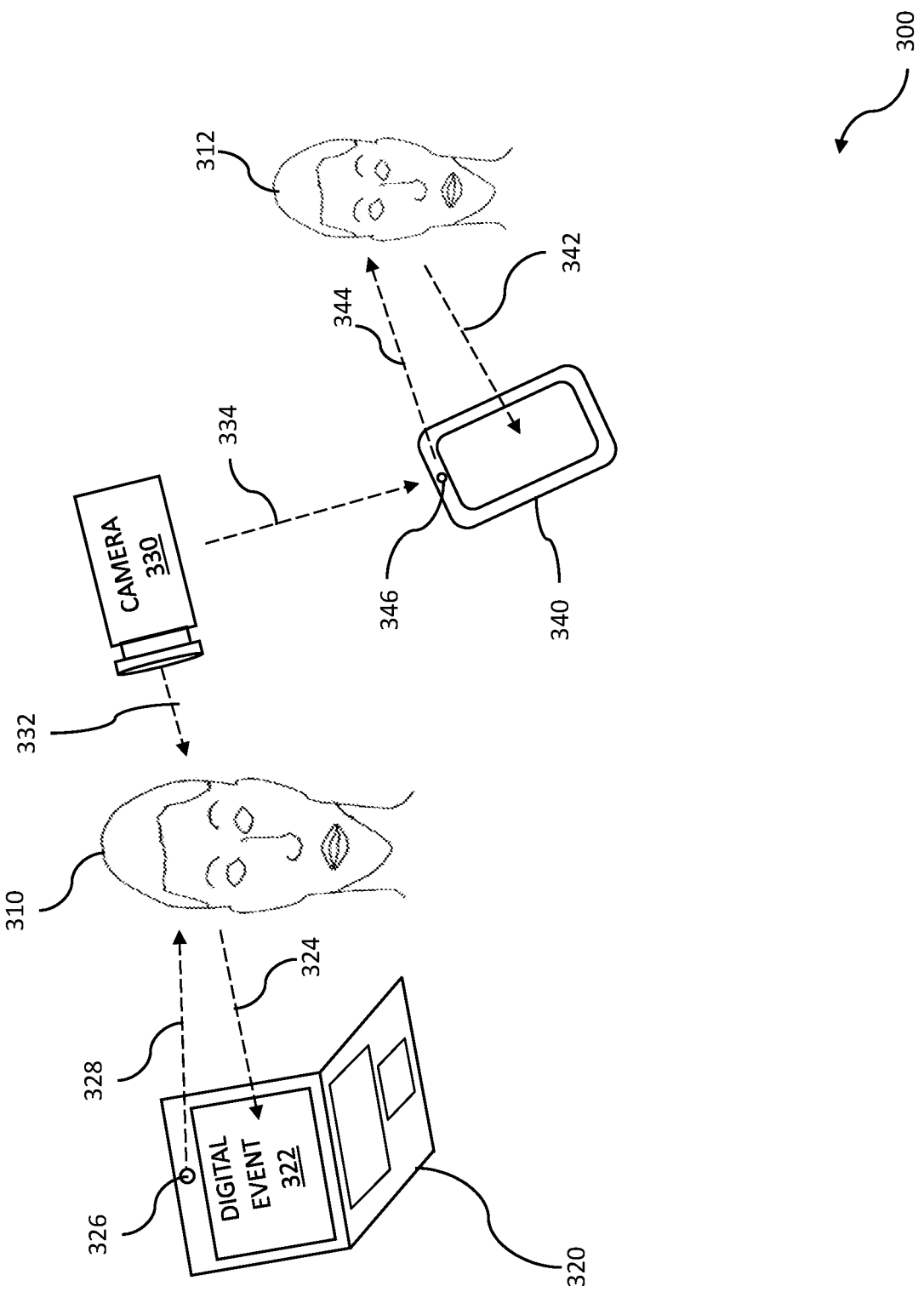
FIG. 3 is a diagram showing presenter and viewer interaction.

FIG. 3 is a diagram showing presenter and viewer interaction 300. A presenter and a viewer can engage in a digital event within a share digital environment. The digital event can include a webcast, where the webcast can be presented using live streaming techniques. In embodiments, live streaming analytics are provided within a shared digital environment. Video of a presenter 310 involved in an interactive digital environment including a webcast can be live streamed to a viewer 312. The presenter 310 has a line of sight 324 to a digital event 322 rendered on a display 320. The digital event can include a distributed digital event, where the distributed digital event can include a live streaming event, a concert, a live performance, an instructional presentation, an educational presentation, a comedic presentation, or digital wedding, a digital reception, and so on. A plurality of images can be obtained from the participant engaging in an interactive digital environment using an integrated user-facing camera 326 or a standalone user-facing camera 330. The camera 330 has a line of sight 332 to the participant 310. The camera 326 has line of sight 328 to the participant 310.

The cameras 326 and/or 330 can be any of a variety of cameras. A camera can include a webcam, a video camera, a still camera, a thermal imager, a CCD device, a phone camera, a three-dimensional camera, a depth camera, a light field camera, multiple webcams used to show different views of a person from different angles, or any other type of image capture apparatus that can allow captured data to be used in an electronic system. The image can be a still image, a frame from a video, a video, and so on. The image can be one image from a series of images of the individual. The series of images can include a video of the individual. Cognitive state, mental state, emotional content, mood, and so on can be analyzed within the plurality of images for the participant 310. The results of the analyzing of the cognitive state within the plurality of images can be provided 334 (e.g. via a network communication protocol) to a set of participants within the larger group of participants. The results of the analyzing of the cognitive state can be provided to viewers of the interactive digital environment. A viewer 312 has a line of sight 342 to a screen on a device 340. The device can be a handheld device, a portable device, a laptop computer, a television screen, etc. A camera 346 coupled to the device 340 can have a line of sight 344 to the viewer 312, and can be used for obtaining a plurality of images from the viewer 312. The cognitive state within the images of the viewer 312 can be shared with participants, presenters, viewers, and so on. The cognitive state, which can be based on results of analysis of the images, can include an emoji representation of the analyzing cognitive state content. In other embodiments, the results can include an animation representation of the analyzing cognitive state content, a GIF, an animated GIF, and the like.

Figure 4:
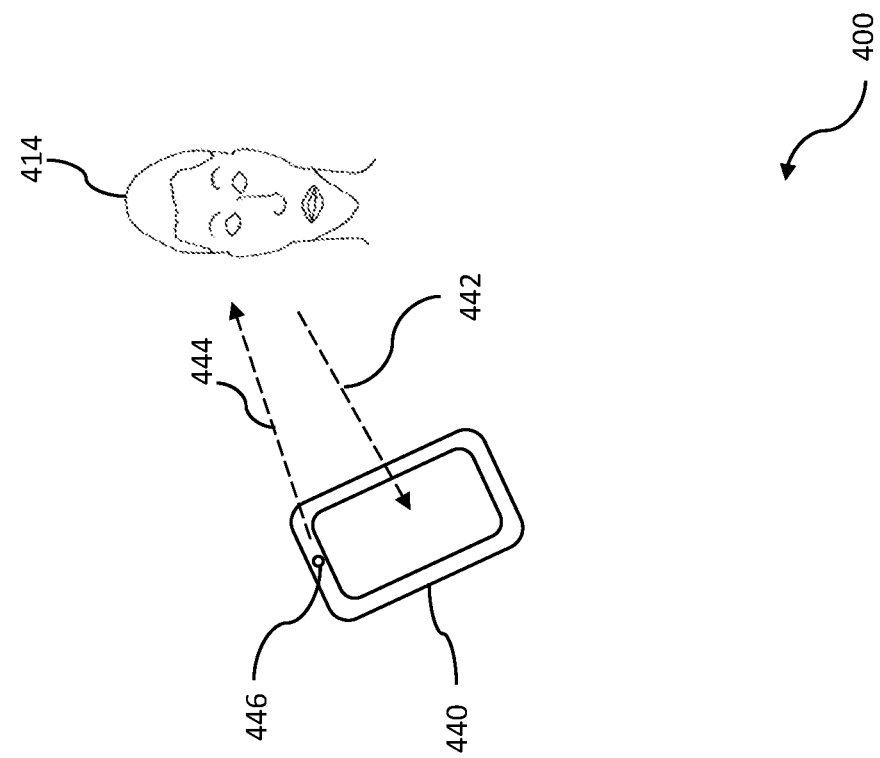
FIG. 4 illustrates two presenters as well as a viewer among participants.
Figure 4:
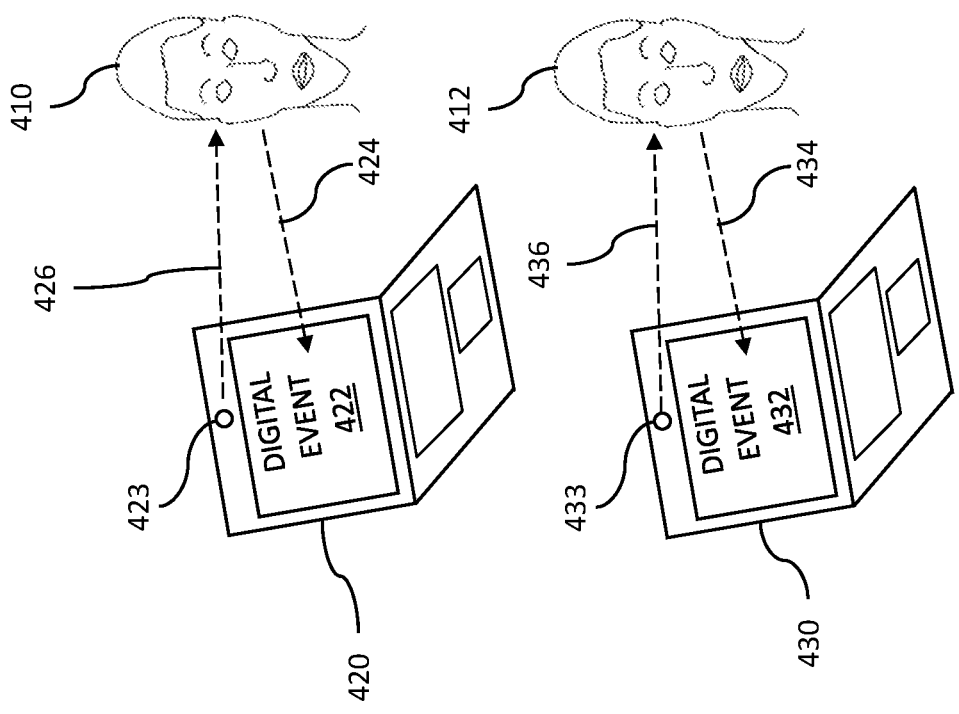

FIG. 4 illustrates two presenters as well as a viewer among participants. Presenters and viewers can participate in digital events within a shared digital environment. The digital events can include live streaming events such as video streams, webinars, educational presentations, games, and so on. Images of the participants (the presenters and the viewers) can be analyzed for the cognitive states experienced by the participants. The results of the analysis, which can include analytics associated with the live stream, can be provided to the participants. In the example 400, a first participant 410 and a second participant 412 are presenters. The participant 410 has a line of sight 424 to a digital event 422 rendered on a display 420. The digital event can include a live streaming event, a concert, a live performance, an instructional presentation, an educational presentation, a comedic presentation, or a digital wedding. The digital event can include a video game, a competitive video game, and so on. A plurality of images can be obtained from the participant involved in an interactive digital environment using an integrated user-facing camera 423. The camera 423 has a line of sight 426 to the participant 410. Similarly, participant 412 has a line of sight 434 to a digital event 432 rendered on a display 430. In this example, the participant 412 is a presenter. A plurality of images can be obtained from the participant involved in an interactive digital environment using an integrated user-facing camera 433. The camera 433 has a line of sight 436 to the participant 412. In embodiments, the participants 410 and 412 are both presenters within the digital event. In some embodiments, the rendering on display 420 and display 430 may be identical. In other embodiments, the rendering on display 420 and 430 may be different.

A third participant 414 can be a viewer, watching the digital event presented by participant 410 and participant 412 on an electronic device 440. The viewer has a line of sight 442 to the electronic device 440. The electronic device 440 may have a user-facing camera 446. The camera 446 has a line of sight 444 to the participant 414. In embodiments, the cognitive state of each participant may be computed by analyzing one or more images from the corresponding user-facing camera of each viewer. Additionally, audio information may be used to augment the emotional state analysis. In embodiments, the cognitive state indication can be a graphical element, such as an emotion meter, and emoji, a GIF, and animation, etc. Thus, each participant can get an indication of what cognitive states are being experienced by the other participant, the viewer, and so on. In some embodiments, the viewer (participant 414) can receive an indication of what cognitive states are being experienced by the presenters. In embodiments, there may be an emotion meter rendered for each presenter of the presentation the viewer is watching. In embodiments, the cognitive state of the viewer may be presented to presenters such as participant 410 and/or participant 412. In this way, the presenters can receive information about the cognitive, mental, or emotional state, a mood, and/or engagement of the viewer.

Figure 5:
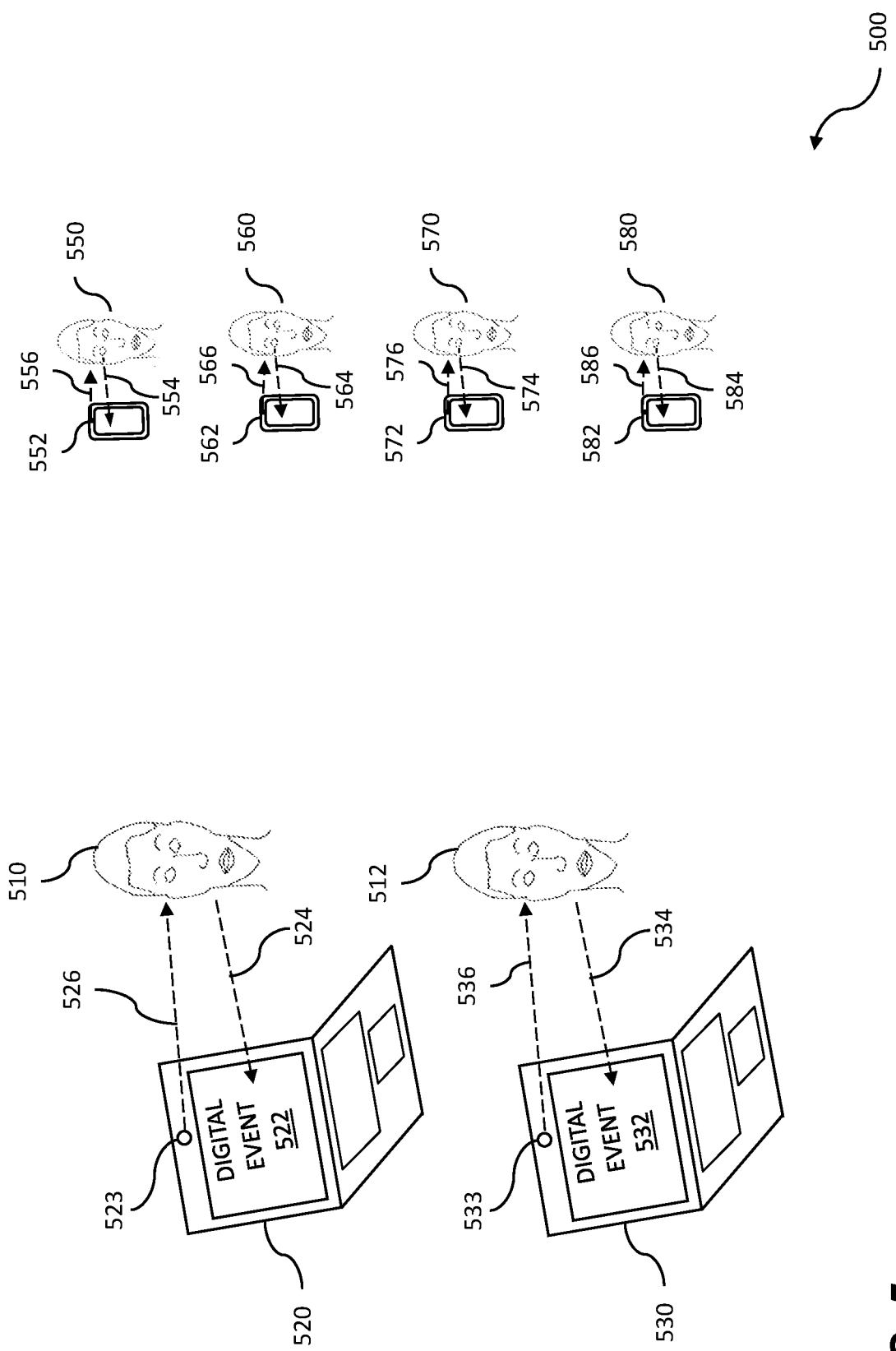
FIG. 5 shows two presenters and multiple viewers.

FIG. 5 shows an example 500 with two presenters and multiple viewers. The presenters and the multiple viewers can be engaging in a digital event within a shared digital environment. Live stream analytics can be provided to participants within the shared digital environment. In the example 500, a first presenter 510 and a second presenter 512 can present a webcast, a webinar, an online class, and the like. Participants 550, 560, 570, and 580 are viewers. The presenter 510 has a line of sight 524 to a digital event 522 rendered on a display 520. The digital event can be a video game, a competitive video game, and so on. A plurality of images can be obtained from the presenter involved in an interactive digital environment using an integrated user-facing camera 523. The camera 523 has a line of sight 526 to the presenter 510. Similarly, presenter 512 has a line of sight 534 to a digital presentation 532 rendered on a display 530. A plurality of images can be obtained from the presenter involved in an interactive digital environment using an integrated user-facing camera 533. The camera 533 has a line of sight 536 to the presenter 512. In embodiments, the presenter 510 and 512 are both participating in the same digital event. Hence, in embodiments, digital event 522 and digital event 532 can be the same digital event. In some embodiments, the rendering on display 520 and display 530 can be identical. In other embodiments, the rendering on display 520 and 530 can be different. For example, the two presenters could be presenting invited talks, participating in a panel discussion, etc.

Participant 550 is a viewer that is viewing the digital event including presenter 510 and presenter 512. Participant 550 has a line of sight 554 to electronic device 552. Electronic device 552 includes a camera, which has line of sight 556 to the participant 550. Similarly, participant 560 has a line of sight 564 to electronic device 562. Electronic device 562 includes a camera, which has line of sight 566 to the participant 560. Similarly, participant 570 has a line of sight 574 to electronic device 572. Electronic device 572 includes a camera, which has line of sight 576 to the participant 570. Likewise, participant 580 has a line of sight 584 to electronic device 582. Electronic device 582 includes a camera, which has line of sight 586 to the participant 580. In embodiments, each participant or viewer (550, 560, 570, and 580) may have their cognitive, mental, or emotional state determined by images acquired by their respective user-facing cameras. Additionally, audio information from a microphone (not shown) may be used to further enhance and refine the cognitive state analysis. In embodiments, the cognitive state of each viewer may be averaged or otherwise combined to form an aggregate cognitive state, representative of a collective cognitive state of the viewers. The aggregate cognitive state may be presented to presenter 510 and presenter 512, so that the presenters can receive an indication of the overall cognitive state of the "crowd" that includes the plurality of viewers (550, 560, 570, and 580). In this way, the presenters (510, 512) can make modifications to digital event in response to the determined cognitive state of the crowd. For example, if the crowd seems disengaged, the presenters (510, and 512) can make changes to the digital event to make it more interesting (e.g. move more quickly or tell more jokes). Similarly, each viewer can receive an indication of the cognitive state of the presenter to get a sense of what each presenter is currently feeling, which can add a level of excitement/interest to watching the digital event. Each of the participants 550, 560, 570, and 580 may have a choice to opt-in or opt-out of the cognitive state data collection. In embodiments, the participants 550, 560, 570, and 580 have their cognitive state data collected and processed on devices 552, 562, 572, and 582, respectively, so that any image, audio, or other data collected does not get transmitted to any device or node beyond the participants' own device, thus insuring privacy for sensitive cognitive state data and allowing only a summary cognitive state or cognitive state metric to be transmitted.

Figure 6:
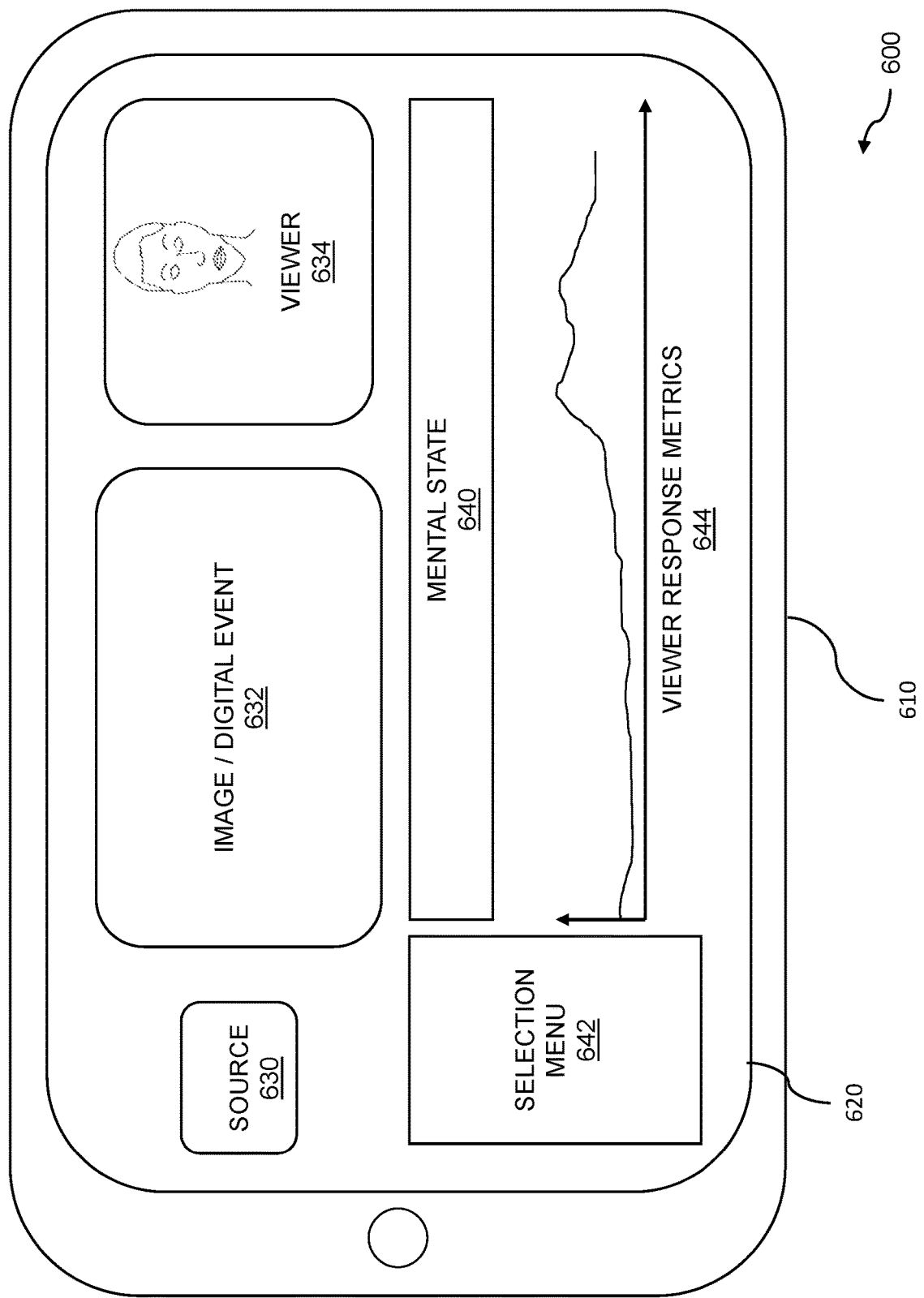
FIG. 6 illustrates viewer responses to digital events.

FIG. 6 illustrates viewer responses to digital events 600. A viewer can interact with a digital event such as a presentation, a webinar, an online course, and so on. The interaction can take place within a shared digital environment. The shared digital environment can enable viewers and presenters to interact with each other. The interactions can be passive ones in which viewers watch and react to a digital event such as a presentation. The interactions can be more participatory, such as sharing a spontaneous reaction to the digital event such as a laugh, a groan, a sigh, and so on. The responses can also include feedback from the viewers to the presenters such as video feeds, text messages (SMS), and the like. Viewer responses can be analyzed, where the analysis enables live streaming analytics within the shared digital environment. An electronic device 610 includes a display, which includes a user interface 620. The user interface may be part of a digital environment research tool, where the research can be associated with a presentation, a webinar, a game, and so on. The user interface may include a rendering of digital event 632 and/or images pertaining to the digital event. The user interface may include a source 630. A source can be a live stream of a digital event such as a video game competition, a "highlights reel" of news and events, a suggested video presented to the viewer, based on a viewer's past viewing preferences or their emotional responses to similar video content, and so on. The video, image, event, competition, etc. can be displayed in a dashboard or other rendering technique, along with images of viewers, statistics for an individual viewer, aggregated viewer responses, and so on. In embodiments, the user may be able to select a source from amongst a plurality of different sources. In embodiments, the different sources represent different games, webinars, presentations, chat rooms, on-line video conferences, etc.

The user interface 620 may include a selection menu 642. The selection menu 642 can enable filtering of the source information. In embodiments, the selection menu 642 can include demographics information. Selection options from selection menu 642 may include, but are not limited to, participant type (viewer or presenter), age group (e.g. less than 18 years old, 18 to 34 years old, 35 to 49 years old, and 50 years or older), skill level (e.g. novice, intermediate, master), and/or geographic location (e.g. North America, Asia, Europe, etc.). An image of a person can be shown, where the person can be a viewer 634 or presenter in a digital event. The image of the person can be a still image, a video, a video clip, a highlights reel, etc. The image of the person can be an avatar, an emoji, an animation, etc. The image of the person or avatar can change based on the person's cognitive state, mental state, emotional state, mood, and the like. The digital environment can be part of a virtual reality environment. The digital environment can be part of an augmented reality environment. In embodiments, the digital environment can be modified based on the detected emotional state of a player. For example, if a participant seems bored while participating in the digital event, the digital event can be modified to make the event more appealing to the person.

The user interface may include a plurality of thumbnails 640. The thumbnails can include images of participants in a digital event. The participants can be viewers and/or presenters. In some embodiments, a user of the electronic device 610 can select a thumbnail to display in the window allocated for participant 634, which enables getting a closer look at a participant. The user interface 620 may include a viewer response graph 644. The viewer response graph 644 may show an emotional response as a function of time. The emotional response can be for an individual, or a collective emotional response of a group of people. In embodiments, the emotional response can be for one or more presenters, one or more viewers, or a collective emotional response of a group that includes both presenters and viewers. The user interface 620 provides useful analytical information about the engagement level of a digital event within a shared digital environment. The engagement level can be a useful tool in determining appropriate advertising rates, fees, and/or content licensing fees.

Figure 7A:
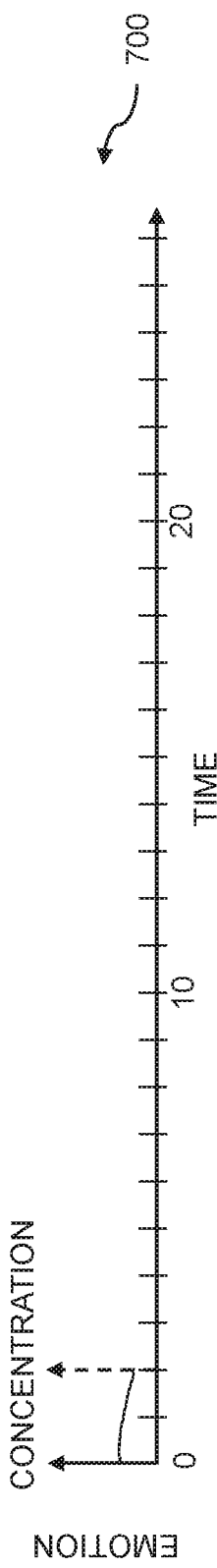
FIG. 7A shows an example of emotional states as a function of time.
Figure 7B:
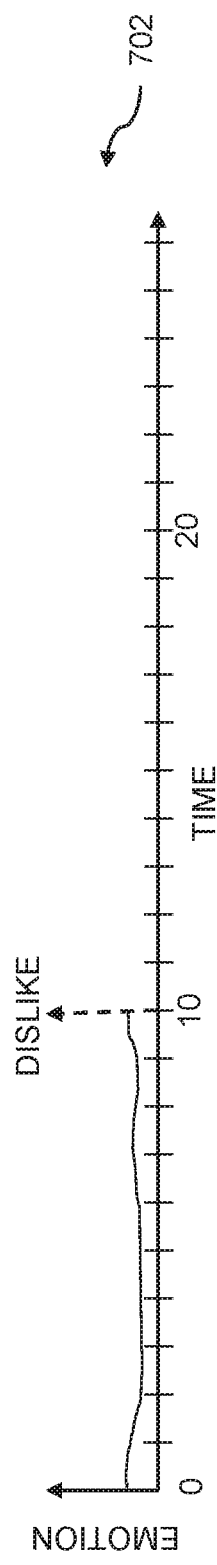
FIG. 7B shows another example of emotional states as a function of time.
Figure 7C:
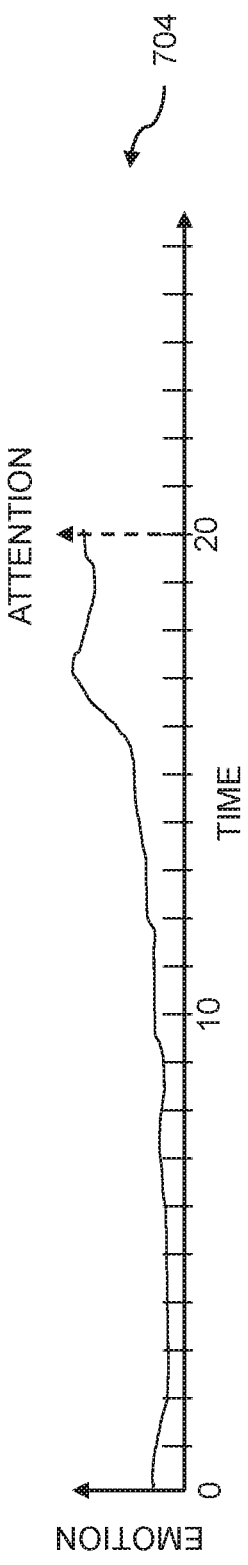
FIG. 7C shows still another example of emotional states as a function of time.

FIGS. 7A-7C show examples of emotional states as a function of time. States associated with a participant of an interactive digital environment can include cognitive states, mental states, moods, emotional states, and so on. The states can vary over time as a participant interacts with digital events within the shared digital environment. The emotional states can be based on live streaming analytics within the shared digital environment. FIG. 7A shows an emotional state graph 700 until a time of two seconds (t=2). FIG. 7B shows an emotional state graph 702 until a time of ten seconds (t=10). FIG. 7C shows an emotional state graph 704 until a time of 20 seconds (t=20). Thus, the horizontal axis of each emotional state graph represents time (e.g. in seconds, minutes, or other appropriate time unit). The vertical axis of each emotional state graph represents an emotion intensity. The emotion intensity can be based on action units, image classifiers, shape analysis, audio information, and/or other suitable sources. The emotional state graphs can be used to correlate with particular periods of game play to determine game scenarios that are associated with a particular emotional state (e.g. surprise, anguish, drowsiness, etc.). In this way, information can be gathered about what parts of a digital event are effective in engagement with viewers, and/or which presenters successfully engage viewers, and other valuable metrics and analytics for identifying valuable digital content.

Figure 8:
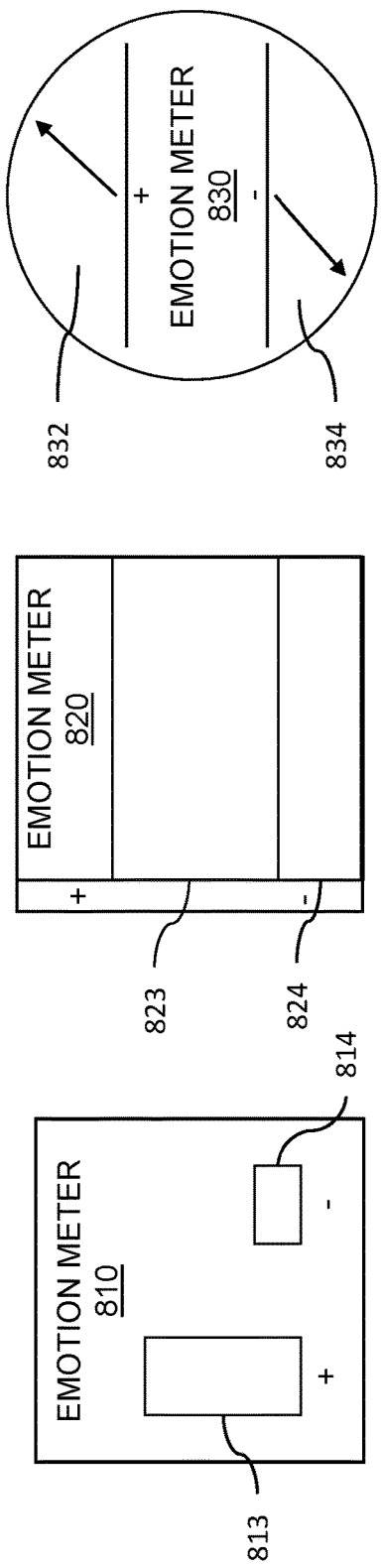
FIG. 8 shows various emotion meters.
Figure 8:
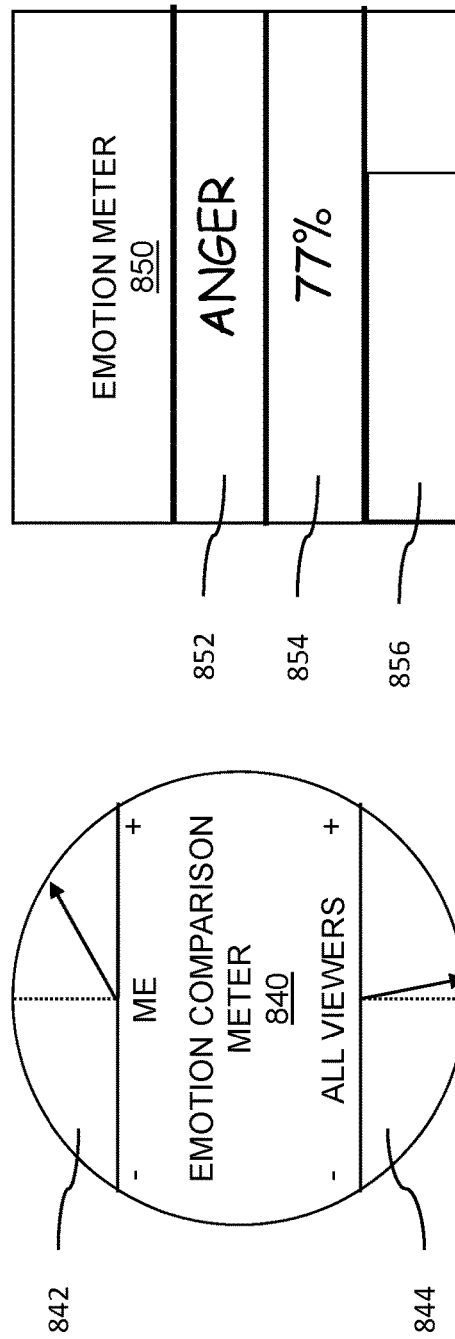
Figure 8:
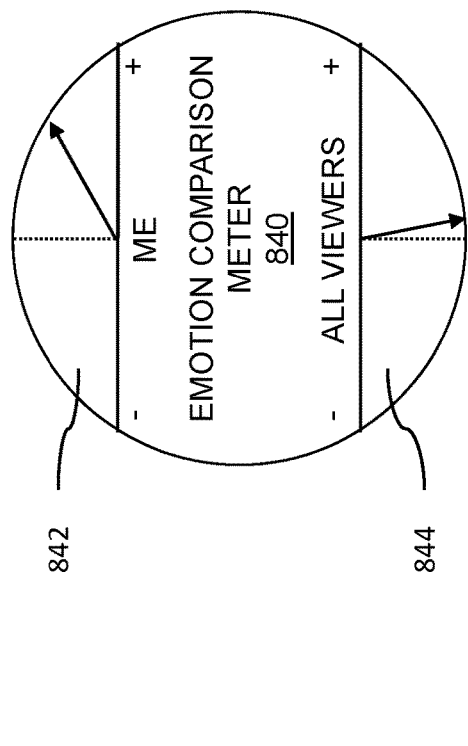

FIG. 8 shows various emotion meters that can be used in disclosed embodiments. The emotion meters can enable live streaming analytics within a shared digital environment. Emotion meter 810 is a bar graph style emotion meter with a bar 813 for positive sentiment (emotion) and a bar 814 for negative sentiment. Emotion meter 820 is a stacked bar graph style emotion meter with a bar 823 for positive sentiment and a bar 824 for negative sentiment. Emotion meter 830 is a gauge style emotion meter with a gauge 832 for positive sentiment and a gauge 834 for negative sentiment. Emotion comparison meter 840 indicates sentiment for both an individual and a crowd. The gauge 842 indicates sentiment for an individual and the gauge 844 indicates sentiment for the crowd. Emotion meter 850 comprises an emotion identification field 852 that displays a detected emotion, a numerical emotion intensity field 854 that displays a numerical intensity of the emotion shown in field 852, and a graphical representation of the emotion intensity 856. These emotion meters are merely exemplary, and other emotion, or cognitive state, meters are possible for use in disclosed embodiments.

Figure 9:
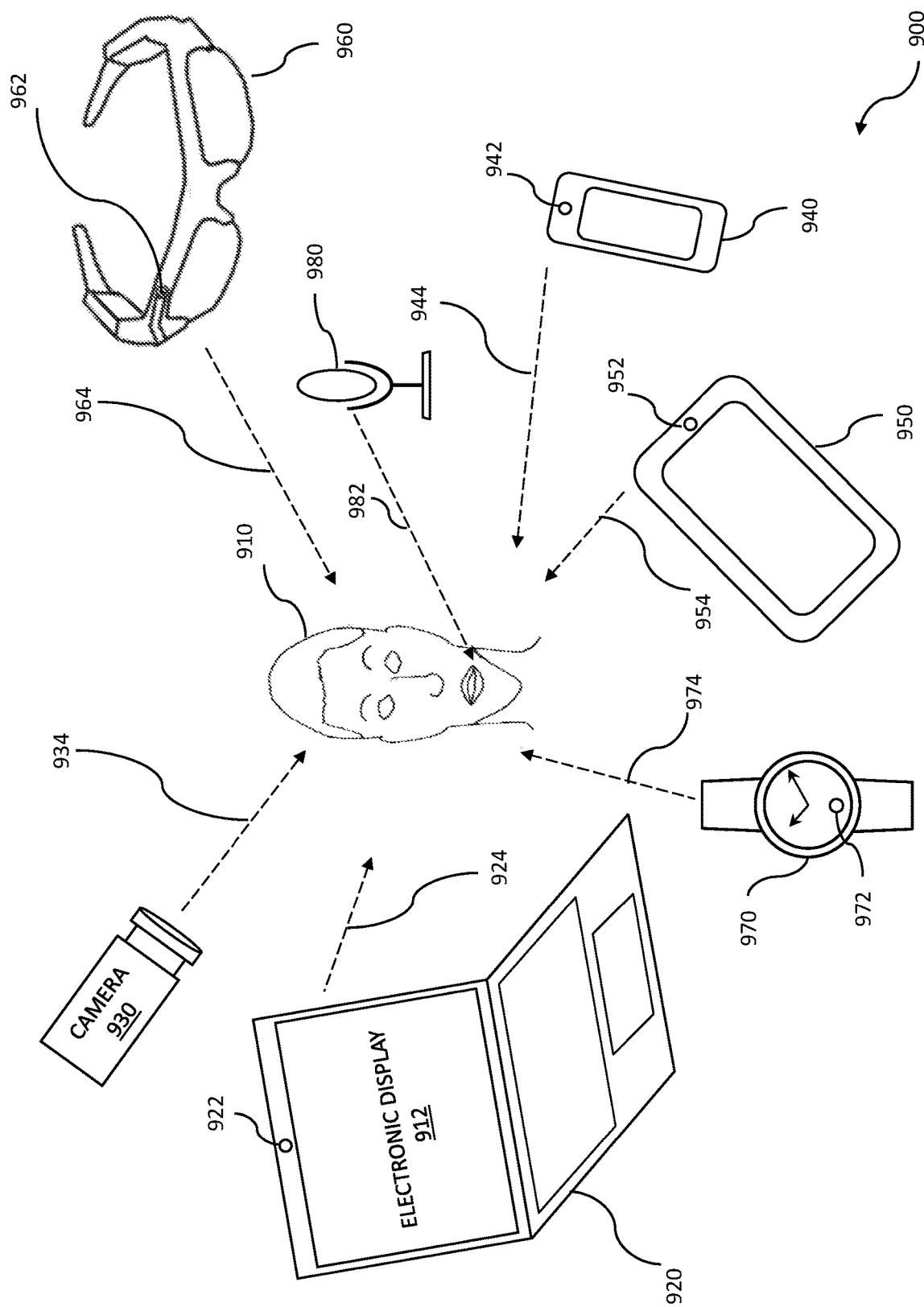
FIG. 9 is a diagram showing image and audio collection including multiple mobile devices.

FIG. 9 is a diagram showing image and audio collection including multiple mobile devices. Cognitive state data including image data, audio data, and physiological data, can be collected using multiple mobile devices. The collected cognitive state data can be used for live streaming analytics within a shared digital environment. A plurality of images is collected of a vehicle occupant. The images can include facial data, torso data, and so on. Audio data and physiological data can also be collected. A cognitive state is analyzed based on the collected images. A profile for the vehicle occupant is generated based on the cognitive state that was analyzed. Behavior is modified for a vehicle used in a subsequent driving segment. While one person is shown, in practice the video data or audio data on any number of people can be collected. In the diagram 900, the multiple mobile devices can be used separately or in combination to collect video data, audio data, physiological data, or some or all of video data, audio data, and physiological data, on a user 910. While one person is shown, the video data, audio data, or physiological data can be collected on multiple people. A user 910 can be observed as she or he is performing a task, experiencing an event, viewing a media presentation, and so on. The user 910 can be shown one or more media presentations, political presentations, social media, or another form of displayed media. The one or more media presentations can be shown to a plurality of people. The media presentations can be displayed on an electronic display 912 or another display. The data collected on the user 910 or on a plurality of users can be in the form of one or more videos, video frames, and still images; one or more audio channels; etc. The plurality of video data and audio data can be of people who are experiencing different situations. Some example situations can include the user or plurality of users being exposed to TV programs, movies, video clips, social media, and other such media. The situations could also include exposure to media such as advertisements, political messages, news programs, and so on.

As previously noted, video data and audio data can be collected on one or more users in substantially identical or different situations while viewing either a single media presentation or a plurality of presentations. The data collected on the user 910 can be analyzed and viewed for a variety of purposes including expression analysis, cognitive state analysis, mental state analysis, emotional state analysis, and so on. The electronic display 912 can be on a laptop computer 920 as shown, a tablet computer 950, a cell phone 940, a television, a mobile monitor, or any other type of electronic device. In one embodiment, video data including expression data is collected on a mobile device such as a cell phone 940, a tablet computer 950, a laptop computer 920, or a watch 970. Similarly, the audio data including speech data and non-speech vocalizations can be collected on one or more of the mobile devices. Thus, the multiple sources can include at least one mobile device, such as a phone 940 or a tablet 950, or a wearable device such as a watch 970 or glasses 960. A mobile device can include a front-side camera and/or a back-side camera that can be used to collect expression data. A mobile device can include a microphone, audio transducer, or other audio capture apparatus that can be used to capture the speech and non-speech vocalizations. Sources of expression data can include a webcam 922, a phone camera 942, a tablet camera 952, a wearable camera 962, and a mobile camera 930. A wearable camera can comprise various camera devices, such as a watch camera 972. Sources of audio data 982 can include a microphone 980.

As the user 910 is monitored, the user might move due to the nature of the task, boredom, discomfort, distractions, or for another reason. As the user moves, the camera with a view of the user's face can be changed. Thus, as an example, if the user is looking in a first direction, the line of sight 924 from the webcam 922 is able to observe the user's face, but if the user is looking in a second direction, the line of sight 934 from the mobile camera 930 is able to observe the user's face. Furthermore, in other embodiments, if the user is looking in a third direction, the line of sight 944 from the phone camera 942 is able to observe the user's face, and if the user is looking in a fourth direction, the line of sight 954 from the tablet camera 952 is able to observe the user's face. If the user is looking in a fifth direction, the line of sight 964 from the wearable camera 962, which can be a device such as the glasses 960 shown which can be worn by another user or an observer, is able to observe the user's face. If the user is looking in a sixth direction, the line of sight 974 from the wearable watch-type device 970, with a camera 972 included on the device, is able to observe the user's face. In other embodiments, the wearable device is another device, such as an earpiece with a camera, a helmet or hat with a camera, a clip-on camera attached to clothing, or any other type of wearable device with a camera or other sensor for collecting expression data. The user 910 can also use a wearable device including a camera for gathering contextual information and/or collecting expression data on other users. Because the user 910 can move her or his head, the facial data can be collected intermittently when she or he is looking in a direction of a camera. In some cases, multiple people can be included in the view from one or more cameras, and some embodiments include filtering out faces of one or more other people to determine whether the user 910 is looking toward a camera. All or some of the expression data can be continuously or sporadically available from the various devices and other devices.

The captured video data can include facial expressions and can be analyzed on a computing device such as the video capture device or on another separate device. The analysis can take place on one of the mobile devices discussed above, on a local server, on a remote server, and so on. In embodiments, some of the analysis takes place on the mobile device, while other analysis takes place on a server device. The analysis of the video data can include the use of a classifier. The video data can be captured using one of the mobile devices discussed above and sent to a server or another computing device for analysis. However, the captured video data including expressions can also be analyzed on the device which performed the capturing. The analysis can be performed on a mobile device where the videos were obtained with the mobile device and wherein the mobile device includes one or more of a laptop computer, a tablet, a PDA, a smartphone, a wearable device, and so on. In another embodiment, the analyzing comprises using a classifier on a server or another computing device other than the capturing device.

Figure 10:
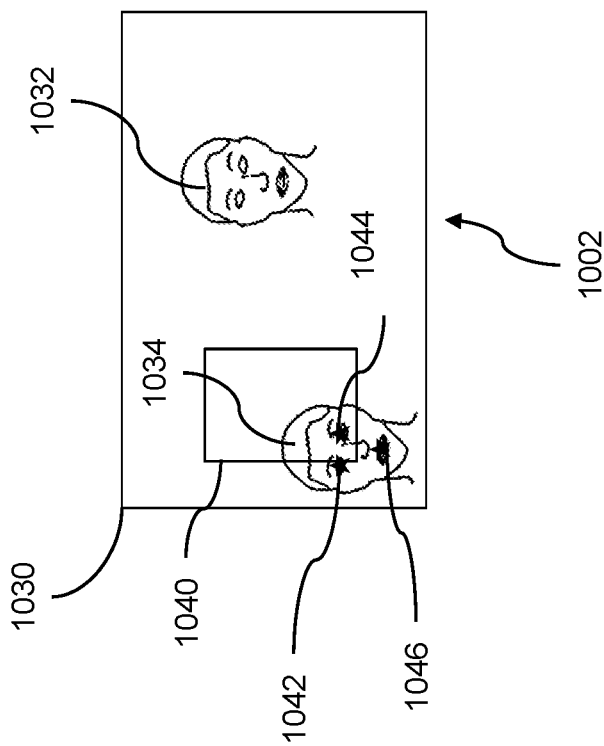
FIG. 10 illustrates feature extraction for multiple faces.
Figure 10:
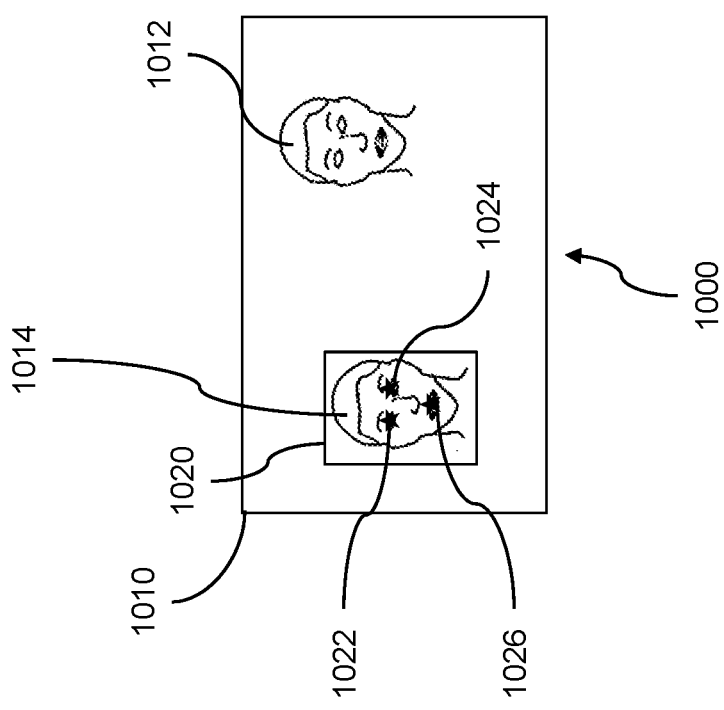

FIG. 10 illustrates feature extraction for multiple faces. Features of a face or a plurality of faces can be extracted from collected video data. Feature extraction for multiple faces can be based on sub-sectional components. The sub-sectional components can be used with performing the evaluation of content of the face. The sub-sectional components can be used to provide a context. The feature extraction can be performed by analysis using one or more processors, using one or more video collection devices, and by using a server. The analyzing device can be used to perform face detection for a second face, as well as for facial tracking of the first face. The feature extraction can enable live streaming analytics within a shared digital environment. One or more videos can be captured, where the videos contain one or more faces. The video or videos that contain the one or more faces can be partitioned into a plurality of frames, and the frames can be analyzed for the detection of the one or more faces. The analysis of the one or more video frames can be based on one or more classifiers. A classifier can be an algorithm, heuristic, function, or piece of code that can be used to identify into which of a set of categories a new or particular observation, sample, datum, etc. should be placed. The decision to place an observation into a category can be based on training the algorithm or piece of code, by analyzing a known set of data, known as a training set. The training set can include data for which category memberships of the data can be known. The training set can be used as part of a supervised training technique. If a training set is not available, then a clustering technique can be used to group observations into categories. The latter approach, or unsupervised learning, can be based on a measure (i.e. distance) of one or more inherent similarities among the data that is being categorized. When the new observation is received, then the classifier can be used to categorize the new observation. Classifiers can be used for many analysis applications including analysis of one or more faces. The use of classifiers can be the basis of analyzing the one or more faces for gender, ethnicity, and age; for detection of one or more faces in one or more videos; for detection of facial features, for detection of facial landmarks, and so on. The observations can be analyzed based on one or more of a set of quantifiable properties. The properties can be described as features and explanatory variables and can include various data types such as numerical (integer-valued, real-valued), ordinal, categorical, and so on. Some classifiers can be based on a comparison between an observation and prior observations, as well as based on functions such as a similarity function, a distance function, and so on.

Classification can be based on various types of algorithms, heuristics, codes, procedures, statistics, and so on. Many techniques exist for performing classification. The classification of one or more observations into one or more groups can be based on distributions of the data values, probabilities, and so on. Classifiers can be binary, multiclass, linear, and so on. Algorithms for classification can be implemented using a variety of techniques, including neural networks, kernel estimation, support vector machines, use of quadratic surfaces, and so on. Classification can be used in many application areas such as computer vision, speech and handwriting recognition, and so on. Classification can be used for biometric identification of one or more people in one or more frames of one or more videos.

Returning to FIG. 10, the detection of the first face, the second face, and any number of faces can include identifying facial landmarks, generating a bounding box, and prediction of a bounding box and landmarks for a next frame, where the next frame can be one of a plurality of frames of a video containing faces. A first video frame 1000 includes a frame boundary 1010, a first face 1012, and a second face 1014. The video frame 1000 also includes a bounding box 1020. Facial landmarks can be generated for the first face 1012. Face detection can be performed to initialize a second set of locations for a second set of facial landmarks for a second face within the video. Facial landmarks in the video frame 1000 can include the facial landmarks 1022, 1024, and 1026. The facial landmarks can include corners of a mouth, corners of eyes, eyebrow corners, the tip of the nose, nostrils, chin, the tips of ears, and so on. The performing of face detection on the second face can include performing facial landmark detection with the first frame from the video for the second face, and can include estimating a second rough bounding box for the second face based on the facial landmark detection. The estimating of a second rough bounding box can include the bounding box 1020. Bounding boxes can also be estimated for one or more other faces within the boundary 1010. The bounding box can be refined, as can one or more facial landmarks. The refining of the second set of locations for the second set of facial landmarks can be based on localized information around the second set of facial landmarks. The bounding box 1020 and the facial landmarks 1022, 1024, and 1026 can be used to estimate future locations for the second set of locations for the second set of facial landmarks in a future video frame from the first video frame.

A second video frame 1002 is also shown. The second video frame 1002 includes a frame boundary 1030, a first face 1032, and a second face 1034. Embodiments include tracking the face within the video. Furthermore, embodiments include tracking a second face within the video. The second video frame 1002 also includes a bounding box 1040 and the facial landmarks 1042, 1044, and 1046. In other embodiments, any number of facial landmarks are generated and used for facial tracking of the two or more faces of a video frame, such as the shown second video frame 1002. Facial points from the first face can be distinguished from other facial points. In embodiments, the other facial points include facial points of one or more other faces. The facial points can correspond to the facial points of the second face. The distinguishing of the facial points of the first face and the facial points of the second face can be used to distinguish between the first face and the second face, to track either of or both the first face and the second face, and so on. Other facial points can correspond to the second face. As mentioned above, any number of facial points can be determined within a frame. One or more of the other facial points that are determined can correspond to a third face. The location of the bounding box 1040 can be estimated, where the estimating can be based on the location of the generated bounding box 1020 shown in the first video frame 1000. The three facial points shown, facial landmarks 1042, 1044, and 1046, might lie within the bounding box 1040 or might not lie partially or completely within the bounding box 1040. For instance, the second face 1034 might have moved between the first video frame 1000 and the second video frame 1002. Based on the accuracy of the estimating of the bounding box 1040, a new estimation can be determined for a third, future frame from the video, and so on. The evaluation can be performed, all or in part, on semiconductor-based logic. In embodiments, evaluation of content of the face is based on motion of regions within the face. Each video frame can be considered as an image. In embodiments, the image is one image from a series of images of the individual. Thus, in embodiments, there is a series of images. In embodiments, the series of images comprises a video of the individual.

Figure 11:
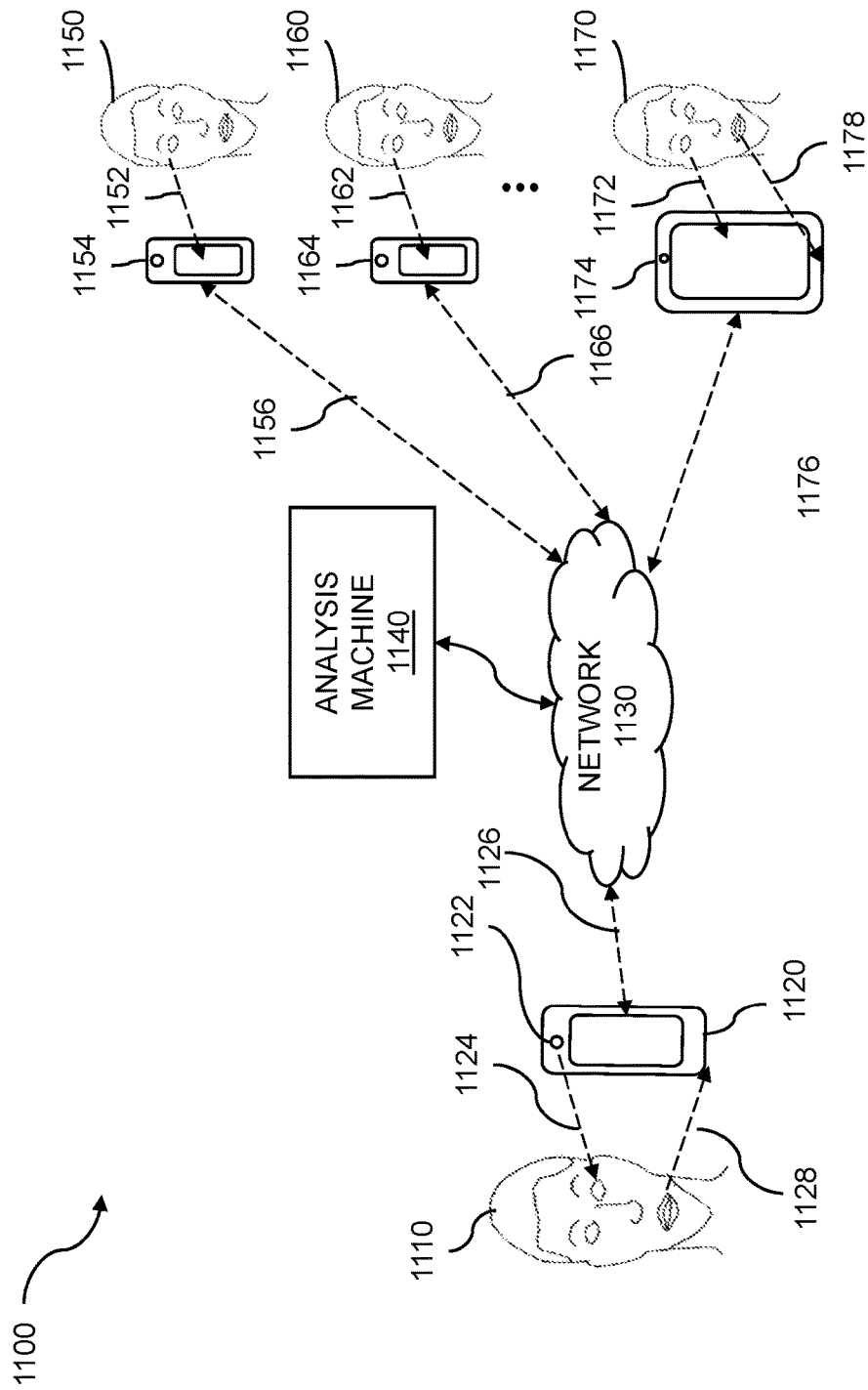
FIG. 11 shows live streaming of social video and audio.

FIG. 11 shows live streaming of social video and audio. The streaming of social video and social audio can be applied to live streaming analytics within a shared digital environment. The live streaming can include cognitive state data, imaging data, upper torso data, speech data, audio data, physio data, etc. An interactive digital environment is accessed, where the interactive digital environment is a shared digital environment for a plurality of participants. A plurality of images is obtained from a first set of participants within the plurality of participants involved in the interactive digital environment. Cognitive state content within the plurality of images is analyzed for the first set of participants within the plurality of participants. Results of the analyzing cognitive state content are provided to a second set of participants within the plurality of participants.

The live streaming and image analysis 1100 can be facilitated by a video capture device, a local server, a remote server, semiconductor-based logic, and so on. The streaming can be live streaming and can include cognitive state analysis, cognitive state event signature analysis, etc. Live streaming video is an example of one-to-many social media, where video can be sent over the Internet from one person to a plurality of people using a social media app and/or platform. Live streaming is one of numerous popular techniques used by people who want to disseminate ideas, send information, provide entertainment, share experiences, and so on. Some of the live streams, such as webcasts, online classes, sporting events, news, computer gaming, or video conferences can be scheduled, while others can be impromptu streams that are broadcast as needed or when desired. Examples of impromptu live stream videos can range from individuals simply wanting to share experiences with their social media followers, to live coverage of breaking news, emergencies, or natural disasters. The latter coverage is known as mobile journalism, or "mojo", and is becoming increasingly common. With this type of coverage, news reporters can use networked, portable electronic devices to provide mobile journalism content to a plurality of social media followers. Such reporters can be quickly and inexpensively deployed as the need or desire arises.

Many live streaming social media apps and platforms can be used for transmitting video. One such video social media app is Meerkat™ which can link with a user's Twitter™ account. Meerkat™ enables a user to stream video using a handheld, networked electronic device coupled to video capabilities. Viewers of the live stream can comment on the stream using tweets that can be seen and responded to by the broadcaster. Another popular app is Periscope™ which can transmit a live recording from one user to his or her Periscope™ account and to other followers. The Periscope™ app can be executed on a mobile device. The user's Periscope™ followers can receive an alert whenever that user begins a video transmission. Another live-stream video platform is Twitch™ which can be used for video streaming of video gaming and broadcasts of various competitions and events. Many such live streaming platforms exist from many different providers.

The example 1100 shows a user 1110 broadcasting a video live stream and an audio live stream to one or more people as shown by a first person 1150, a second person 1160, and a third person 1170. A portable, network-enabled, electronic device 1120 can be coupled to a front-side camera 1122. The portable electronic device 1120 can be a smartphone, a PDA, a tablet, a laptop computer, and so on. The camera 1122 coupled to the device 1120 can have a line-of-sight view 1124 to the user 1110 and can capture video of the user 1110. The portable electronic device 1120 can be coupled to a microphone (not shown). The microphone can capture voice data 1128 such as speech and non-speech vocalizations. In embodiments, non-speech vocalizations can include grunts, yelps, squeals, snoring, sighs, laughter, filled pauses, unfilled pauses, yawns, or the like. The captured video and audio can be sent to an analysis or recommendation engine 1140 using a network link 1126 to the network 1130. The network link can be a wireless link, a wired link, and so on. The recommendation engine 1140 can recommend to the user 1110 an app and/or platform that can be supported by the server and can be used to provide a video live stream, an audio live stream, or both a video live stream and an audio live stream to one or more followers of the user 1110.

In the example 1100, the user 1110 has four followers: a first person 1150, a second person 1160, and a third person 1170. Each follower has a line-of-sight view to a video screen on a portable, networked electronic device. In other embodiments, one or more followers follow the user 1110 using any other networked electronic device, including a computer. In the example 1100, a first person 1150 has a line-of-sight view 1152 to the video screen of a device 1154; a second person 1160 has a line-of-sight view 1162 to the video screen of a device 1164, and a third person 1170 has a line-of-sight view 1172 to the video screen of a device 1174. The device 1174 can also capture audio data 1178 from the third person 1170. The portable electronic devices 1154, 1164, and 1174 can each be a smartphone, a PDA, a tablet, and so on. Each portable device can receive the video stream and the audio stream being broadcast by the user 1110 through the network 1130 using the app and/or platform that can be recommended by the recommendation engine 1140. The network can include the Internet, a computer network, a cellular network, and the like. The device 1154 can receive a video stream and the audio stream using the network link 1156, the device 1164 can receive a video stream and the audio stream using the network link 1166, the device 1174 can receive a video stream and the audio stream using the network link 1176, and so on. The network link can be a wireless link, a wired link, a hybrid link, and the like. Depending on the app and/or platform that can be recommended by the analysis engine 1140, one or more followers, such as the followers shown 1150, 1160, and 1170, can reply to, comment on, or otherwise provide feedback to the user 1110 using their respective devices 1154, 1164, and 1174.

The human face provides a powerful communications medium through its ability to exhibit numerous expressions that can be captured and analyzed for a variety of purposes. In some cases, media producers are acutely interested in evaluating the effectiveness of message delivery by video media. Such video media includes advertisements, political messages, educational materials, television programs, movies, government service announcements, etc. Automated facial analysis can be performed on one or more video frames containing a face in order to detect facial action. Based on the facial action detected, a variety of parameters can be determined, including affect valence, spontaneous reactions, facial action units, and so on. The parameters that are determined can be used to infer or predict emotional, mental, and cognitive states. For example, determined valence can be used to describe the emotional reaction of a viewer to a video media presentation or another type of presentation. Positive valence provides evidence that a viewer is experiencing a favorable emotional response to the video media presentation, while negative valence provides evidence that a viewer is experiencing an unfavorable emotional response to the video media presentation. Other facial data analysis can include the determination of discrete emotional states of the viewer or viewers.

Facial data can be collected from a plurality of people using any of a variety of cameras. A camera can include a webcam, a video camera, a still camera, a thermal imager, a CCD device, a phone camera, a three-dimensional camera, a depth camera, a light field camera, multiple webcams used to show different views of a person, or any other type of image capture apparatus that can allow captured data to be used in an electronic system. In some embodiments, the person is permitted to "opt-in" to the facial data collection. For example, the person can agree to the capture of facial data using a personal device such as a mobile device or another electronic device by selecting an opt-in choice. Opting-in can then turn on the person's webcam-enabled device and can begin the capture of the person's facial data via a video feed from the webcam or other camera. The video data that is collected can include one or more persons experiencing an event. The one or more persons can be sharing a personal electronic device or can each be using one or more devices for video capture. The videos that are collected can be collected using a web-based framework. The web-based framework can be used to display the video media presentation or event as well as to collect videos from multiple viewers who are online. That is, the collection of videos can be crowdsourced from those viewers who elected to opt-in to the video data collection.

The videos captured from the various viewers who chose to opt-in can be substantially different in terms of video quality, frame rate, etc. As a result, the facial video data can be scaled, rotated, and otherwise adjusted to improve consistency. Human factors further contribute to the capture of the facial video data. The facial data that is captured might or might not be relevant to the video media presentation being displayed. For example, the viewer might not be paying attention, might be fidgeting, might be distracted by an object or event near the viewer, or might be otherwise inattentive to the video media presentation. The behavior exhibited by the viewer can prove challenging to analyze due to viewer actions including eating, speaking to another person or persons, speaking on the phone, etc. The videos collected from the viewers might also include other artifacts that pose challenges during the analysis of the video data. The artifacts can include items such as eyeglasses (because of reflections), eye patches, jewelry, and clothing that occlude or obscure the viewer's face. Similarly, a viewer's hair or hair covering can present artifacts by obscuring the viewer's eyes and/or face.

The captured facial data can be analyzed using the facial action coding system (FACS). The FACS seeks to define groups or taxonomies of facial movements of the human face. The FACS encodes movements of individual muscles of the face, where the muscle movements often include slight, instantaneous changes in facial appearance. The FACS encoding is commonly performed by trained observers, but can also be performed on automated, computer-based systems. Analysis of the FACS encoding can be used to determine emotions of the persons whose facial data is captured in the videos. The FACS is used to encode a wide range of facial expressions that are anatomically possible for the human face. The FACS encodings include action units (AUs) and related temporal segments that are based on the captured facial expression. The AUs are open to higher order interpretation and decision-making. These AUs can be used to recognize emotions experienced by the person who is being observed. Emotion-related facial actions can be identified using the emotional facial action coding system (EM-FACS) and the facial action coding system affect interpretation dictionary (FACSAID). For a given emotion, specific action units can be related to the emotion. For example, the emotion of anger can be related to AUs 4, 5, 7, and 23, while happiness can be related to AUs 6 and 12. Other mappings of emotions to AUs have also been previously associated.

The coding of the AUs can include an intensity scoring that ranges from A (trace) to E (maximum). The AUs can be used for analyzing images to identify patterns indicative of a particular cognitive and/or emotional state. The AUs range in number from 0 (neutral face) to 98 (fast up-down look). The AUs include so-called main codes (inner brow raiser, lid tightener, etc.), head movement codes (head turn left, head up, etc.), eye movement codes (eyes turned left, eyes up, etc.), visibility codes (eyes not visible, entire face not visible, etc.), and gross behavior codes (sniff, swallow, etc.). Emotion scoring can be included where intensity is evaluated, and specific emotions, moods, mental states, or cognitive states can be identified.

The coding of faces identified in videos captured of people observing an event can be automated. The automated systems can detect facial AUs or discrete emotional states. The emotional states can include amusement, fear, anger, disgust, surprise, and sadness. The automated systems can be based on a probability estimate from one or more classifiers, where the probabilities can correlate with an intensity of an AU or an expression. The classifiers can be used to identify into which of a set of categories a given observation can be placed. In some cases, the classifiers can be used to determine a probability that a given AU or expression is present in a given frame of a video. The classifiers can be used as part of a supervised machine learning technique, where the machine learning technique can be trained using "known good" data. Once trained, the machine learning technique can proceed to classify new data that is captured.

The supervised machine learning models can be based on support vector machines (SVMs). An SVM can have an associated learning model that is used for data analysis and pattern analysis. For example, an SVM can be used to classify data that can be obtained from collected videos of people experiencing a media presentation. An SVM can be trained using "known good" data that is labeled as belonging to one of two categories (e.g. smile and no-smile). The SVM can build a model that assigns new data into one of the two categories. The SVM can construct one or more hyperplanes that can be used for classification. The hyperplane that has the largest distance from the nearest training point can be determined to have the best separation. The largest separation can improve the classification technique by increasing the probability that a given data point can be properly classified.

In another example, a histogram of oriented gradients (HoG) can be computed. The HoG can include feature descriptors and can be computed for one or more facial regions of interest. The regions of interest of the face can be located using facial landmark points, where the facial landmark points can include outer edges of nostrils, outer edges of the mouth, outer edges of eyes, etc. A HoG for a given region of interest can count occurrences of gradient orientation within a given section of a frame from a video, for example. The gradients can be intensity gradients and can be used to describe an appearance and a shape of a local object. The HoG descriptors can be determined by dividing an image into small, connected regions, also called cells. A histogram of gradient directions or edge orientations can be computed for pixels in the cell. Histograms can be contrast-normalized based on intensity across a portion of the image or the entire image, thus reducing any influence from differences in illumination or shadowing changes between and among video frames. The HoG can be computed on the image or on an adjusted version of the image, where the adjustment of the image can include scaling, rotation, etc.

The image can be adjusted by flipping the image around a vertical line through the middle of a face in the image. The symmetry plane of the image can be determined from the tracker points and landmarks of the image.

In embodiments, an automated facial analysis system identifies five facial actions or action combinations in order to detect spontaneous facial expressions for media research purposes. Based on the facial expressions that are detected, a determination can be made with regard to the effectiveness of a given video media presentation, for example. The system can detect the presence of the AUs or the combination of AUs in videos collected from a plurality of people. The facial analysis technique can be trained using a web-based framework to crowdsource videos of people as they watch online video content. The video can be streamed at a fixed frame rate to a server. Human labelers can code for the presence or absence of facial actions including a symmetric smile, unilateral smile, asymmetric smile, and so on. The trained system can then be used to automatically code the facial data collected from a plurality of viewers experiencing video presentations (e.g. television programs).

Spontaneous asymmetric smiles can be detected in order to understand viewer experiences. Related literature indicates that as many asymmetric smiles occur on the right hemi face as do on the left hemi face, for spontaneous expressions. Detection can be treated as a binary classification problem, where images that contain a right asymmetric expression are used as positive (target class) samples and all other images as negative (non-target class) samples. Classifiers perform the classification, including classifiers such as support vector machines (SVM) and random forests. Random forests can include ensemble-learning methods that use multiple learning algorithms to obtain better predictive performance. Frame-by-frame detection can be performed to recognize the presence of an asymmetric expression in each frame of a video. Facial points can be detected, including the top of the mouth and the two outer eye corners. The face can be extracted, cropped, and warped into a pixel image of specific dimension (e.g. 96×96 pixels). In embodiments, the inter-ocular distance and vertical scale in the pixel image are fixed. Feature extraction can be performed using computer vision software such as OpenCV™. Feature extraction can be based on the use of HoGs. HoGs can include feature descriptors and can be used to count occurrences of gradient orientation in localized portions or regions of the image. Other techniques can be used for counting occurrences of gradient orientation, including edge orientation histograms, scale-invariant feature transformation descriptors, etc. The AU recognition tasks can also be performed using Local Binary Patterns (LBPs) and Local Gabor Binary Patterns (LGBPs). The HoG descriptor represents the face as a distribution of intensity gradients and edge directions and is robust in its ability to translate and scale. Differing patterns, including groupings of cells of various sizes and arranged in variously sized cell blocks, can be used. For example, 4×4 cell blocks of 8×8-pixel cells with an overlap of half of the block can be used. Histograms of channels can be used, including nine channels or bins evenly spread over 0-180 degrees. In this example, the HoG descriptor on a 96×96 image is 25 blocks×16 cells×9 bins=3600, the latter quantity representing the dimension. AU occurrences can be rendered. The videos can be grouped into demographic datasets based on nationality and/or other demographic parameters for further detailed analysis. This grouping and other analyses can be facilitated via semiconductor-based logic.

Figure 12:
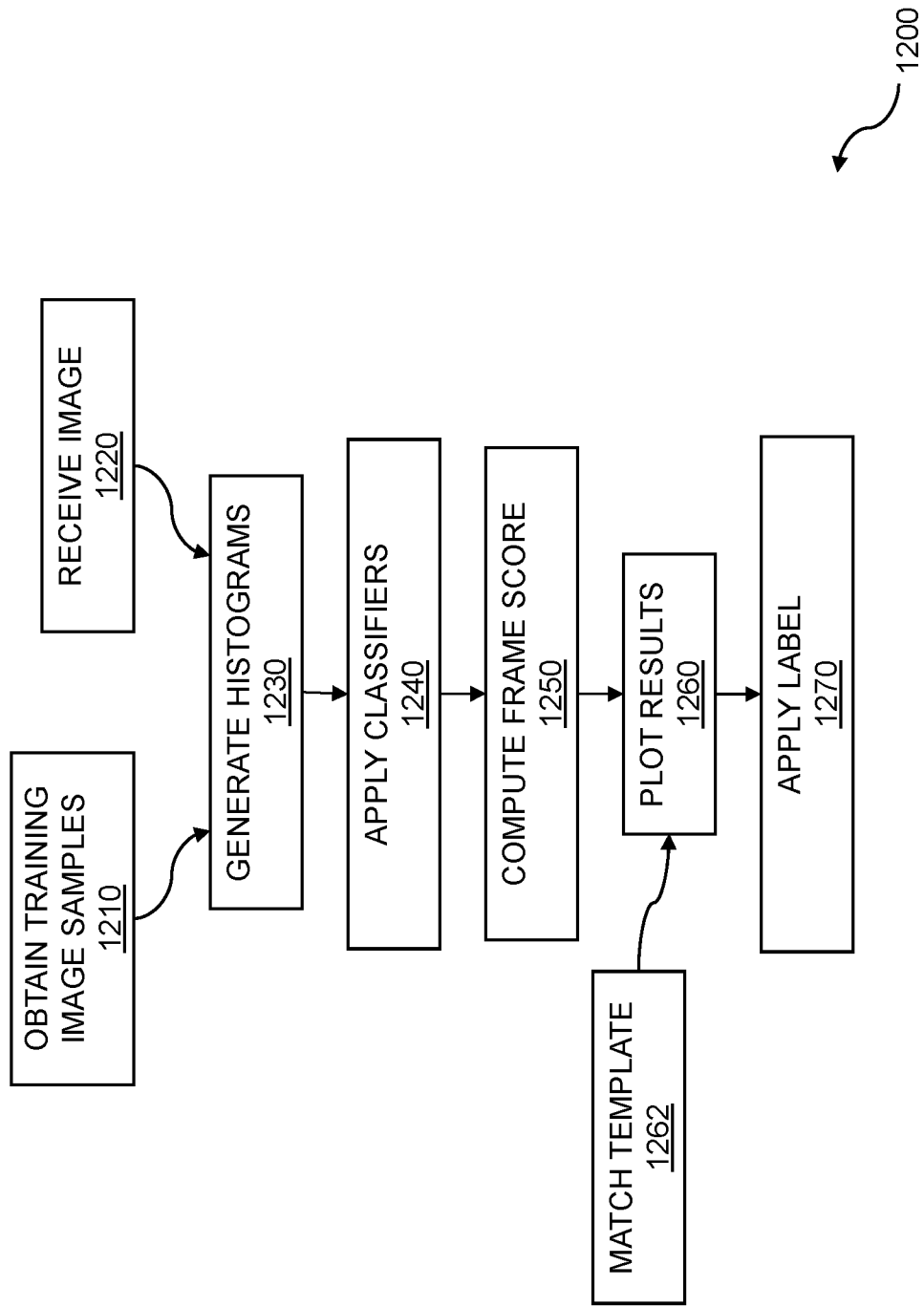
FIG. 12 is a flow diagram for detecting facial expressions.

FIG. 12 is a flow diagram for detecting facial expressions. The detection of facial expressions can be performed for data collected from images of participants involved in an interactive digital environment. The collected images can be analyzed for cognitive states and/or facial expressions. A plurality of images can be received of an individual viewing an electronic display. A face can be identified in an image, based on the use of classifiers. The plurality of images can be evaluated to determine the cognitive states and/or facial expressions of the individual. The flow 1200, or portions thereof, can be implemented in semiconductor logic, can be accomplished using a mobile device, can be accomplished using a server device, and so on. The flow 1200 can be used to automatically detect a wide range of facial expressions. A facial expression can produce strong emotional signals that can indicate valence and discrete emotional states. The discrete emotional states can include contempt, doubt, defiance, happiness, fear, anxiety, and so on. The detection of facial expressions can be based on the location of facial landmarks. The detection of facial expressions can be based on determination of action units (AUs), where the action units are determined using FACS coding. The AUs can be used singly or in combination to identify facial expressions. Based on the facial landmarks, one or more AUs can be identified by number and intensity. For example, AU12 can be used to code a lip corner puller and can be used to infer a smirk.

The flow 1200 begins by obtaining training image samples 1210. The image samples can include a plurality of images of one or more people. Human coders who are trained to correctly identify AU codes based on the FACS can code the images. The training or "known good" images can be used as a basis for training a machine learning technique. Once trained, the machine learning technique can be used to identify AUs in other images that can be collected using a camera, a sensor, and so on. The flow 1200 continues with receiving an image 1220. The image 1220 can be received from a camera, a sensor, and so on. As previously discussed, the camera or cameras can include a webcam, where a webcam can include a video camera, a still camera, a thermal imager, a CCD device, a phone camera, a three-dimensional camera, a depth camera, a light field camera, multiple webcams used to show different views of a person, or any other type of image capture apparatus that can allow captured data to be used in an electronic system. The image that is received can be manipulated in order to improve the processing of the image. For example, the image can be cropped, scaled, stretched, rotated, flipped, etc. in order to obtain a resulting image that can be analyzed more efficiently. Multiple versions of the same image can be analyzed. In some cases, the manipulated image and a flipped or mirrored version of the manipulated image can be analyzed alone and/or in combination to improve analysis. The flow 1200 continues with generating histograms 1230 for the training images and the one or more versions of the received image. The histograms can be based on a HoG or another histogram. As described in previous paragraphs, the HoG can include feature descriptors and can be computed for one or more regions of interest in the training images and the one or more received images. The regions of interest in the images can be located using facial landmark points, where the facial landmark points can include outer edges of nostrils, outer edges of the mouth, outer edges of eyes, etc. A HoG for a given region of interest can count occurrences of gradient orientation within a given section of a frame from a video.

The flow 1200 continues with applying classifiers 1240 to the histograms. The classifiers can be used to estimate probabilities, where the probabilities can correlate with an intensity of an AU or an expression. In some embodiments, the choice of classifiers used is based on the training of a supervised learning technique to identify facial expressions. The classifiers can be used to identify into which of a set of categories a given observation can be placed. The classifiers can be used to determine a probability that a given AU or expression is present in a given image or frame of a video. In various embodiments, the one or more AUs that are present include AU01 inner brow raiser, AU12 lip corner puller, AU38 nostril dilator, and so on. In practice, the presence or absence of multiple AUs can be determined. The flow 1200 continues with computing a frame score 1250. The score computed for an image, where the image can be a frame from a video, can be used to determine the presence of a facial expression in the image or video frame. The score can be based on one or more versions of the image 1220 or a manipulated image. The score can be based on a comparison of the manipulated image to a flipped or mirrored version of the manipulated image. The score can be used to predict a likelihood that one or more facial expressions are present in the image. The likelihood can be based on computing a difference between the outputs of a classifier used on the manipulated image and on the flipped or mirrored image, for example. The classifier that is used can be used to identify symmetrical facial expressions (e.g. smile), asymmetrical facial expressions (e.g. outer brow raiser), and so on.

The flow 1200 continues with plotting results 1260. The results that are plotted can include one or more scores for one or more frames computed over a given time t. For example, the plotted results can include classifier probability results from analysis of HoGs for a sequence of images and video frames. The plotted results can be matched with a template 1262. The template can be temporal and can be represented by a centered box function or another function. A best fit with one or more templates can be found by computing a minimum error. Other best-fit techniques can include polynomial curve fitting, geometric curve fitting, and so on. The flow 1200 continues with applying a label 1270. The label can be used to indicate that a particular facial expression has been detected in the one or more images or video frames, which constitutes that the image 1220 was received. The label can be used to indicate that any of a range of facial expressions has been detected, including a smile, an asymmetric smile, a frown, and so on. Various steps in the flow 1200 may be changed in order, repeated, omitted, or the like without departing from the disclosed concepts. Various embodiments of the flow 1200 can be included in a computer program product embodied in a non-transitory computer readable medium that includes code executable by one or more processors. Various embodiments of the flow 1200, or portions thereof, can be included on a semiconductor chip and implemented in special purpose logic, programmable logic, and so on.

Figure 13:
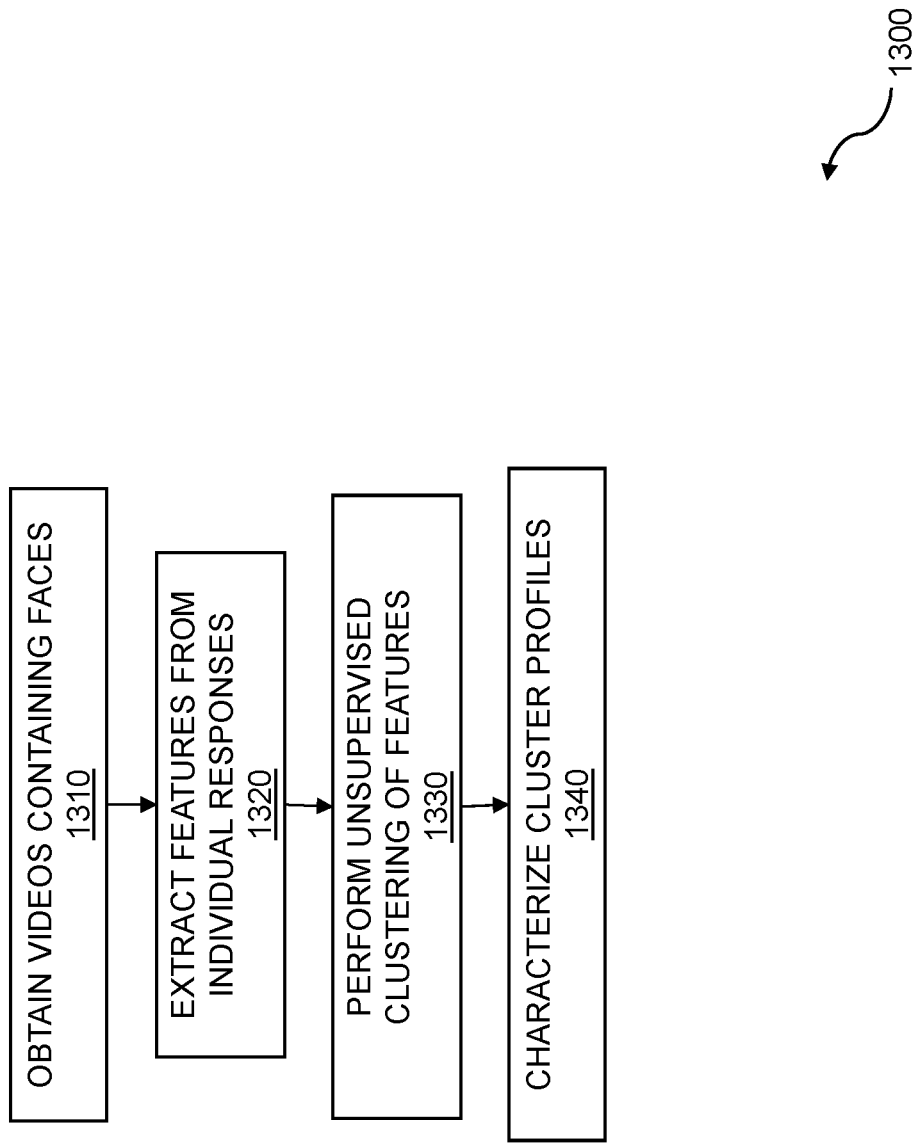
FIG. 13 is a flow diagram for the large-scale clustering of facial events.

FIG. 13 is a flow diagram for the large-scale clustering of facial events. The large-scale clustering of facial events can be performed for data collected from images of an individual. The collected images can be analyzed for cognitive states and/or facial expressions. An interactive digital environment can be accessed, where the interactive digital environment is a shared digital environment for a plurality of participants. A plurality of images is obtained from a first set of participants within the plurality of participants involved in the interactive digital environment. Cognitive state content is analyzed within the plurality of images for the first set of participants within the plurality of participants. Results of the analyzing cognitive state content are provided to a second set of participants within the plurality of participants. The clustering and evaluation of facial events can be augmented using a mobile device, a server, semiconductor-based logic, and so on. As discussed above, collection of facial video data from one or more people can include a web-based framework. The web-based framework can be used to collect facial video data from large numbers of people located over a wide geographic area. The web-based framework can include an opt-in feature that allows people to agree to facial data collection. The web-based framework can be used to render and display data to one or more people and can collect data from the one or more people. For example, the facial data collection can be based on showing one or more viewers a video media presentation through a website. The web-based framework can be used to display the video media presentation or event and to collect videos from multiple viewers who are online. That is, the collection of videos can be crowdsourced from those viewers who elected to opt in to the video data collection. The video event can be a commercial, a political ad, an educational segment, and so on.

The flow 1300 begins with obtaining videos containing faces 1310. The videos can be obtained using one or more cameras, where the cameras can include a webcam coupled to one or more devices employed by the one or more people using the web-based framework. The flow 1300 continues with extracting features from the individual responses 1320. The individual responses can include videos containing faces observed by the one or more webcams. The features that are extracted can include facial features such as an eyebrow, a nostril, an eye edge, a mouth edge, and so on. The feature extraction can be based on facial coding classifiers, where the facial coding classifiers output a probability that a specified facial action has been detected in a given video frame. The flow 1300 continues with performing unsupervised clustering of features 1330. The unsupervised clustering can be based on an event. The unsupervised clustering can be based on a K-Means, where the K of the K-Means can be computed using a Bayesian Information Criterion (BICk), for example, to determine the smallest value of K that meets system requirements. Any other criterion for K can be used. The K-Means clustering technique can be used to group one or more events into various respective categories.

The flow 1300 continues with characterizing cluster profiles 1340. The profiles can include a variety of facial expressions such as smiles, asymmetric smiles, eyebrow raisers, eyebrow lowerers, etc. The profiles can be related to a given event. For example, a humorous video can be displayed in the web-based framework and the video data of people who have opted in can be collected. The characterization of the collected and analyzed video can depend in part on the number of smiles that occurred at various points throughout the humorous video. The number of smiles resulting from people viewing a humorous video can be compared to various demographic groups, where the groups can be formed based on geographic location, age, ethnicity, gender, and so on. Similarly, the characterization can be performed on collected and analyzed videos of people viewing a news presentation. The characterized cluster profiles can be further analyzed based on demographic data. Various steps in the flow 1300 may be changed in order, repeated, omitted, or the like without departing from the disclosed concepts. Various embodiments of the flow 1300 can be included in a computer program product embodied in a non-transitory computer readable medium that includes code executable by one or more processors. Various embodiments of the flow 1300, or portions thereof, can be included on a semiconductor chip and implemented in special purpose logic, programmable logic, and so on.

Figure 14:
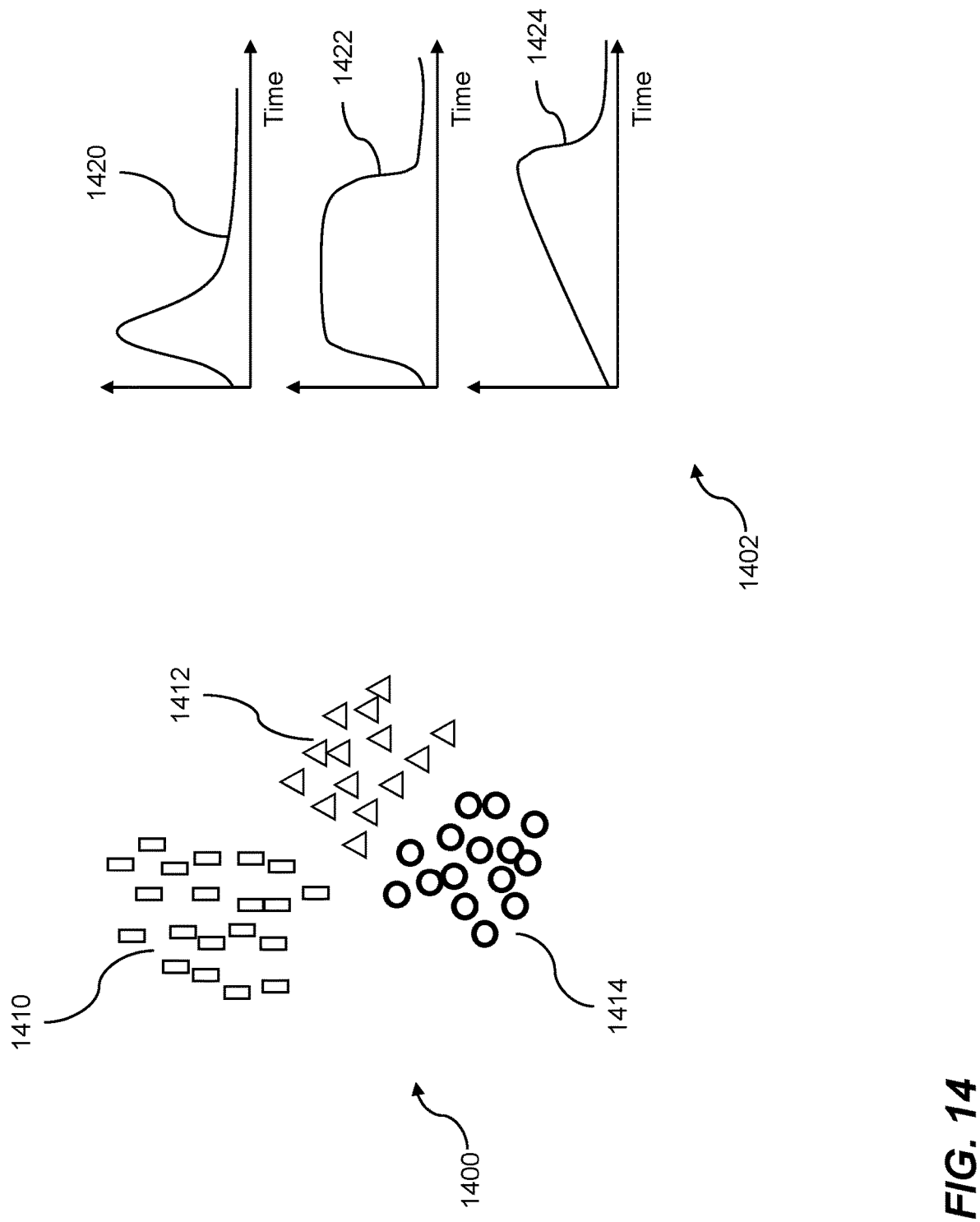
FIG. 14 shows unsupervised clustering of features and characterizations of cluster profiles.

FIG. 14 shows unsupervised clustering of features and characterizations of cluster profiles. The clustering can be accomplished as part of a deep learning effort. The clustering of features and characterizations of cluster profiles can be performed for images collected of an individual. The collected images can be analyzed for cognitive states and/or facial expressions. The analysis enables live streaming analytics within a shared digital environment. An interactive digital environment is accessed, where the interactive digital environment is a shared digital environment for a plurality of participants. A plurality of images is obtained from a first set of participants within the plurality of participants involved in the interactive digital environment. Cognitive state content is analyzed within the plurality of images for the first set of participants within the plurality of participants. Results of the analyzing cognitive state content are provided to a second set of participants within the plurality of participants. Features including samples of facial data can be clustered using unsupervised clustering. Various clusters can be formed which include similar groupings of facial data observations. The example 1400 shows three clusters, clusters 1410, 1412, and 1414. The clusters can be based on video collected from people who have opted in to video collection. When the data collected is captured using a web-based framework, the data collection can be performed on a grand scale, including hundreds, thousands, or even more participants who can be located locally and/or across a wide geographic area. Unsupervised clustering is a technique that can be used to process the large amounts of captured facial data and to identify groupings of similar observations. The unsupervised clustering can also be used to characterize the groups of similar observations. The characterizations can include identifying behaviors of the participants. The characterizations can be based on identifying facial expressions and facial action units of the participants. Some behaviors and facial expressions can include faster or slower onsets, faster or slower offsets, longer or shorter durations, etc. The onsets, offsets, and durations can all correlate to time. The data clustering that results from the unsupervised clustering can support data labeling. The labeling can include FACS coding. The clusters can be partially or totally based on a facial expression resulting from participants viewing a video presentation, where the video presentation can be an advertisement, a political message, educational material, a public service announcement, and so on. The clusters can be correlated with demographic information, where the demographic information can include educational level, geographic location, age, gender, income level, and so on.

The cluster profiles 1402 can be generated based on the clusters that can be formed from unsupervised clustering, with time shown on the x-axis and intensity or frequency shown on the y-axis. The cluster profiles can be based on captured facial data including facial expressions. The cluster profile 1420 can be based on the cluster 1410, the cluster profile 1422 can be based on the cluster 1412, and the cluster profile 1424 can be based on the cluster 1414. The cluster profiles 1420, 1422, and 1424 can be based on smiles, smirks, frowns, or any other facial expression. The emotional states of the people who have opted in to video collection can be inferred by analyzing the clustered facial expression data. The cluster profiles can be plotted with respect to time and can show a rate of onset, a duration, and an offset (rate of decay). Other time-related factors can be included in the cluster profiles. The cluster profiles can be correlated with demographic information, as described above. The cluster profiles 1420, 1422, and 1424 show change in cognitive state as a function of time, and serve as a cognitive state event temporal signature. The cognitive state event temporal signature is a measure of how quickly an emotion occurs or dissipates. Some emotions may occur suddenly, such as resulting from a surprise. Other emotions may occur gradually, as a user comprehends a situation unfolding over time. The time span in which a change in emotion occurs can be indicative of the intensity of the emotion. Thus, the cognitive state event temporal signature can provide valuable information for interpreting human emotion. In embodiments translating of facial content is based on a cognitive state event temporal signature.

Figure 15A:
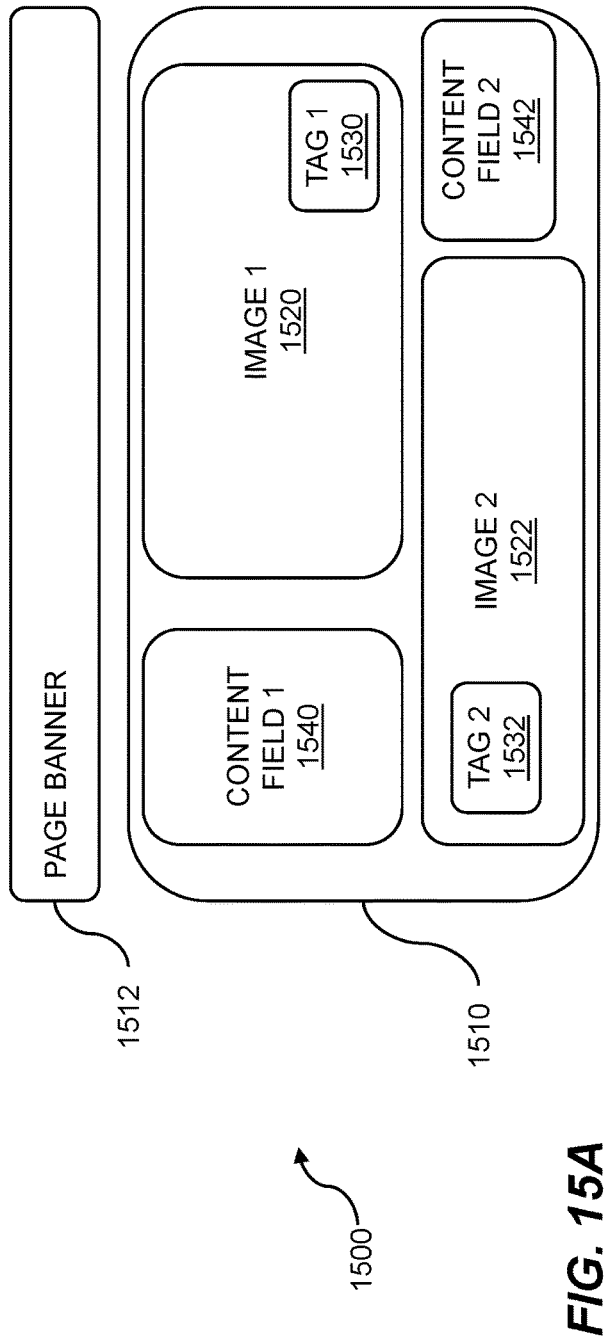
FIG. 15A shows example tags embedded in a webpage.

FIG. 15A shows example tags embedded in a webpage. The tags embedded in the webpage can be used for image analysis for images collected of an individual, and the image analysis can be performed by a multi-layer system. The collected images can be analyzed for cognitive states and/or facial expressions. The analysis enables live streaming analytics within a shared digital environment. A plurality of images of an individual viewing an electronic display can be received. A face in an image can be identified, based on the use of classifiers. The plurality of images can be evaluated to determine cognitive states and/or facial expressions of the individual. Once a tag is detected, a mobile device, a server, semiconductor-based logic, etc. can be used to evaluate associated facial expressions. A webpage 1500 can include a page body 1510, a page banner 1512, and so on. The page body can include one or more objects, where the objects can include text, images, videos, audio, and so on. The example page body 1510 shown includes a first image, image 1 1520; a second image, image 2 1522; a first content field, content field 1 1540; and a second content field, content field 2 1542. In practice, the page body 1510 can contain multiple images and content fields, and can include one or more videos, one or more audio presentations, and so on. The page body can include embedded tags, such as tag 1 1530 and tag 2 1532. In the example shown, tag 1 1530 is embedded in image 1 1520, and tag 2 1532 is embedded in image 2 1522. In embodiments, multiple tags are imbedded. Tags can also be embedded in content fields, in videos, in audio presentations, etc. When a user mouses over a tag or clicks on an object associated with a tag, the tag can be invoked. For example, when the user mouses over tag 1 1530, tag 1 1530 can then be invoked. Invoking tag 1 1530 can include enabling a camera coupled to a user's device and capturing one or more images of the user as the user views a media presentation (or digital experience). In a similar manner, when the user mouses over tag 2 1532, tag 2 1532 can be invoked. Invoking tag 2 1532 can also include enabling the camera and capturing images of the user. In other embodiments, other actions are taken based on invocation of the one or more tags. Invoking an embedded tag can initiate an analysis technique, post to social media, award the user a coupon or another prize, initiate cognitive state analysis, perform emotion analysis, and so on.

Figure 15B:
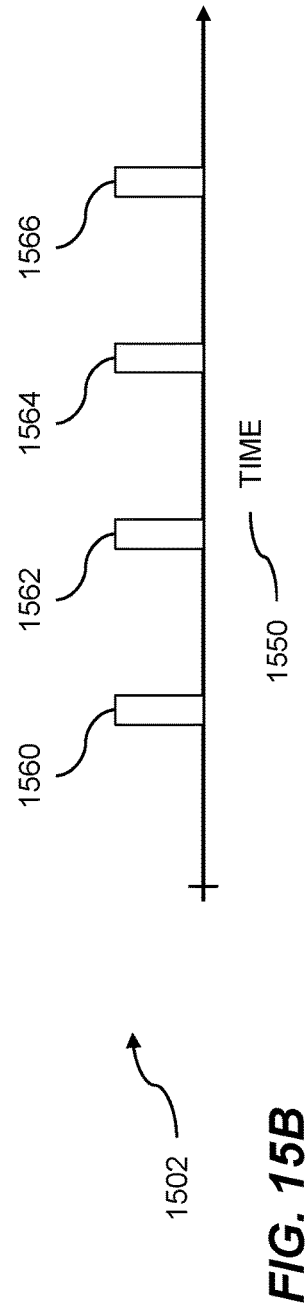
FIG. 15B shows invoking tags to collect images.

FIG. 15B shows invoking tags to collect images. The invoking tags to collect images can be used for image analysis for images collected of an individual. The collected images can be analyzed for cognitive states and/or facial expressions. A plurality of images of an individual viewing an electronic display can be received. A face in an image can be identified, based on the use of classifiers. The plurality of images can be evaluated to determine cognitive states and/or facial expressions of the individual. As previously stated, a media presentation can be a video, a webpage, and so on. A video 1502 can include one or more embedded tags, such as a tag 1560, another tag 1562, a third tag 1564, a fourth tag 1566, and so on. In practice, multiple tags can be included in the media presentation. The one or more tags can be invoked during the media presentation. The collection of the invoked tags can occur over time, as represented by a timeline 1550. When a tag is encountered in the media presentation, the tag can be invoked. When the tag 1560 is encountered, invoking the tag can enable a camera coupled to a user device and can capture one or more images of the user viewing the media presentation. Invoking a tag can depend on opt-in by the user. For example, if a user has agreed to participate in a study by indicating an opt-in, then the camera coupled to the user's device can be enabled and one or more images of the user can be captured. If the user has not agreed to participate in the study and has not indicated an opt-in, then invoking the tag 1560 does not enable the camera nor capture images of the user during the media presentation. The user can indicate an opt-in for certain types of participation, where opting-in can be dependent on specific content in the media presentation. The user could opt in to participate in a study of political campaign messages and not opt in for a particular advertisement study. In this case, tags that are related to political campaign messages, advertising messages, social media sharing, etc., and that enable the camera and image capture when invoked would be embedded in the media presentation, social media sharing, and so on. However, tags embedded in the media presentation that are related to advertisements would not enable the camera when invoked. Various other situations of tag invocation are possible. One such usage of tag invocation can include the automatic selection of a representative icon based on a user's facial expression upon invocation of the tag. Thus, when a user interacts with a given web page, a representative icon such as an emoji can be sent with a user message, or suggested to the user for inclusion in a message such as a social media post, as an example.

Figure 16:
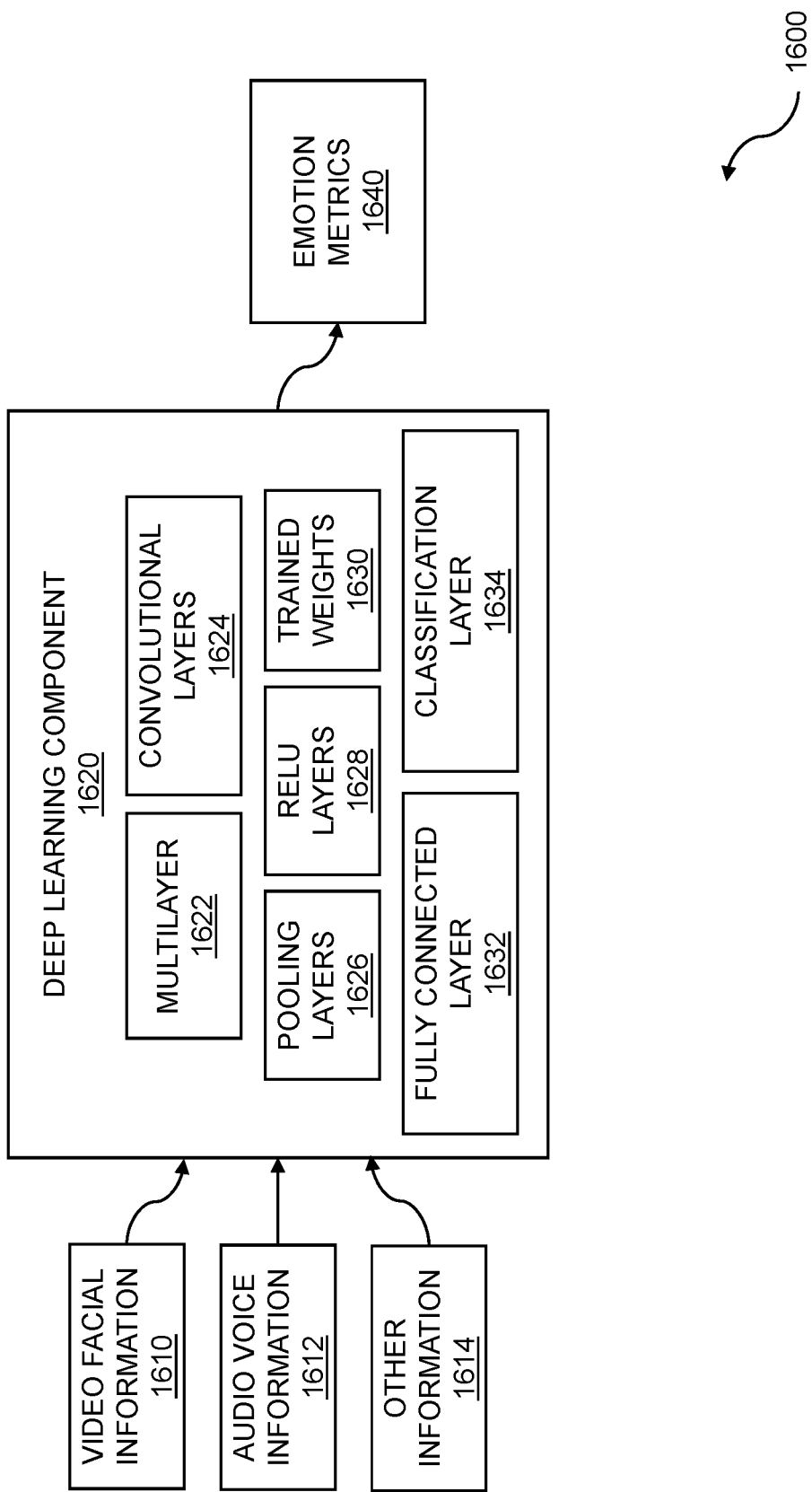
FIG. 16 shows a high-level diagram for machine learning/deep learning.

FIG. 16 illustrates a high-level diagram for machine learning/deep learning. Deep learning can be used to enable live streaming analytics within a shared digital environment. An interactive digital environment is accessed, where the interactive digital environment is a shared digital environment for a plurality of participants. A plurality of images is obtained from a first set of participants within the plurality of participants involved in the interactive digital environment. Cognitive state content within the plurality of images is analyzed for the first set of participants within the plurality of participants. Results of the analyzing cognitive state content are provided to a second set of participants within the plurality of participants. In embodiments, the results can be provided as an emoji, an animation, and so on.

Understanding and evaluating moods, emotions, or cognitive states requires a nuanced evaluation of facial expressions, audio expressions, or other cues generated by people. Cognitive state analysis is important in many areas such as research, psychology, business, intelligence, law enforcement, and so on. The understanding of cognitive states can be used in a variety of fields, such as improving marketing analysis, assessing the effectiveness of customer service experiences and retail experiences, and evaluating the consumption of content such as movies and videos. Identifying points of frustration in a customer transaction can allow a company to take action to address the causes of the frustration. By streamlining processes, key performance areas such as customer satisfaction and customer transaction throughput can be improved, resulting in increased sales and revenues.

Deep learning is a branch of machine learning which seeks to imitate in software the activity which takes place in layers of neurons in the neocortex of the human brain. Deep learning applications include processing of image data, audio data, and so on. In many contexts, "deep learning" and "machine learning" can be used interchangeably. FIG. 16 illustrates a high-level diagram for deep learning 1600. The deep learning can be accomplished using a multilayered convolutional computing system, a convolutional neural network, or other techniques. The deep learning can accomplish image analysis, audio analysis, and other analysis tasks. A deep learning component 1620 collects and analyzes various types of information from a plurality of information channels. The information channels can include video facial information 1610, audio voice information 1612, other information 1614, and so on. In embodiments, the other information can include one or more of electrodermal activity, heart rate, heart rate variability, skin temperature, blood pressure, muscle movements, or respiration.

Returning to the deep learning component 1620, the deep learning component can include a multilayered convolutional computing system 1622. The multilayered convolutional computing system 1622 can include a plurality of layers of varying types. The layers can include one or more convolutional layers 1624 which can be used for learning and analysis. The convolutional layers can include pooling layers 1626 which can combine the outputs of clusters into a single datum. The layers can include one or more Rectified Linear Unit (ReLU) layers 1628. The one or more ReLU layers can implement an activation function such as $f(x)=\max(0,x)$, thus providing an activation with a threshold at zero. The convolutional layers can include trained weights 1630. The trained weights can be based on learning, where the learning uses information collected from one or more individuals via a plurality of information channels. The trained weights can be used to enable the multilayer convolutional computing system to determine image characteristics, voice characteristics, and so on.

The deep learning component 1620 can include a fully connected layer 1632. The fully connected layer 1632 processes each data point from the output of a collection of intermediate layers. The fully connected layer 1632 takes all data points in the previous layer and connects them to every single node contained within the fully connected layer. The output of the fully connected layer 1632 can provide input to a classification layer 1634. The classification layer can be used to classify emotional states, cognitive states, moods, and so on. The classification can be based on using classifiers. The deep learning component 1620 provides data that includes emotion metrics 1640. The emotion metrics can include an emotion type, a number of occurrences of the emotion type, the intensity of the emotion type, and so on. The emotion metric can be based on a threshold value, on a target value, on a goal, etc. The emotion metric can be based on emotion types that can occur over a period of time. More than one emotion metric can be provided. In other embodiments, a vocalization metric can be supported. A vocalization metric can include a value, a range of values, a threshold, and so on, that can be associated with a vocalization such as a sigh, a cough, a yawn, and so on. In embodiments, the audio vocalization metrics include a laughter metric.

Figure 17:
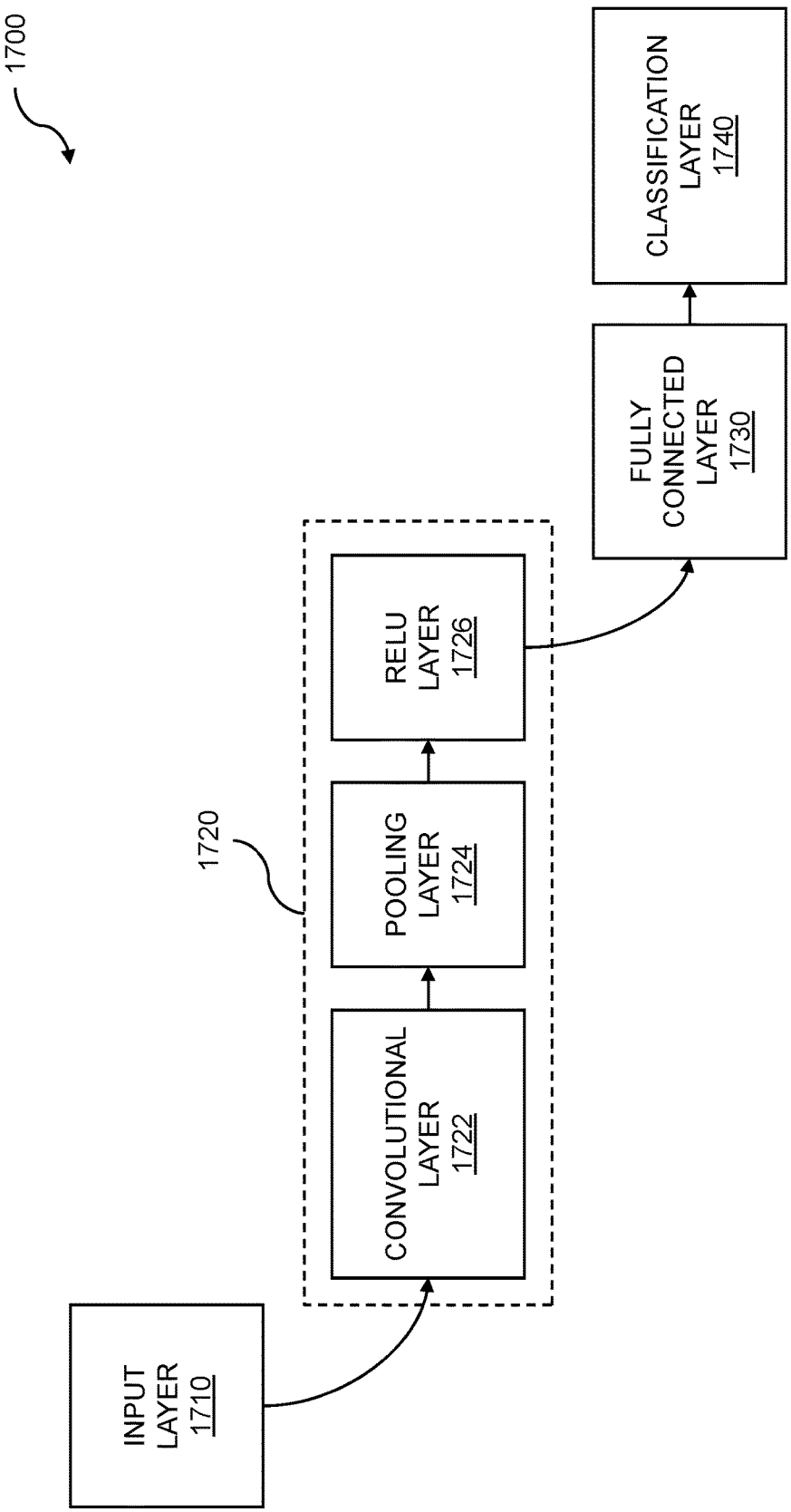
FIG. 17 is an example showing a convolutional neural network.

FIG. 17 is an example showing a convolutional neural network. A convolutional neural network can be used for live streaming analytics within a shared digital environment. An interactive digital environment is accessed, where the interactive digital environment is a shared digital environment for a plurality of participants. A plurality of images is obtained from a first set of participants within the plurality of participants involved in the interactive digital environment. Cognitive state content within the plurality of images is analyzed for the first set of participants within the plurality of participants. Results of the analyzing cognitive state content is provided to a second set of participants within the plurality of participants.

Emotion analysis, mental state analysis, mood analysis, and cognitive state analysis are all very complex tasks. Understanding and evaluating moods, emotions, or cognitive states requires a nuanced evaluation of facial expressions or other cues generated by people. Cognitive state analysis is important in many areas such as research, psychology, business, intelligence, law enforcement, and so on. The understanding of cognitive states can be used in a variety of fields, such as improving marketing analysis, assessing the effectiveness of customer service experiences and retail experiences, and evaluating the consumption of content such as movies and videos. Identifying points of frustration in a customer transaction can allow a company to take action to address the causes of the frustration. By streamlining processes, key performance areas such as customer satisfaction and customer transaction throughput can be improved, resulting in increased sales and revenues. In a content scenario, producing compelling content that achieves the desired effect (e.g. fear, shock, laughter, etc.) can result in increased ticket sales and/or increased advertising revenue. If a movie studio is producing a horror movie, it is desirable to know if the scary scenes in the movie are achieving the desired effect. By conducting tests in sample audiences, and analyzing faces in the audience, a computer-implemented method and system can process thousands of faces to assess the cognitive state at the time of the scary scenes. In many ways, such an analysis can be more effective than surveys that ask audience members questions, since audience members may consciously or subconsciously change answers based on peer pressure or other factors. However, spontaneous facial expressions can be more difficult to conceal or control. Thus, by analyzing facial expressions en masse, important information regarding the cognitive state of the audience can be obtained.

Analysis of facial expressions is also a complex undertaking. Image data, where the image data can include facial data, can be analyzed to identify a range of facial expressions. The facial expressions can include a smile, frown, smirk, and so on. The image data and facial data can be processed to identify the facial expressions. The processing can include analysis of expression data, action units, gestures, cognitive states, physiological data, and so on. Facial data as contained in the raw video data can include information on one or more action units such as head gestures, smiles, brow furrows, squints, lowered eyebrows, raised eyebrows, attention, and the like. The action units can be used to identify smiles, frowns, and other facial indicators of expressions. Gestures can also be identified, and can include a head tilt to the side, a forward lean, a smile, a frown, as well as many other gestures. Other types of data including the physiological data can be obtained, where the physiological data can be obtained using a camera or other image capture device, without contacting the person or persons. Respiration, heart rate, heart rate variability, perspiration, temperature, and other physiological indicators of cognitive state can be determined by analyzing the images and video data.

Analysis of expressions emanating from human audio is also highly complex. Audio data can include speech, grunts, groans, shouts, screams, and so on. Further, the method of how the audio is produced can greatly influence the one or more expressions extracted from the audio. As a result, the audio data, such as voice data, can be evaluated for timbre, prosody, vocal register, vocal resonance, pitch, loudness, speech rate, language content, and so on. The evaluation results can be associated with cognitive states, emotional states, moods, and so on. For example, loud, rapid, shrill speech can indicate anger, while moderate, controlled speech including polysyllabic words can indicate confidence.

Deep learning is a branch of machine learning which seeks to imitate in software the activity which takes place in layers of neurons in the neocortex of the human brain. This imitative activity can enable software to "learn" to recognize and identify patterns in data, where the data can include digital forms of images, sounds, and so on. The deep learning software is used to simulate the large array of neurons of the neocortex. This simulated neocortex, or artificial neural network, can be implemented using mathematical formulas that are evaluated on processors. With the ever-increasing capabilities of the processors, increasing numbers of layers of the artificial neural network can be processed.

Deep learning applications include processing of image data, audio data, and so on. Image data applications include image recognition, facial recognition, etc. Image data applications can include differentiating dogs from cats, identifying different human faces, and the like. The image data applications can include identifying moods, cognitive states, emotional states, and so on, from the facial expressions of the faces that are identified. Audio data applications can include analyzing audio input such as ambient room sounds, physiological sounds such as breathing or coughing, noises made by an individual such as tapping and drumming, voices, and so on. The voice data applications can include analyzing a voice for timbre, prosody, vocal register, vocal resonance, pitch, loudness, speech rate, or language content. The voice data analysis can be used to determine one or more moods, cognitive states, emotional states, etc.

The artificial neural network which forms the basis for deep learning is based on layers. The layers can include an input layer, a convolutional layer, a fully connected layer, a classification layer, and so on. The input layer can receive input data such as image data, where the image data can include a variety of formats including pixel formats. The input layer can then perform processing tasks such as identifying boundaries of the face, identifying landmarks of the face, extracting features of the face, and/or rotating a face within the plurality of images. The convolutional layer can represent an artificial neural network such as a convolutional neural network. A convolutional neural network can contain a plurality of hidden layers within it. A convolutional layer can reduce the amount of data feeding into a fully connected layer. The fully connected layer processes each pixel/data point from the convolutional layer. A last layer within the multiple layers can provide output indicative of cognitive state. The last layer of the convolutional neural network can be the final classification layer. The output of the final classification layer can be indicative of cognitive state of faces within the images that are provided to input layer.

Deep networks including deep convolutional neural networks can be used for facial expression parsing. A first layer of the deep network includes multiple nodes, where each node represents a neuron within a neural network. The first layer can receive data from an input layer. The output of the first layer can feed to a second layer, where the latter layer also includes multiple nodes. A weight can be used to adjust the output of the first layer which is being input to the second layer. Some layers in the convolutional neural network can be hidden layers. The output of the second layer can feed to a third layer. The third layer can also include multiple nodes. A weight can adjust the output of the second layer which is being input to the third layer. The third layer may be a hidden layer. Outputs of a given layer can be fed to next layer. Weights adjust the output of one layer as it is fed to the next layer. When the final layer is reached, the output of the final layer can be a facial expression, a cognitive state, a characteristic of a voice, and so on. The facial expression can be identified using a hidden layer from the one or more hidden layers. The weights can be provided on inputs to the multiple layers to emphasize certain facial features within the face. The convolutional neural network can be trained to identify facial expressions, voice characteristics, etc. The training can include assigning weights to inputs on one or more layers within the multilayered analysis engine. One or more of the weights can be adjusted or updated during training. The assigning of weights can be accomplished during a feed-forward pass through the multilayered neural network. In a feed-forward arrangement, the information moves forward, from the input nodes, through the hidden nodes and on to the output nodes. Additionally, the weights can be updated during a backpropagation process through the multilayered analysis engine.

Returning to the figure, FIG. 17 illustrates a system diagram 1700 for deep learning. The system for deep learning can be used for multimodal machine learning. The system for deep learning can be accomplished using a convolutional neural network or other techniques. The deep learning can accomplish facial recognition and analysis tasks. The network includes an input layer 1710. The input layer 1710 receives image data. The image data can be input in a variety of formats, such as JPEG, TIFF, BMP, and GIF. Compressed image formats can be decompressed into arrays of pixels, wherein each pixel can include an RGB tuple. The input layer 1710 can then perform processing such as identifying boundaries of the face, identifying landmarks of the face, extracting features of the face, and/or rotating a face within the plurality of images.

The network includes a collection of intermediate layers 1720. The multilayered analysis engine can include a convolutional neural network. Thus, the intermediate layers can include a convolutional layer 1722. The convolutional layer 1722 can include multiple sublayers, including hidden layers within it. The output of the convolutional layer 1722 feeds into a pooling layer 1724. The pooling layer 1724 performs a data reduction, which makes the overall computation more efficient. Thus, the pooling layer reduces the spatial size of the image representation to reduce the number of parameters and computation in the network. In some embodiments, the pooling layer is implemented using filters of size 2×2, applied with a stride of two samples for every depth slice along both width and height, resulting in a reduction of 75-percent of the downstream node activations. The multilayered analysis engine can further include a max pooling layer 1724. Thus, in embodiments, the pooling layer is a max pooling layer, in which the output of the filters is based on a maximum of the inputs. For example, with a 2×2 filter, the output is based on a maximum value from the four input values. In other embodiments, the pooling layer is an average pooling layer or L2-norm pooling layer. Various other pooling schemes are possible.

The intermediate layers can include a Rectified Linear Units (ReLU) layer 1726. The output of the pooling layer 1724 can be input to the ReLU layer 1726. In embodiments, the ReLU layer implements an activation function such as $f(x)=\max(0,x)$, thus providing an activation with a threshold at zero. In some embodiments, the ReLU layer 1726 is a leaky ReLU layer. In this case, instead of the activation function providing zero when x<0, a small negative slope is used, resulting in an activation function such as $f(x)=1(x<0)(\alpha x)+1(x>=0)(x)$. This can reduce the risk of "dying ReLU" syndrome, where portions of the network can be "dead" with nodes/neurons that do not activate across the training dataset. The image analysis can comprise training a multilayered analysis engine using the plurality of images, wherein the multilayered analysis engine can comprise multiple layers that include one or more convolutional layers 1722 and one or more hidden layers, and wherein the multilayered analysis engine can be used for emotion analysis.

The example 1700 includes a fully connected layer 1730. The fully connected layer 1730 processes each pixel/data point from the output of the collection of intermediate layers 1720. The fully connected layer 1730 takes all neurons in the previous layer and connects them to every single neuron it has. The output of the fully connected layer 1730 provides input to a classification layer 1740. The output of the classification layer 1740 provides a facial expression and/or cognitive state as its output. Thus, a multilayered analysis engine such as the one depicted in FIG. 17 processes image data using weights, models the way the human visual cortex performs object recognition and learning, and provides effective analysis of image data to infer facial expressions and cognitive states.

Figure 18:
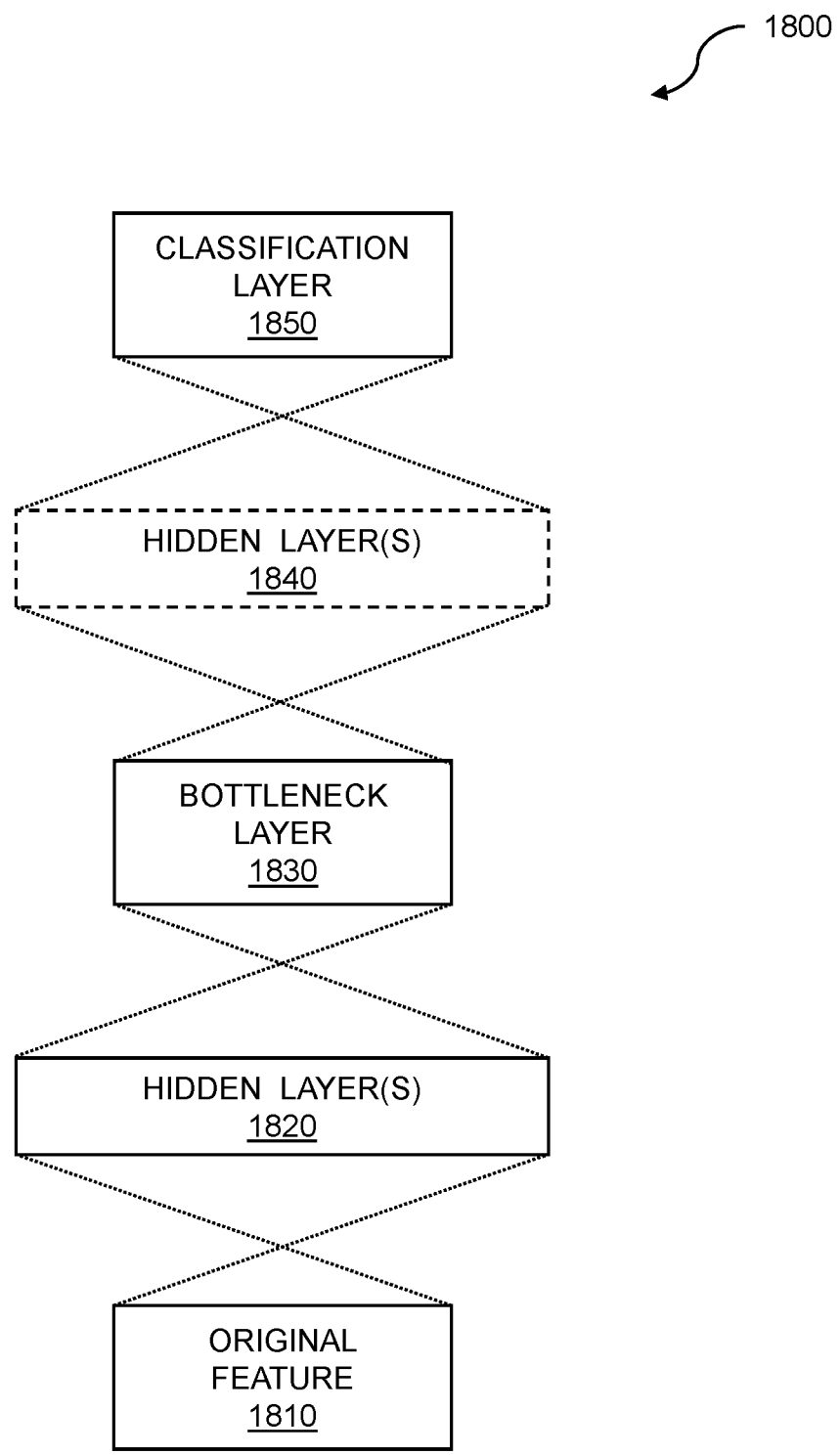
FIG. 18 illustrates a bottleneck layer within a deep learning environment.

FIG. 18 illustrates a bottleneck layer within a deep learning environment. A bottleneck layer can be a layer of a deep neural network and can be used for facial tracking with classifiers for query evaluation. A deep neural network can apply audio classifiers. The audio classifiers are learned from analyzed facial data for a face within the video data. Video data that includes images of one or more people is obtained. Audio data that corresponds to the video data is also obtained. A face can be identified within the video data, and a voice from the audio data can be associated with the face. Using the learned audio classifiers, further audio data can be analyzed. The analysis of the images and the audio enables live streaming analytics within a shared digital environment.

Layers of a deep neural network can include a bottleneck layer 1800. A bottleneck layer can be used for a variety of applications such as facial recognition, voice recognition, emotional state recognition, and so on. The deep neural network in which the bottleneck layer is located can include a plurality of layers. The plurality of layers can include an original feature layer 1810. A feature such as an image feature can include points, edges, objects, boundaries between and among regions, properties, and so on. The deep neural network can include one or more hidden layers 1820. The one or more hidden layers can include nodes, where the nodes can include nonlinear activation functions and other techniques. The bottleneck layer can be a layer that learns translation vectors to transform a neutral face to an emotional or expressive face. In some embodiments, the translation vectors can transform a neutral sounding voice to an emotional or expressive voice. Specifically, activations of the bottleneck layer determine how the transformation occurs. A single bottleneck layer can be trained to transform a neutral face or voice to an emotional or expressive face or voice. In some cases, individual bottleneck layers can be trained for a transformation pair. At runtime, once the user's emotion has been identified and an appropriate response to it can be determined (mirrored or complementary), the trained bottleneck layer can be used to perform the needed transformation.

The deep neural network can include a bottleneck layer 1830. The bottleneck layer can include a fewer number of nodes than the one or more preceding hidden layers. The bottleneck layer can create a constriction in the deep neural network or other network. The bottleneck layer can force information that is pertinent to a classification into a low dimensional representation. The bottleneck features can be extracted using an unsupervised technique. In other embodiments, the bottleneck features can be extracted in a supervised manner. The supervised technique can include training the deep neural network with a known dataset. The features can be extracted from an autoencoder such as a variational autoencoder, a generative autoencoder, and so on. The deep neural network can include hidden layers 1840. The count of the hidden layers can include zero hidden layers, one hidden layer, a plurality of hidden layers, and so on. The hidden layers following the bottleneck layer can include more nodes than the bottleneck layer. The deep neural network can include a classification layer 1850. The classification layer can be used to identify the points, edges, objects, boundaries, and so on, described above. The classification layer can be used to identify cognitive states, cognitive states, emotional states, moods, and the like. The output of the final classification layer can be indicative of the emotional states of faces within the images, where the images can be processed using the deep neural network.

Figure 19:
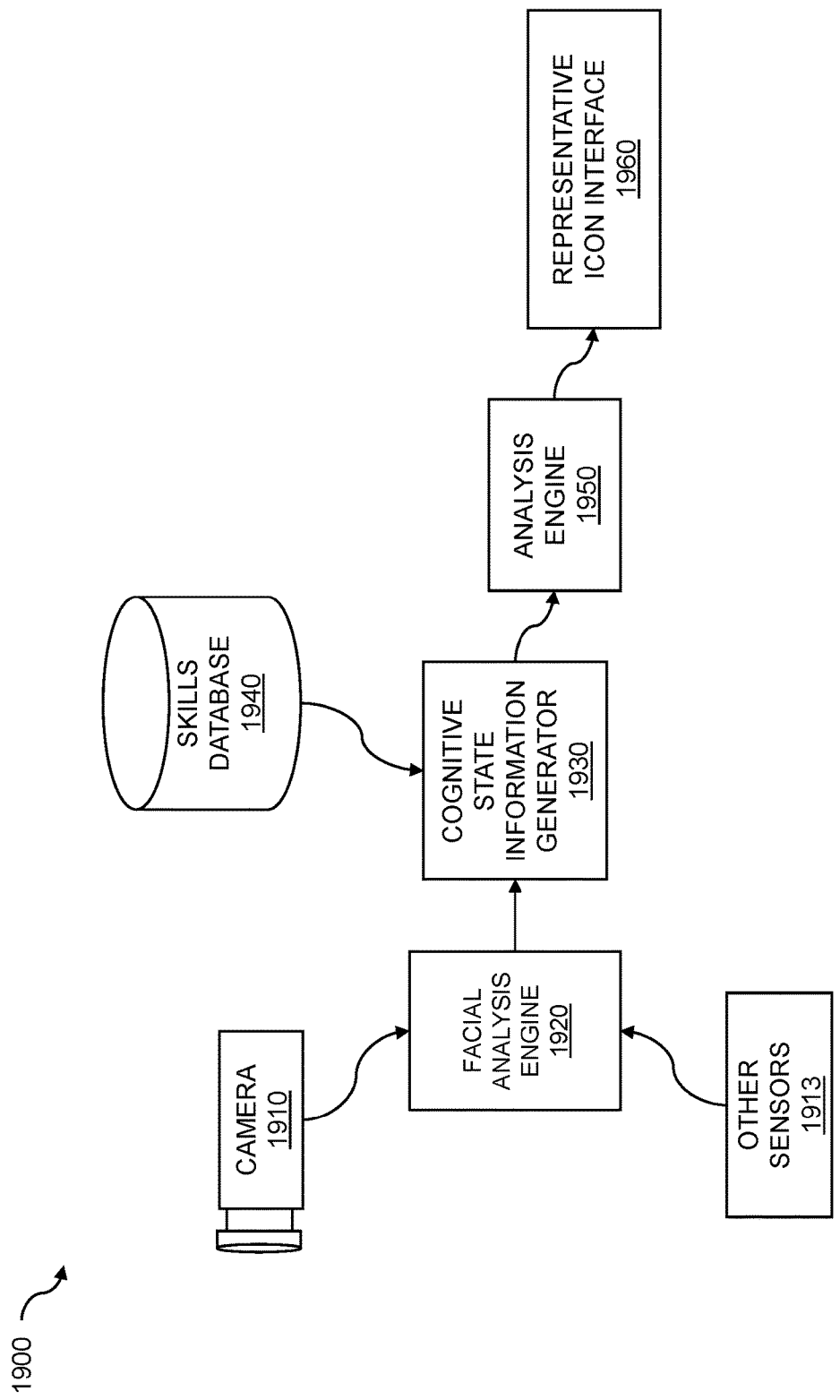
FIG. 19 illustrates a block diagram for emoji manipulation.

FIG. 19 illustrates a block diagram for emoji manipulation. Emoji manipulation, which can include selecting an emoji, an animated emoji, and so on, can be used to manipulate, choose, etc., an emoji that can represent the results of analyzing cognitive state content within images. Emoji manipulation supports live streaming analytics within a shared digital environment. The block diagram 1900 includes a camera 1910. The camera 1910 can capture an image or a plurality of images. More than one camera can be used. The camera or cameras can include a webcam, where a webcam can include a video camera, a still camera, a thermal imager, a CCD device, a phone camera, a three-dimensional camera, a depth camera, a light field camera, multiple webcams used to show different views of a person, or any other type of image capture apparatus that can allow captured data to be used in an electronic system. The camera 1910 can be coupled to a facial analysis engine 1920. Other sensors 1913 can also be coupled to the analysis engine to augment facial analysis. The other sensors 1913 could include biosensors evaluating electrodermal activity, heart rate, perspiration, respiration, blood sugar, and the like. The facial analysis engine can analyze an image from the plurality of images and can capture cognitive state data, where the cognitive state data can include facial data for the individual. The facial analysis engine 1920 can be coupled to a cognitive state information generator 1930. The cognitive state information generator can generate the cognitive state information for an individual or a plurality of individuals. The cognitive state information generator can augment the facial analysis data from the facial analysis engine 1920. The cognitive state information generator can be implemented on a machine learning system. The facial analysis engine 1920 can calculate a facial expression metric associated with the facial data. The facial expression metric can be further analyzed to generate a cognitive state metric. All or part of the analysis can be performed on a neural network. The neural network can use classifiers to translate facial data into a cognitive state metric. The neural network can be integrated or partitioned over several devices, including a portable device such as a cell phone, a server that is local or remote, or a cloud service, to name just a few. The neural network can be part of a machine learning system. Some embodiments further include calculating a facial expression metric for the individual based on the classifying. Some embodiments further include generating a cognitive state metric for the individual based on the facial expression metric. The generating the cognitive state metric can be accomplished using a cognitive state metric generator within analysis engine 1950, described below. Other embodiments further include the cognitive state metric in the translating.

Augmented information can be included in the analysis. The augmented information can include a voice, a context such as an environment, time and date, social information, news cycle information, and so on. The cognitive state information generator 1930 can be coupled to a skills database 1940. The skills database 1940 can include filtering information, temporal information, logical information, and so on. The cognitive state information generator can be coupled to an analysis engine 1950. The analysis engine can be based on behavioral models. The analysis engine can generate instructions for translating a representative icon such as an emoji based on the facial analysis and the cognitive state information that can be generated. The instructions from the analysis engine can be sent to a representative icon interface 1960. The instructions can enable representative icon rendering.

Figure 20:
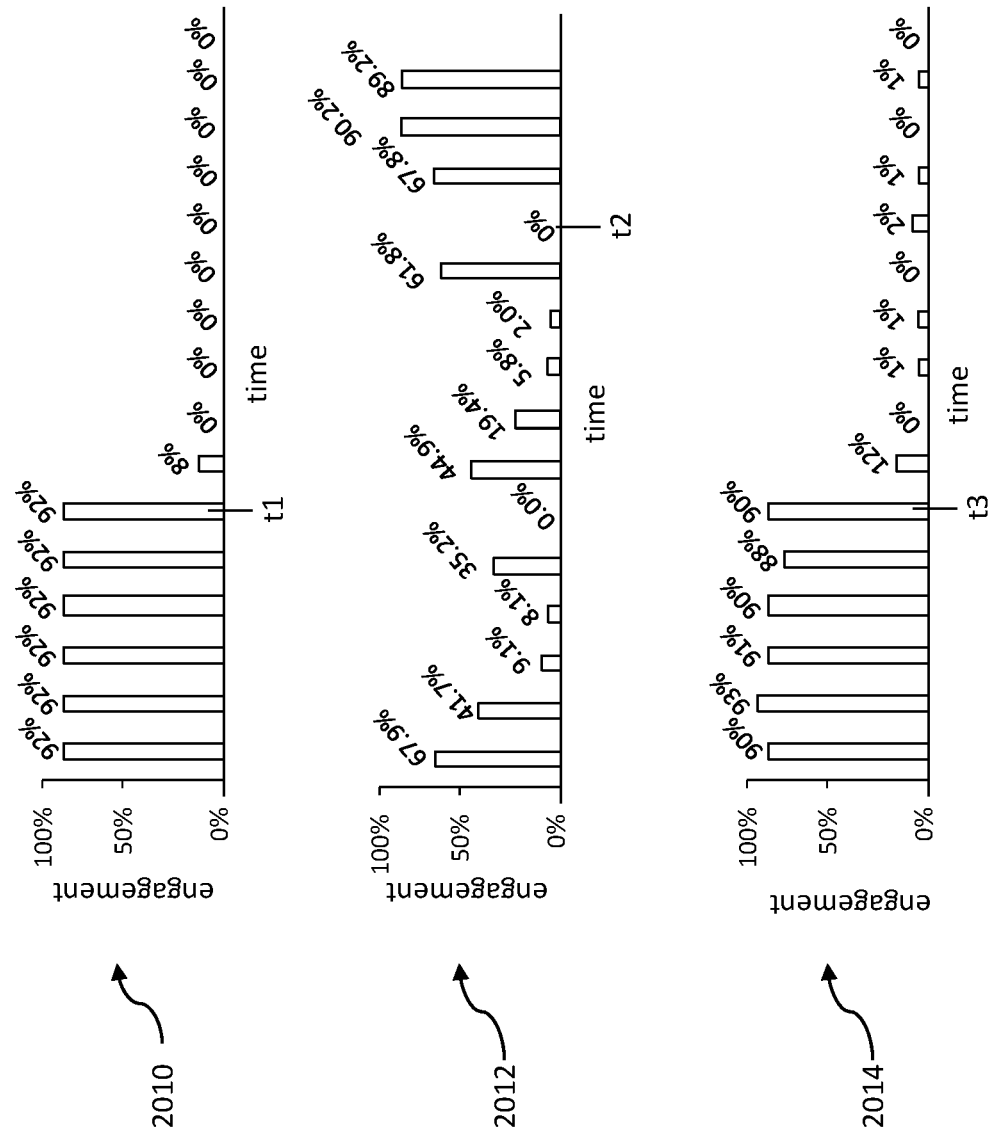
FIG. 20 is an example illustrating facial data that can be used to generate a cognitive state metric.

FIG. 20 is an example illustrating facial data that can be used to generate a cognitive state metric. A cognitive state metric can be based on a cognitive state such as engagement, distractedness, ennui, drowsiness, and so on. One or more cognitive state metrics can be determined by analyzing cognitive state content within image data, audio data, and so on, obtained from images of participants of a shared digital environment. The metrics can be based on live streaming analytics within a share digital environment. FIG. 20 includes three charts, charts 2010, 2012, and 2014. Each chart has a horizontal axis of time, and a vertical axis of an engagement level, which may be derived from cognitive state data. In other embodiments, cognitive state data or other data derived from cognitive state data may be used to generate cognitive state metrics, such as measures of happiness, inattentiveness, concentration, and so on. Each bar on the chart may represent a time window comprising a fixed unit of time, such as one minute. In chart 2010, until time t1, the engagement level is at 92%, indicating that the user is mostly focused on the displayed content. After time t1, the next bar indicates a very low engagement level because at some point during that time window, the user left the area. In the subsequent time windows, the engagement level is zero, as the individual is no longer present.

In chart 2012, the individual remains present in front of the rendered content, but for a portion of the video, he frequently looks away. As can be seen in the chart 2012, up until time t2, the engagement level is sporadic, fluctuating between low and midrange levels. After time t2, the engagement level increases. In such an embodiment where digital media content is modified based on viewership, a chart such as 2012 indicates that the ending of the video is engaging to the individual, while earlier in the video, before time t2, the video was not as engaging. Thus, in embodiments, the modification includes shortening the video by deleting and/or shortening scenes of the video prior to time t2, in order to better hold the individual's attention and interest.

In chart 2014, the individual remains present in front of the rendered content, but for a portion of the video, he is frequently looking away by averting his gaze away from the screen that is presenting the media content. As can be seen in chart 2014, up until time t3, the engagement level is relatively high, indicating a high level of focus by the individual on the media content. After time t3, the engagement level significantly decreases. Each detected engagement level may be considered cognitive state data. In order to generate a cognitive state metric based on a chart such as 2014, the cognitive state data may be processed in any appropriate and desired fashion.

For example, groups of three sequential engagement levels may be averaged to produce cognitive state metrics for a plurality of time periods. As another example, all of the engagement levels for a given time period may be summed and divided by the number of engagement levels that are below 50% in order to determine a cumulative cognitive state metric. For example, in chart 2010, a cumulative cognitive state metric may be determined by summing all of the engagement levels (560) and dividing by the number of engagement levels below 50% (ten), resulting in a cumulative cognitive state metric of 560/10 or 56. For chart 2010, a cumulative cognitive state metric may be determined by summing all of the engagement levels (543.1) and dividing by the number of engagement levels below 50% (ten), resulting in a cumulative cognitive state metric of 543.1/10 or 54.31. For chart 2014, a cumulative cognitive state metric may be determined by summing all of the engagement levels (560) and dividing by the number of engagement levels below 50% (ten in chart 2014), resulting in a cumulative cognitive state metric of 56. Thus, if chart 2010 has a cumulative cognitive state metric of 56, chart 2012 has a metric of 54.31, and chart 2014 has a metric of 56, it may be determined that charts 2010 and 2014 indicate roughly equal levels of engagement while chart 2012 indicates slightly lower engagement than that shown by charts 2010 and 2014. As further examples, if a user is 100% engaged for 8 of 16 sample periods and 49% engaged for the remaining eight sample periods, the cumulative cognitive state metric may be calculated as 100, indicating more engagement than is shown in charts 2010, 2012, and 2014. However, if a user is only 80% engaged for 4 of 16 sample periods and 0% engaged for the remaining 12 sample periods, the cumulative cognitive state metric may be calculated as 26.67, indicating less engagement than is shown in charts 2010, 2012, and 2014. Although only a selection of cognitive state metrics is explicitly discussed herein, it will be understood after reviewing this application in its entirety that any number of different cognitive state metrics may be used.

Figure 21:
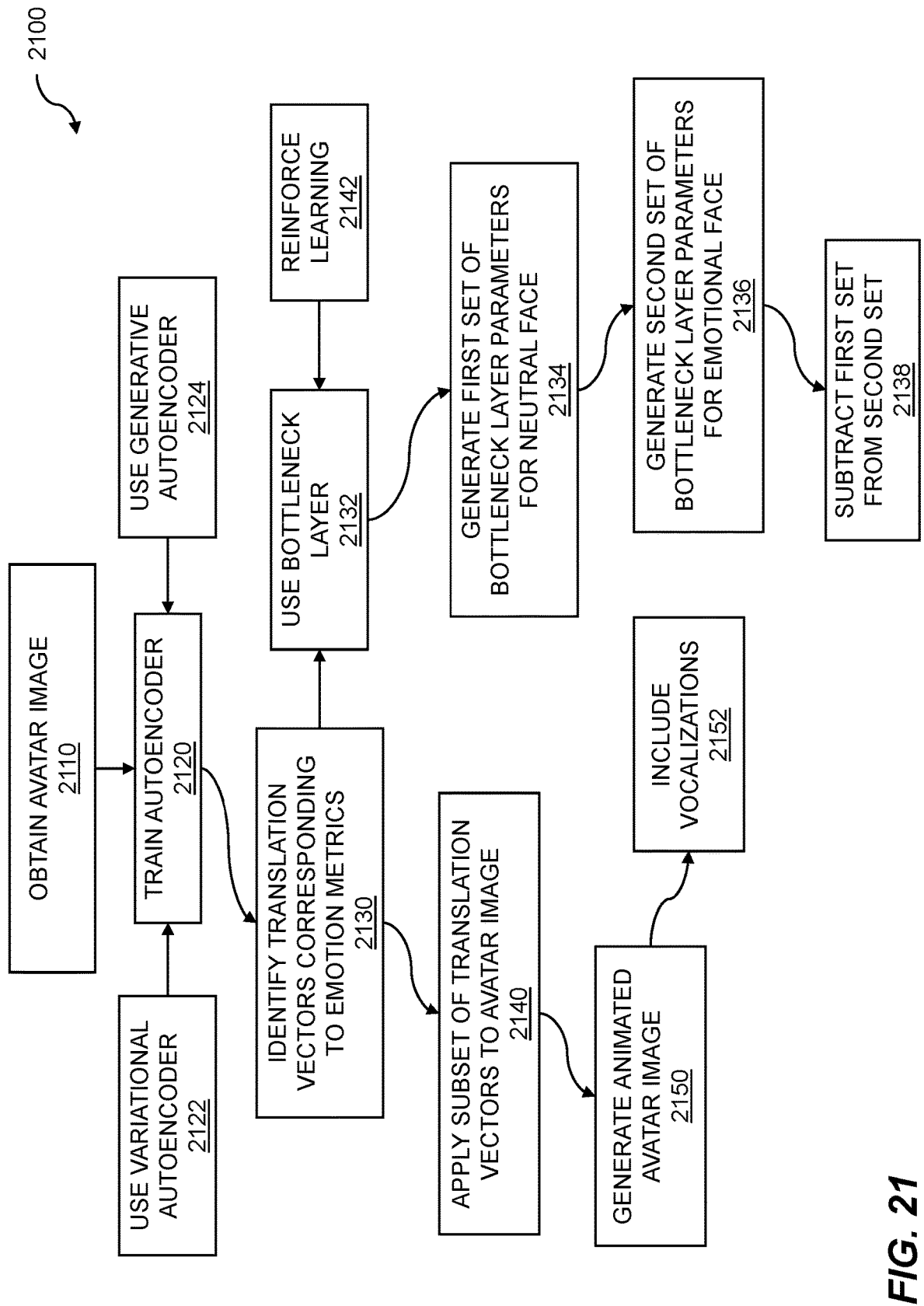
FIG. 21 is a flow diagram for an emotion-enabled animation.

FIG. 21 is a flow diagram for an emotion-enabled animation. Various disclosed techniques include image generation for avatar image or emoji animation using translation vectors. An avatar image or an emoji can be used to represent results of analyzing cognitive state content within image data and audio data collected from presenters and viewers participating in a digital event within a shared digital environment. The results can be based on live streaming analytics within the shared digital environment. The flow 2100 includes obtaining an avatar image 2110 for representation on a first computing device. The avatar image can be based on one or more images of a person, a morphed image, and the like. The avatar image can be based on an emoji, an animated emoji, a cartoon, and so on. In embodiments, the avatar image can include a humanoid face. The humanoid face can be a simulated face, a cartoon face, a character face, and so on. In embodiments, the avatar image includes vocalizations. The vocalization can include speech vocalizations, non-speech vocalizations, etc. The first computing device can include a personal electronic device such as a smartphone, a personal digital assistant (PDA), and a tablet computer. The first computing device can include a wearable device such as a smart watch, smart glasses, a smart garment, etc. The first computing device can be a laptop computer, a desktop computer, etc. The flow 2100 incudes training an autoencoder 2120, on a second computing device comprising an artificial neural network, to generate synthetic emotive faces. The artificial neural network can include a convolutional neural network, a deep neural network, and so on. The second computing device can be similar to the first computing device or can be different from the first computing device. The second computing device can be a local server, a remote server, a blade server, a distributed server, a cloud server, and so on. Various types of autoencoders can be used. In embodiments, the training the autoencoder can include using a variational autoencoder 2122. In other embodiments, the training the autoencoder can include using a generative autoencoder 2124. In embodiments, the training is based on a plurality of facial videos of pre-catalogued facial emotion expressions.

The flow 2100 includes identifying a plurality of translation vectors corresponding to a plurality of emotion metrics 2130, based on the training. The translation vectors can be used to translate an avatar image, including a humanoid face, from one expression of an emotion to another expression of the same emotion or to a different emotion. The translation vectors can correspond to emotion metrics, where the emotion metrics can be used to determine one or more emotions, an intensity of an emotion, a duration of an emotion, and so on. The emotions can include happy, sad, angry, bored, and so on. In embodiments, the emotion metric input is obtained from facial analysis of an individual. The facial analysis can be based on one or more images captured from the individual. In embodiments, the facial expression is identified using a software development kit (SDK). The software development kit can be obtained from the provider of the animated avatar, from a third party, from shareware, and so on. In embodiments, the identifying the plurality of translation vectors uses a bottleneck layer 2132 within the autoencoder. The bottleneck layer can include a fewer number of nodes than the one or more preceding hidden layers in an artificial neural network. The bottleneck layer can create a constriction in the artificial neural network. The bottleneck layer can force information that is pertinent to a classification, for example, into a low dimensional representation. The flow 2100 can further include generating a first set of bottleneck layer parameters, from the bottleneck layer, learned for a neutral face 2134. The first set of bottleneck layer parameters can be used to identify characteristics of the neutral face. The characteristics of the neutral face can include lip position, eyelid position, and so on. The neutral face can be the humanoid face, a cartoon face, and so on. The flow 2100 further includes generating a second set of bottleneck layer parameters for an emotional face 2136. The second set of bottleneck layer parameters can be used for determining the one or more emotions of the emotional face. The second set of bottleneck layer parameters can be used to identify emotions based on non-speech vocalizations such as laughter, cries, sighs, squeals, yawns, grunts, clicks, filled pauses, unfilled pauses, and so on. The flow 2100 further includes subtracting the first set of bottleneck layer parameters from the second set of bottleneck layer parameters 2138 for use in the translation vectors. The subtracting the first set of bottleneck layer parameters from the second set of bottleneck layer parameters can be used to map the transition from the face with the neutral expression to the face with the emotional expression. The mapping can include intermediate steps between the neutral face and the emotional face so that the avatar animation can show the onset of the emotional face, variations of the emotional face such as head movement and blinking eyes, the decay of the emotional face, and so on.

The flow 2100 includes applying a subset of the plurality of translation vectors to the avatar image 2140, wherein the subset represents an emotion metric input. Many translation vectors can be identified in order to translate a neutral avatar face such as a humanoid face to an emotional avatar face. The emotional face can be derived from the neutral face by using a subset of the translation vectors. A happy face can result from using a subset of the translation vectors, a laughing face can result from using a subset of the translation vectors, and so on. The subsets of translation vectors may overlap or may not overlap, depending on the desired emotional face. The flow 2100 includes reinforcing learning 2142 of one or more bottleneck layers. Feedback can be provided, either manually or automatically, to further train a bottleneck layer based on responses from a person to a currently displayed avatar image.

The flow 2100 includes generating an animated avatar image 2150 for the first computing device, based on the applying, wherein the animated avatar image is reflective of the emotion metric input. The generated animated avatar image can be rendered on a screen coupled to the first computing device. The generated animated avatar image can be rendered in a program, an app, a webpage displayed in a web browser, and so on. The animated avatar can represent facial expressions of an individual. The individual can be the user of the first computing device. In embodiments, the avatar image includes body language. The body language can include body position, body orientation, body movement, and so on. In embodiments, the generating further includes vocalizations 2152 based on the emotion metric input. The vocalizations can include speech vocalizations, non-speech vocalizations, etc. Various steps in the flow 2100 may be changed in order, repeated, omitted, or the like without departing from the disclosed concepts. Various embodiments of the flow 2100 can be included in a computer program product embodied in a non-transitory computer readable medium that includes code executable by one or more processors.

Figure 22:
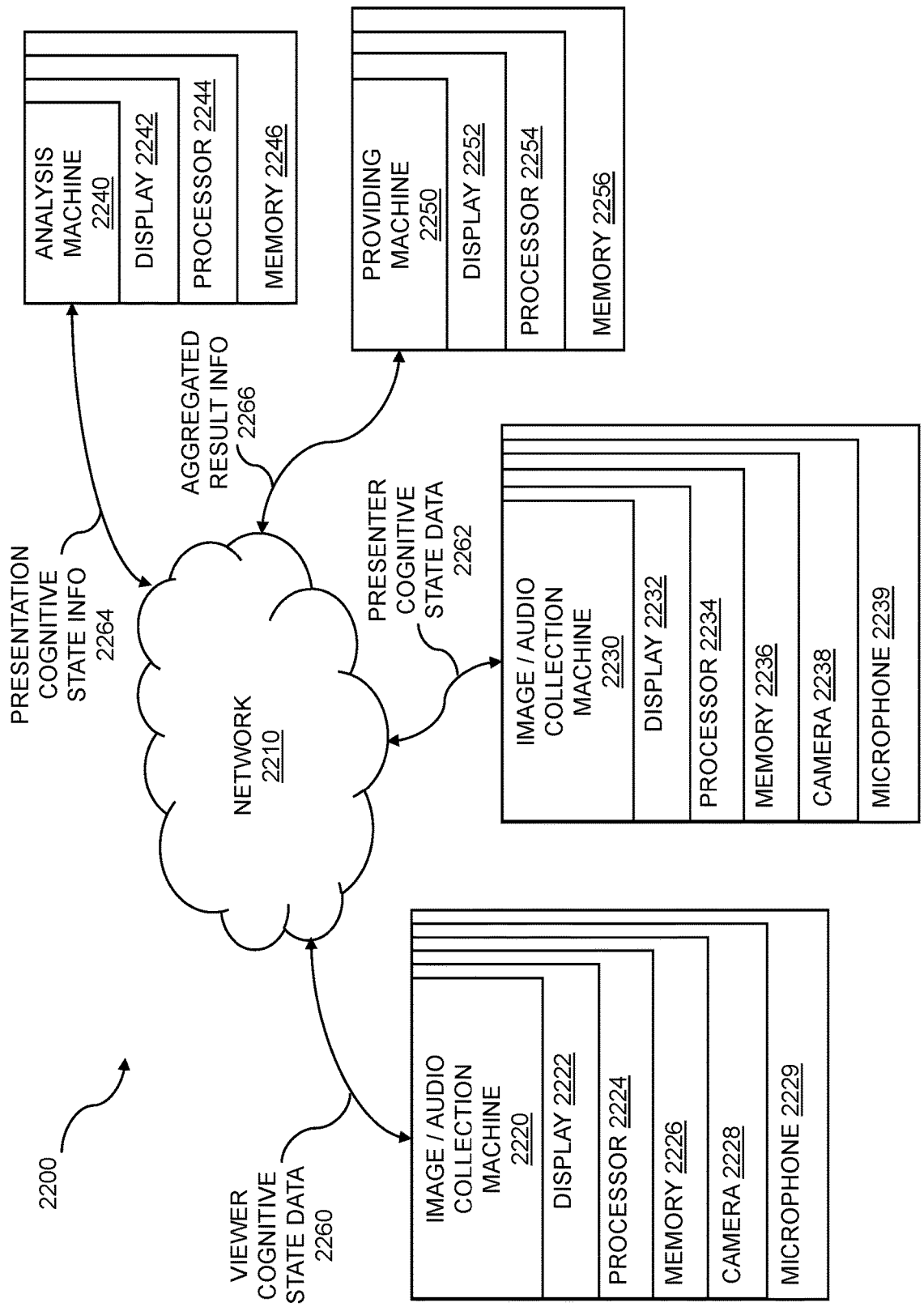
FIG. 22 is a system diagram for live streaming analytics within a shared digital environment.

FIG. 22 is a system diagram for live streaming analytics within a shared digital environment. The analysis can include analyzing images for cognitive state content within a plurality of images from a first set of participants within the plurality of participants involved in the interactive digital environment. The results of the analyzing cognitive state content can be provided to a second set of participants within the plurality of participants. The system 2200 for live streaming analytics within a share digital environment can be implemented using a variety of electronic hardware and software techniques. For example, the system 2200 can be implemented using one or more machines. An example system 2200 is shown for image collection, image analysis, and providing. The system 2200 can include a memory which stores instructions and one or more processors coupled to the memory wherein the one or more processors, when executing the instructions which are stored, are configured to: access an interactive digital environment, wherein the interactive digital environment is a shared digital environment for a plurality of participants; obtain a plurality of images from a first set of participants within the plurality of participants involved in the interactive digital environment; analyze cognitive state content within the plurality of images for the first set of participants within the plurality of participants; and provide results of the analyzing cognitive state content to a second set of participants within the plurality of participants. The system 2200 can perform a computer-implemented method for analysis comprising: accessing an interactive digital environment, wherein the interactive digital environment is a shared digital environment for a plurality of participants; obtaining a plurality of images from a first set of participants within the plurality of participants involved in the interactive digital environment; analyzing cognitive state content within the plurality of images for the first set of participants within the plurality of participants; and providing results of the analyzing cognitive state content to a second set of participants within the plurality of participants.

The system 2200 can include a viewer image and audio collection machine 2220, a presenter image and audio data collection machine 2230, an analysis machine 2240, and providing machine 2250. The viewer image and audio collection machine 2220 can be configured to collect images and audio of one or more viewers of a presentation within a shared digital environment, and can provide viewer participation cognitive state data 2260 to other machines within system 2200. The viewer image and audio collection machine 2220 comprises one or more processors 2224 coupled to a memory 2226 which can store and retrieve instructions, a display 2222, a camera 2228, and a microphone 2229. The camera 2228 can include a webcam, a video camera, a still camera, a thermal imager, a CCD device, a phone camera, a three-dimensional camera, a depth camera, a light field camera, a plenoptic camera, multiple webcams used to show different views of a person from different angles, or any other type of image capture technique that can allow captured data to be used in an electronic system. The microphone 2229 can include an audio microphone, a transducer, or other component for collecting audio data. The memory 2226 can be used for storing instructions, image data and audio data on a plurality of people, presentation data, one or more classifiers, one or more actions units, and so on. The display 2222 can be any electronic display, including but not limited to, a computer display, a laptop screen, a net-book screen, a tablet computer screen, a smartphone display, a mobile device display, a remote with a display, a television, a projector, or the like.

The presenter image collection machine 2230 can be configured to collect images and audio of one or more presenters of a presentation, webinar, online class etc., within a shared digital environment and provide presenter presentation cognitive state data 2262 to other components or machines within system 2200. The presenter image and audio collection machine 2230 comprises one or more processors 2234 coupled to a memory 2236 which can store and retrieve instructions, a display 2232, a camera 2238, and a microphone 2239. The camera 2238 can include a webcam, a video camera, a still camera, a thermal imager, a CCD device, a phone camera, a three-dimensional camera, a depth camera, a light field camera, a plenoptic camera, multiple webcams used to show different views of a person from different angles, or any other type of image capture technique that can allow captured data to be used in an electronic system. The microphone 2239 can include a microphone, a transducer, or other type of audio capture technique that can enable captured audio data to be used within and electronic system. The memory 2236 can be used for storing instructions, image and audio data on a plurality of people, presentation data, one or more classifiers, one or more actions units, and so on. The display 2232 can be any electronic display, including but not limited to, a computer display, a laptop screen, a net-book screen, a tablet computer screen, a smartphone display, a mobile device display, a remote with a display, a television, a projector, or the like.

The analysis machine 2240 can include one or more processors 2244 coupled to a memory 2246 which can store and retrieve instructions, and can also include a display 2242. The analysis server 2240 can receive the analytics for presentation cognitive state information 2264 and analyze the image data using classifiers, action units, and so on. The classifiers and action units can be stored in the analysis machine, loaded into the analysis machine, provided by a user of the analysis machine, and so on. The analysis machine 2240 can use image and audio data received from the viewer image data collection machine 2220 and/or the presenter image and audio collection machine 2230 to produce aggregated resulting information 2266. The aggregated resulting information can include cognitive state, emotion, mood, mental state, etc., and can be based on the analytics for live streaming. In some embodiments, the analysis machine 2240 receives image and audio data from a plurality of image data collection machines, aggregates the image and audio data, processes the image and audio data or the aggregated image and audio data, and so on.

The providing machine 2250 can include one or more processors 2254 coupled to a memory 2256 which can store and retrieve instructions and data, and can also include a display 2252. The aggregated result information 2266 can be processed on the providing machine 2250 or on a different platform from the providing machine 2250. In embodiments, the providing of the aggregated result information occurs on the viewer image and audio data collection machine 2220, and/or the presenter image and audio collection machine 2230, and/or on the analysis machine 2240. As shown in the system 2200, the providing machine 2250 can receive aggregated result information 2266 via a network 2210 such as the Internet or another network from the viewer image and audio data collection machine 2220 and/or the presenter image and audio collection machine 2230, from the analysis server 2240, or from a combination of the aforementioned machines. The providing can include a visual display or any other appropriate display format. In some embodiments, instead of using a network such as the public Internet, a private network such as a private LAN or private WAN may be used. In embodiments, the results can include an emoji representation of the analyzing cognitive state content. The emoji can represent a facial expression, an animal, a hand gesture, a flag, a special object such as a cake or a telephone, etc. In further embodiments, the results can include an animation representation of the analyzing cognitive state content. The animation representation can include an animated GIF.

The system 2200 can include a computer program product embodied in a non-transitory computer readable medium for analysis, the computer program product comprising code which causes one or more processors to perform operations of: accessing an interactive digital environment, wherein the interactive digital environment is a shared digital environment for a plurality of participants; obtaining a plurality of images from a first set of participants within the plurality of participants involved in the interactive digital environment;

analyzing cognitive state content within the plurality of images for the first set of participants within the plurality of participants; and providing results of the analyzing cognitive state content to a second set of participants within the plurality of participants.

Each of the above methods may be executed on one or more processors on one or more computer systems. Embodiments may include various forms of distributed computing, client/server computing, and cloud-based computing. Further, it will be understood that for each flowchart in this disclosure, the depicted steps or boxes are provided for purposes of illustration and explanation only. The steps may be modified, omitted, or re-ordered and other steps may be added without departing from the scope of this disclosure. Further, each step may contain one or more sub-steps. While the foregoing drawings and description set forth functional aspects of the disclosed systems, no particular arrangement of software and/or hardware for implementing these functional aspects should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. Each element of the block diagrams and flowchart illustrations, as well as each respective combination of elements in the block diagrams and flowchart illustrations, illustrates a function, step or group of steps of the methods, apparatus, systems, computer program products, and/or computer-implemented methods. Any and all such functions may be implemented by computer program instructions, by special-purpose hardware-based computer systems, by combinations of special purpose hardware and computer instructions, by combinations of general purpose hardware and computer instructions, by a computer system, and so on. Any and all of which implementations may be generally referred to herein as a "circuit," "module," or "system."

A programmable apparatus that executes any of the above-mentioned computer program products or computer implemented methods may include one or more processors, microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are not limited to applications involving conventional computer programs or programmable apparatus that run them. It is contemplated, for example, that embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized. The computer readable medium may be a non-transitory computer readable medium for storage. A computer readable storage medium may be electronic, magnetic, optical, electromagnetic, infrared, semiconductor, or any suitable combination of the foregoing. Further computer readable storage medium examples may include an electrical connection having one or more wires, a portable computer diskette, a hard disk, a random access memory (RAM), a read-only memory (ROM), an erasable programmable read-only memory (EPROM), Flash, MRAM, FeRAM, phase change memory, an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. Each thread may spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the entity causing the step to be performed.

While the invention has been disclosed in connection with preferred embodiments shown and described in detail, various modifications and improvements thereon will become apparent to those skilled in the art. Accordingly, the spirit and scope of the present invention is not to be limited by the foregoing examples, but is to be understood in the broadest sense allowable by law.

What is claimed is:

1. A computer-implemented method for analysis comprising:
   accessing an interactive digital environment, wherein the interactive digital environment is a shared digital environment for a plurality of participants;
   obtaining a plurality of images from a first set of participants within the plurality of participants involved in the interactive digital environment;
   analyzing cognitive state content within the plurality of images for the first set of participants within the plurality of participants; and
   providing results of the analyzing cognitive state content to a second set of participants within the plurality of participants, wherein the results include a real-time graph representation of the analyzing cognitive state content and an emotion meter, and wherein the real-time graph indicates an emotional response for one or more participants from the first set of participants as a function of time, and wherein the emotion meter is configured to render both positive and negative sentiment, and wherein the emotion meter comprises a first gauge corresponding to an individual, and the emotion meter comprises a second gauge corresponding to a crowd, whereby the emotion meter simultaneously indicates sentiment for both an individual and a crowd.

2. The method of claim 1 wherein the first set of participants comprises viewing participants.

3. The method of claim 2 wherein the second set of participants comprises one or more presenting participants.

4. The method of claim 2 wherein the second set of participants comprises viewing participants and one or more presenting participants.

5. The method of claim 2 wherein the second set of participants comprises a greater number of viewing participants than are contained in the first set.

6. The method of claim 1 wherein the obtaining and the analyzing are accomplished on a device local to a participant such that images of the first set of participants are not transmitted to a non-local device.

7. The method of claim 6 wherein the obtaining and the analyzing are based on an opt-in or an opt-out selection provided by a participant.

8. The method of claim 1 further comprising augmenting the analyzing cognitive state content with evaluation of audio information.

9. The method of claim 8 wherein the audio information includes voice data.

10. The method of claim 9 wherein the voice data enables audio vocalization metrics.

11. The method of claim 10 wherein the audio vocalization metrics include a laughter metric.

12. The method of claim 1 further comprising delivering a laugh track to the second set of participants based on a positive response from the analyzing cognitive state content.

13. The method of claim 1 further comprising delivering a laugh track to the plurality of participants based on a positive response from the analyzing cognitive state content.

14. The method of claim 1 wherein the interactive digital environment comprises a video conference.

15. The method of claim 14 wherein the video conference includes a webinar.

16. The method of claim 1 wherein the interactive digital environment comprises a distributed digital event.

17. The method of claim 16 wherein the distributed digital event includes a live streaming event, a concert, a live performance, an instructional presentation, an educational presentation, a comedic presentation, or a digital wedding.

18. The method of claim 1 wherein the results include an emoji representation of the analyzing cognitive state content.

19. The method of claim 1 wherein the results include an animation representation of the analyzing cognitive state content.

20. The method of claim 1 wherein the analyzing the cognitive state content is based on aggregating to enable the providing results.

21. The method of claim 20 further comprising presenting results of the aggregating to an individual within the plurality of participants.

22. The method of claim 1 wherein the analyzing of the cognitive state content includes detection of one or more of sadness, stress, happiness, anger, frustration, confusion, disappointment, hesitation, cognitive overload, focusing, engagement, attention, boredom, exploration, confidence, trust, delight, disgust, skepticism, doubt, satisfaction, excitement, laughter, calmness, curiosity, humor, sadness, poignancy, or mirth.

23. The method of claim 1 further comprising calculating a facial expression metric as part of the analyzing.

24. The method of claim 23 further comprising generating a cognitive state metric as part of the analyzing, based on the facial expression metric.

25. The method of claim 24 further comprising including the cognitive state metric in the providing.

26. A computer program product embodied in a non-transitory computer readable medium for analysis, the computer program product comprising code which causes one or more processors to perform operations of:
   accessing an interactive digital environment, wherein the interactive digital environment is a shared digital environment for a plurality of participants;
   obtaining a plurality of images from a first set of participants within the plurality of participants involved in the interactive digital environment;
   analyzing cognitive state content within the plurality of images for the first set of participants within the plurality of participants; and
   providing results of the analyzing cognitive state content to a second set of participants within the plurality of participants, wherein the results include a real-time graph representation of the analyzing cognitive state content and an emotion meter, and wherein the real-time graph indicates an emotional response for one or more participants from the first set of participants as a function of time, and wherein the emotion meter is configured to render both positive and negative sentiment, and wherein the emotion meter comprises a first gauge corresponding to an individual, and the emotion meter comprises a second gauge corresponding to a crowd, whereby the emotion meter simultaneously indicates sentiment for both an individual and a crowd.

27. A computer system for analysis comprising:
   a memory which stores instructions;
   one or more processors coupled to the memory wherein the one or more processors, when executing the instructions which are stored, are configured to:
      access an interactive digital environment, wherein the interactive digital environment is a shared digital environment for a plurality of participants;

obtain a plurality of images from a first set of participants within the plurality of participants involved in the interactive digital environment;

analyze cognitive state content within the plurality of images for the first set of participants within the plurality of participants; and provide results of the analyzing cognitive state content to a second set of participants within the plurality of participants, wherein the results include a real-time graph representation of the analyzing cognitive state content and an emotion meter, and wherein the real-time graph indicates an emotional response for one or more participants from the first set of participants as a function of time, and wherein the emotion meter is configured to render both positive and negative sentiment, and wherein the emotion meter comprises a first gauge corresponding to an individual, and the emotion meter comprises a second gauge corresponding to a crowd, whereby the emotion meter simultaneously indicates sentiment for both an individual and a crowd.

28. The method of claim 1 wherein the emotion meter comprises an emotion identification field that displays text corresponding to a detected emotion, and a numerical emotion intensity field that displays a numerical value corresponding to the detected emotion.

29. The method of claim 3 further comprising:
obtaining a second plurality of images from the second set of participants;
analyzing cognitive state content within the second plurality of images for the second set of participants;
providing a second set of results of the analyzing cognitive state content to the first set of participants; and
providing a second emotion meter to the first set of participants, wherein the first set of participants and the second set of participants each have a line of sight to a digital event provided within the interactive digital environment.

30. The method of claim 23 further comprising, generating a cognitive state event temporal signature as part of the analyzing.

\* \* \* \* \*